United States Patent
Colson et al.

(10) Patent No.: US 12,366,114 B2
(45) Date of Patent: Jul. 22, 2025

(54) COVERING FOR ARCHITECTURAL FEATURES, AND RELATED SYSTEMS, METHODS OF OPERATION, AND MANUFACTURE

(71) Applicant: HUNTER DOUGLAS INC., New York, NY (US)

(72) Inventors: Wendell B. Colson, Weston, MA (US); Ko Kuperus, Superior, CO (US); David P. Hartman, Ashland, MA (US); Matthew A. Difrancesco, Natick, MA (US)

(73) Assignee: Hunter Douglas Inc., New York, NY (US)

( * ) Notice: Subject to any disclaimer, the term of this patent is extended or adjusted under 35 U.S.C. 154(b) by 788 days.

(21) Appl. No.: 17/397,343

(22) Filed: Aug. 9, 2021

(65) Prior Publication Data

US 2021/0363818 A1    Nov. 25, 2021

Related U.S. Application Data

(63) Continuation of application No. 15/788,973, filed on Oct. 20, 2017, now Pat. No. 11,118,396.
(Continued)

(51) Int. Cl.
*E06B 9/386* (2006.01)
*E06B 9/34* (2006.01)
(Continued)

(52) U.S. Cl.
CPC ............... *E06B 9/386* (2013.01); *E06B 9/34* (2013.01); *E06B 9/382* (2013.01); *E06B 9/384* (2013.01);
(Continued)

(58) Field of Classification Search
CPC .. E06B 2009/2627; E06B 9/386; E06B 9/382; E06B 9/384; E06B 2009/2405; E06B 2009/2435
See application file for complete search history.

(56) References Cited

U.S. PATENT DOCUMENTS

| | | | |
|---|---|---|---|
| 1,764,789 A | 6/1930 | Heald | |
| 1,789,655 A | 1/1931 | Iwata | |

(Continued)

FOREIGN PATENT DOCUMENTS

| | | | |
|---|---|---|---|
| CA | 2 090 046 A1 | 8/1994 | |
| CH | 331432 A | 7/1958 | |

(Continued)

OTHER PUBLICATIONS

Athena, Shades DeLuxe{TM}; photo {on or about Jul. 2014), 1.pg.
(Continued)

*Primary Examiner* — Abe Massad
(74) *Attorney, Agent, or Firm* — Dority & Manning, P.A.

(57) ABSTRACT

A covering for an architectural feature having generally horizontal vane elements extending between generally inner and outer vertical support members that can adjust and control the amount and quality of light transmitted through the covering is described. In one embodiment, the covering has elongate tapes as vertical support members that have a width substantially less than the length of the vane elements, and adjacent inner and adjacent outer elongate tapes are separated by a distance. In one embodiment, the vane elements are multi-layered, cellular vanes. The elongated multilayered vanes may include elongate stiffeners that may be associated with, coupled to, and or inserted within pockets formed in, the multilayered vanes. Also disclosed is a method of operation and manufacture.

27 Claims, 42 Drawing Sheets

Related U.S. Application Data

(60) Provisional application No. 62/414,548, filed on Oct. 28, 2016.

(51) Int. Cl.
| | | |
|---|---|---|
| *E06B 9/382* | (2006.01) | |
| *E06B 9/384* | (2006.01) | |
| *E06B 9/44* | (2006.01) | |
| *B29C 65/08* | (2006.01) | |
| *B29L 31/00* | (2006.01) | |
| *E06B 9/24* | (2006.01) | |
| *E06B 9/264* | (2006.01) | |

(52) U.S. Cl.
CPC ............... *E06B 9/44* (2013.01); *B29C 65/08* (2013.01); *B29K 2023/06* (2013.01); *B29L 2031/7192* (2013.01); *E06B 2009/2405* (2013.01); *E06B 2009/2417* (2013.01); *E06B 9/264* (2013.01)

(56) References Cited

U.S. PATENT DOCUMENTS

| | | |
|---|---|---|
| 2,012,887 A | 8/1935 | Major |
| 2,056,823 A | 10/1936 | Brown |
| 2,140,049 A | 12/1938 | Grauel |
| 2,231,778 A | 2/1941 | Swanson |
| 2,267,869 A | 12/1941 | Loehr |
| 2,865,446 A | 12/1958 | Cole |
| 2,994,370 A | 8/1961 | Pinto |
| 3,032,099 A | 5/1962 | Croxen |
| 3,111,163 A | 11/1963 | Nelson |
| 3,170,505 A | 2/1965 | Lorentzen |
| 3,384,519 A | 5/1968 | Froget |
| 3,844,330 A | 10/1974 | Hyman |
| 3,916,973 A | 11/1975 | Schuppler et al. |
| 4,019,554 A | 4/1977 | Rasmussen |
| 4,039,019 A | 8/1977 | Hopper |
| 4,137,111 A | 1/1979 | Hansen |
| 4,344,474 A | 8/1982 | Berman |
| 4,884,612 A | 12/1989 | Schnebly et al. |
| 4,909,870 A | 3/1990 | Gould et al. |
| 4,951,729 A | 8/1990 | Chi Yu |
| 5,184,659 A | 2/1993 | Alcocer |
| 5,287,908 A | 2/1994 | Hoffmann et al. |
| 5,419,385 A | 5/1995 | Vogel et al. |
| 5,490,553 A | 2/1996 | Colson et al. |
| 5,503,210 A | 4/1996 | Colson et al. |
| 5,514,428 A | 5/1996 | Kunert |
| 5,638,880 A | 6/1997 | Colson et al. |
| 5,664,613 A | 9/1997 | Jelic |
| 5,678,622 A | 10/1997 | Asmussen et al. |
| 5,785,094 A | 7/1998 | Yoshida |
| 5,787,951 A | 8/1998 | Tonomura et al. |
| 5,918,655 A | 7/1999 | Corey |
| 6,006,812 A | 12/1999 | Corey |
| 6,237,667 B1 | 5/2001 | Fraczek et al. |
| 6,354,353 B1 | 3/2002 | Green et al. |
| 6,688,370 B1 | 2/2004 | Nien |
| 6,745,811 B1 | 6/2004 | Nien |
| D498,105 S | 11/2004 | Tyner |
| 7,222,656 B2 | 5/2007 | Nien |
| D668,090 S | 10/2012 | Colson et al. |
| D671,349 S | 11/2012 | Judkins |
| D686,433 S | 7/2013 | Marocco |
| D691,397 S | 10/2013 | Colson et al. |
| 9,359,813 B2 * | 6/2016 | Colson ..................... E06B 9/34 |
| 10,648,229 B2 | 5/2020 | Colson et al. |
| 2001/0037849 A1 | 11/2001 | Corey et al. |
| 2001/0037864 A1 | 11/2001 | Colson et al. |
| 2001/0054490 A1 | 12/2001 | Corey et al. |
| 2002/0040770 A1 | 4/2002 | Colson et al. |
| 2002/0088559 A1 | 7/2002 | Green et al. |
| 2002/0100414 A1 | 8/2002 | Colson et al. |
| 2003/0019589 A1 | 1/2003 | Colson et al. |
| 2003/0029577 A1 | 2/2003 | Palmer et al. |
| 2003/0205339 A1 | 11/2003 | Colson et al. |
| 2004/0020608 A1 | 2/2004 | Colson et al. |
| 2004/0065416 A1 | 4/2004 | Auger et al. |
| 2004/0154755 A1 | 8/2004 | Judkins |
| 2005/0150608 A1 | 7/2005 | Auger et al. |
| 2005/0155722 A1 | 7/2005 | Colson et al. |
| 2006/0157205 A1 | 7/2006 | Auger |
| 2008/0053625 A1 | 3/2008 | Anthony |
| 2009/0205789 A1 | 8/2009 | Watkins et al. |
| 2009/0266496 A1 | 10/2009 | Dann et al. |
| 2010/0186903 A1 | 7/2010 | Liang et al. |
| 2011/0120661 A1 | 5/2011 | Kim |
| 2011/0126959 A1 | 6/2011 | Holt et al. |
| 2012/0222828 A1 | 9/2012 | Kwak |
| 2012/0318465 A1 | 12/2012 | Colson |
| 2013/0240158 A1 | 9/2013 | Chen |
| 2014/0138037 A1 | 5/2014 | Colson et al. |
| 2014/0262071 A1 | 9/2014 | Colson |
| 2015/0041072 A1 | 2/2015 | Hsu et al. |
| 2017/0198939 A1 | 7/2017 | Teeters |
| 2017/0247941 A1 | 8/2017 | Colson |
| 2018/0002978 A1 | 1/2018 | Colson et al. |
| 2018/0119485 A1 | 5/2018 | Colson et al. |
| 2018/0179812 A1 | 6/2018 | Dubina et al. |
| 2018/0332829 A1 | 11/2018 | Teeters |
| 2019/0316413 A1 | 10/2019 | Huang |

FOREIGN PATENT DOCUMENTS

| | | |
|---|---|---|
| CH | 476482 A | 8/1969 |
| CN | 101984889 A | 3/2011 |
| DE | 382758 A | 10/1923 |
| DE | 7008554 U | 10/1971 |
| DE | 2936811 A1 | 4/1981 |
| DE | 3525515 A1 | 1/1987 |
| DE | 3912528 A1 | 10/1990 |
| EP | 818 601 A1 | 1/1998 |
| EP | 1 439 279 A1 | 7/2004 |
| EP | 2 216 433 A2 | 8/2010 |
| EP | 2733302 A2 | 5/2014 |
| EP | 1856364 B1 | 9/2015 |
| FR | 1309194 A | 11/1962 |
| FR | 1321456 A | 3/1963 |
| FR | 1364674 A | 6/1964 |
| FR | 1465261 A | 1/1967 |
| GB | 1494842 A | 12/1977 |
| JP | 2016-516143 A | 6/2016 |
| WO | 91/03618 A1 | 3/1991 |
| WO | 97/04207 A1 | 2/1997 |
| WO | 9706334 A1 | 2/1997 |
| WO | 2016/040646 A1 | 3/2016 |

OTHER PUBLICATIONS

Athena, photo {on or about Jul. 2014), 1 pg.
Photo of sun mate woven full shade, Stuttgart R+ T trade show (Feb. 2015), 1 page.
Photo of sun mate woven shade, Stuttgarl R+ T trade show (Feb. 2015), 1 page.
Photo of woven sheer shade, Stuttgart R+ T trade show (Feb. 2015), 1 page.
English-language translation of Japanese Office Action dated Sep. 7, 2021, received in a corresponding foreign application, 17 pages.

* cited by examiner

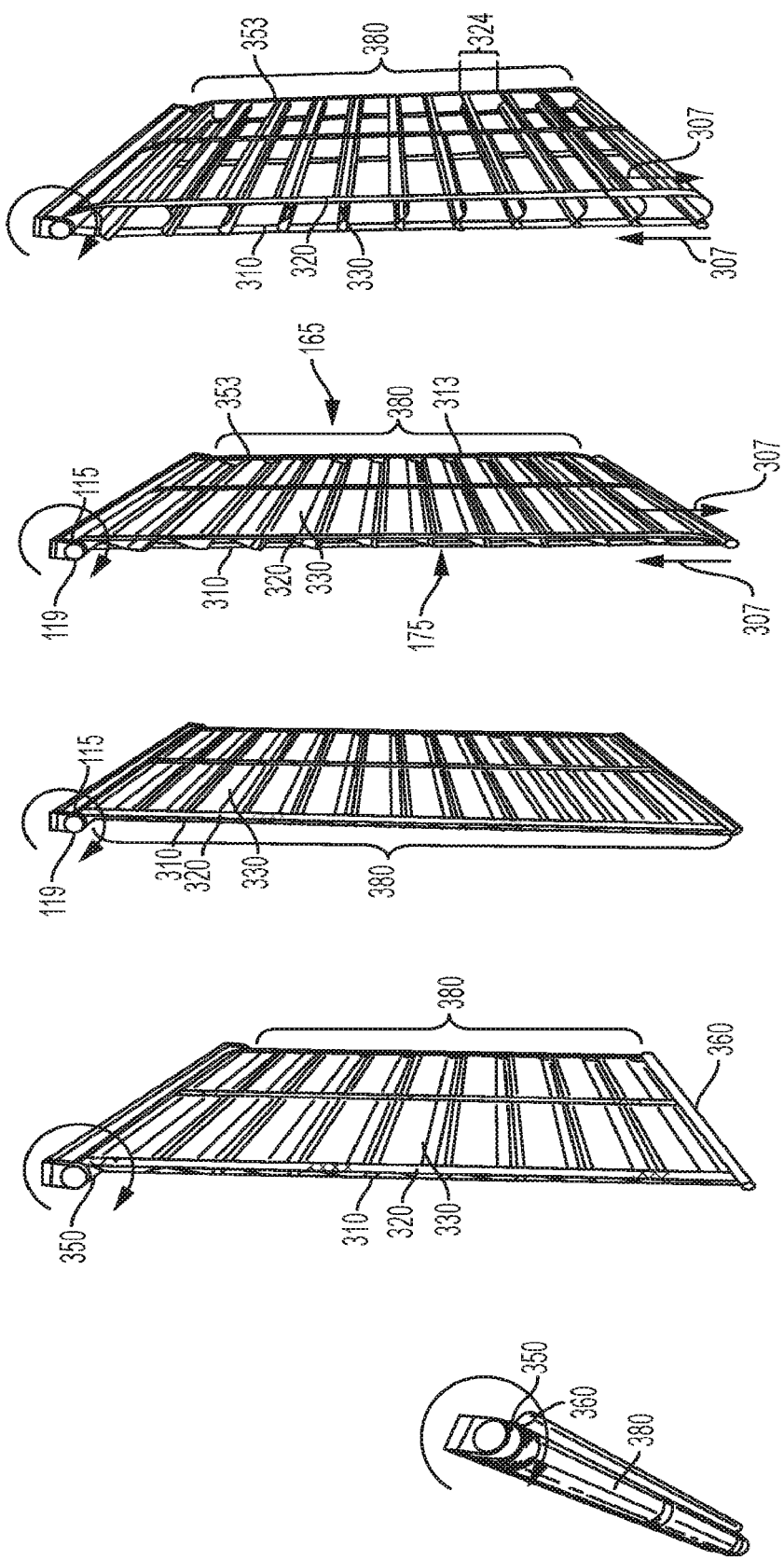

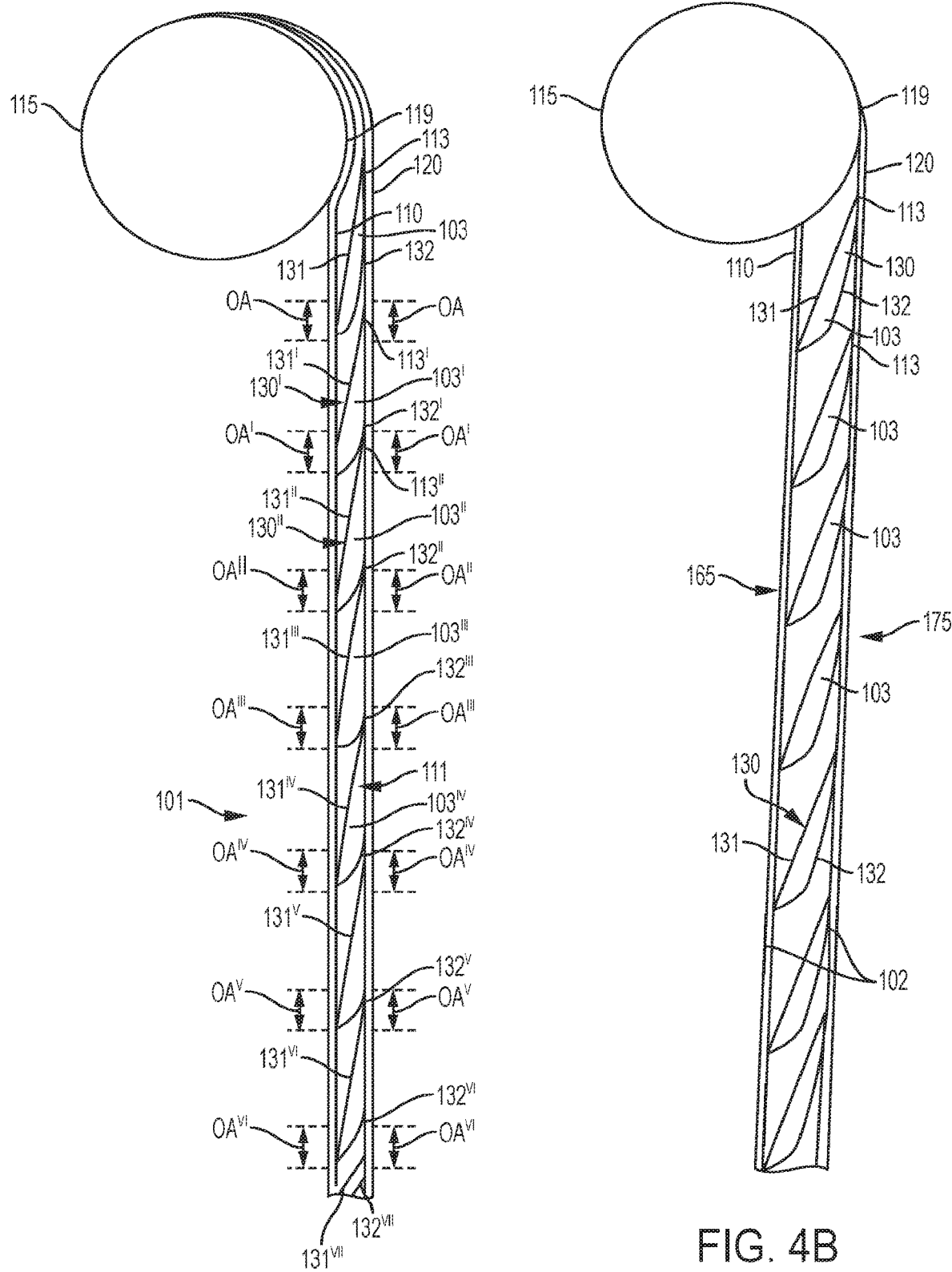

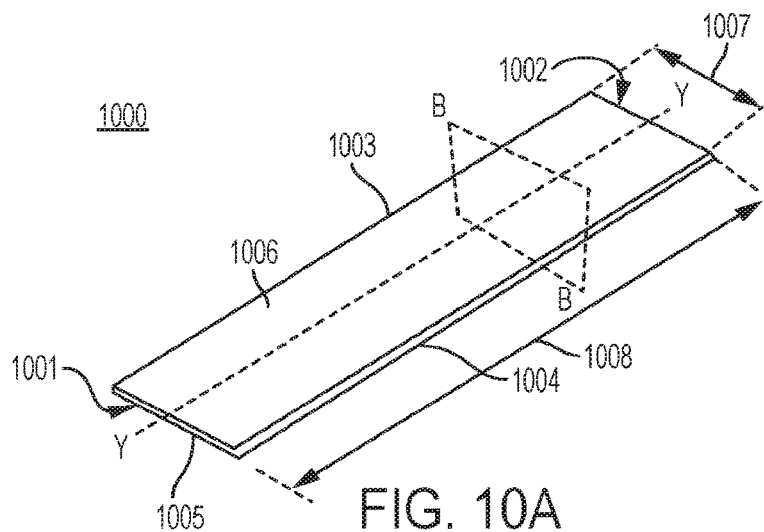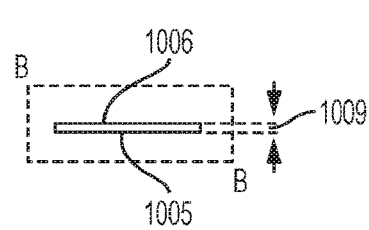
FIG. 10A
FIG. 10B
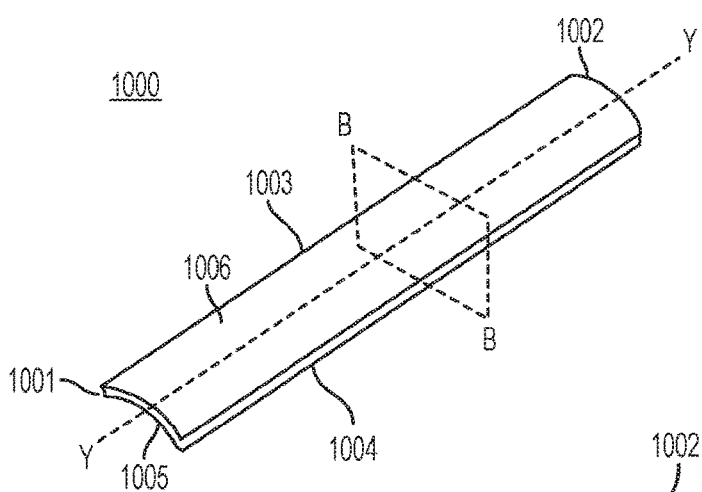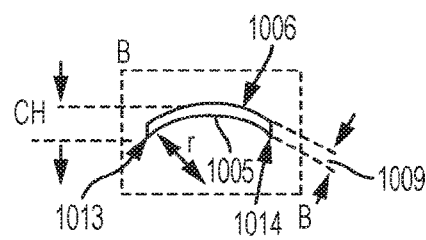
FIG. 10C
FIG. 10D
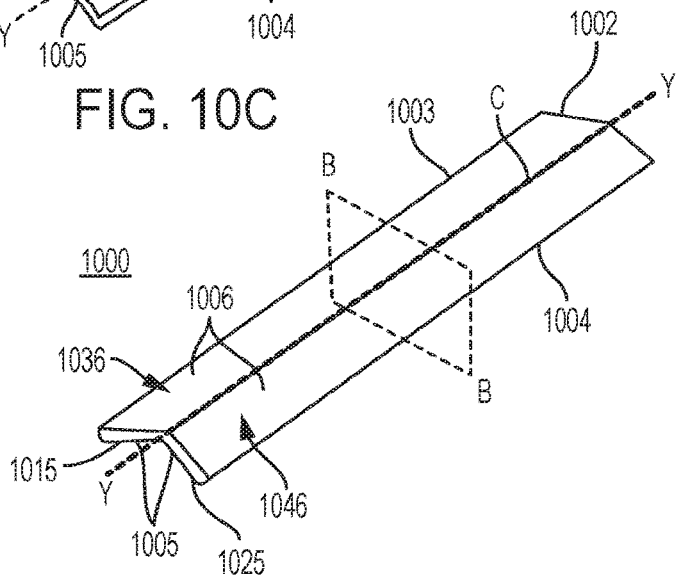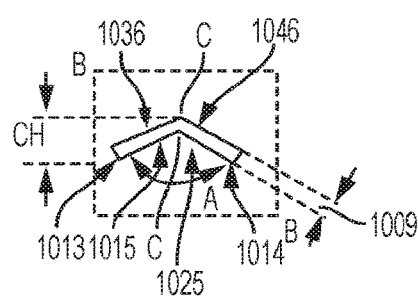
FIG. 10E
FIG. 10F

COVERING FOR ARCHITECTURAL FEATURES, AND RELATED SYSTEMS, METHODS OF OPERATION, AND MANUFACTURE

CROSS-REFERENCE TO RELATED APPLICATIONS

This application is a continuation of U.S. patent application Ser. No. 15/788,973, filed Oct. 20, 2017, which claims priority to U.S. Provisional Application No. 62/414,548, filed Oct. 28, 2016, the entire content and disclosure of each is incorporated herein by reference.

COPYRIGHT NOTICE

A portion of the disclosure of this patent document contains material that is subject to copyright protection, particularly the Figures appended hereto. The copyright owner has no objection to the reproduction by anyone of the patent document or patent disclosure as it appears in the Patent and Trademark Office, patent file or records, but otherwise reserves all copyrights whatsoever.

BACKGROUND

Field of the Disclosure

The present disclosure relates to coverings for architectural features and related systems, and methods of operation and manufacture. In one embodiment a retractable covering, preferably a roll-up, flexible, covering for a window opening is disclosed.

Description of Related Art

Retractable coverings for architectural features have assumed numerous forms over a long period of time. Originally, coverings for architectural features such as windows, doors, archways or the like consisted principally of fabric draped across the architectural features. Such early forms of coverings evolved into retractable roller shades, curtains, draperies, and the like wherein the covering could be extended across the architectural feature (e.g., opening) and/or retracted to a top or side of the feature (e.g., opening).

An early but still popular form of covering for architectural features is the Venetian blind wherein a plurality of vertically extending cord ladders support parallel horizontally extending vanes or slats in a manner such that the vanes that inhibit light transmission can be pivoted about their longitudinal axes to control the amount of light permitted to transmit through the feature (e.g., opening), and the entire blind can be moved between an extended position where it extends across at least a portion of the height of the architectural feature and a retracted position where the vanes are accumulated in a vertical stack adjacent to the top of the architectural feature.

Vertical blinds are also available where the slats or vanes that inhibit light transmission extend vertically and are suspended at their upper ends for pivotal movement about their longitudinal vertical axes. The entire blind can be extended across the architectural opening or retracted adjacent to one or more sides of the opening in a vertical stack.

SUMMARY OF THE DISCLOSURE

The present disclosure provides a covering for an architectural feature, which may preferably be a retractable covering, and more preferably a flexible roll-up covering, for windows and the like. The disclosure is directed to a person of ordinary skill in the art and the purpose and advantages of the architectural covering will be set forth in, and be apparent from the written description, as well as from the appended drawings.

A covering in accordance with the disclosure may include a roller, a head rail, a flexible light-controlling subassembly, a bottom rail, and a movement mechanism. The flexible light-controlling subassembly may include a plurality of vanes and at least two generally vertical support members, preferably elongate tapes, for moving the vanes. The plurality of vanes may include non-cellular vanes and/or multi-layered cellular vanes, and in one embodiment includes at least one multi-layered vane having at least two vane layers configured and arranged to form a tube having a horizontally extending space or cell there between when the vane is in at least an expanded position. In one embodiment the vane layers may be connected, coupled, or attached to each other, directly or indirectly, along their side edges so that the vane layers may separate in the middle region to form an elongate, generally longitudinal sleeve or tube having a space or cell in between the layers. In one embodiment, the vane layers may be connected, coupled, or attached, directly or indirectly, to the support members, e.g., tapes, to facilitate forming the generally elongate, longitudinal sleeve or tube having the spacing or cell. The generally elongate longitudinal sleeve or tube may have any cross-sectional shape. One or more elongate stiffeners may be associated with, disposed along, attached, connected, and/or coupled, directly or indirectly, to the vanes, and preferably two elongate stiffeners are associated with each vane. In one embodiment, the elongate stiffener(s) may be angled and relatively thin.

The roller may be associated with preferably coupled, directly or indirectly, to the head rail and preferably configured to rotate relative to the headrail. The movement mechanism may be associated with or coupled, directly or indirectly, to the roller and preferably configured to rotate the roller. The support members, e.g. elongate tapes, may be associated with, and preferably coupled, directly or indirectly, to the roller. The plurality of vanes may be associated with, preferably coupled, directly or indirectly, to the support members, e.g. elongate tapes. The bottom rail may be associated with, preferably coupled, directly or indirectly, to the support members, e.g., elongate tapes, and/or one or more of the vanes. In an embodiment, the roll-up covering may operate by use of the movement mechanism to rotate the roller to move the flexible subassembly. The flexible subassembly may move from a rolled configuration, where it is wrapped about the roller and does not block any light, to being in a partially unrolled, collapsed configuration that may inhibit, diffuse, and/or block transmission of some of the light or view-through, to being in a fully-unrolled configuration where the subassembly is no longer wrapped about the roller but instead is fully hanging from the roller, to a fully-unrolled expanded configuration where one or more of the vanes have pivoted so that its middle portion is in a substantially horizontal position which may allow at least some light to pass through gaps that form between adjacent vanes, and may inhibit, diffuse, and/or block transmission of some of the light and view through.

BRIEF DESCRIPTION OF THE DRAWINGS

The various aspects, features, and embodiments of the architectural covering as disclosed herein will be better understood when read in conjunction with the drawings provided. Embodiments are provided in the drawings for the purposes of illustrating aspects, features, and/or various embodiments of the window covering, but the claims should not be limited to the precise arrangement, structures, subassemblies, features, embodiments, aspects, and devices shown, and the arrangements, structures, subassemblies, features, embodiments, aspects, and devices shown may be used singularly or in combination with other arrangements, structures, subassemblies, features, embodiments, aspects, and devices. The drawings are not necessarily to scale and are not in any way intended to limit the scope of this invention, but are merely presented to illustrate and describe various embodiments, aspects, and features of the architectural covering, which may be used singularly or in combination, or with additional features, aspects, or embodiments.

FIG. 3A is a perspective view of an embodiment of a roll-up architectural covering in a fully rolled-up configuration.

FIG. 3B is a perspective view of an embodiment of a roll-up architectural covering in a partially-unrolled, collapsed configuration.

FIG. 3C is a perspective view of an embodiment of a roll-up architectural covering in a fully-unrolled, collapsed configuration.

FIG. 3D is a perspective view of an embodiment of a roll-up architectural covering in a fully-unrolled, partially-expanded configuration.

FIG. 3E is a perspective view of an embodiment of a roll-up architectural covering in a fully-unrolled, fully-expanded configuration.

FIG. 4A is a schematic representation of an end view of an embodiment of a roll-up cellular architectural covering in a fully-unrolled, collapsed configuration.

FIG. 4B is a schematic representation of an end view of an embodiment of a roll-up cellular architectural covering in a fully-unrolled, partially-expanded configuration.

FIG. 10A is a top perspective view of an embodiment of a substantially planar elongate stiffener.

FIG. 10B is a cross-sectional view of the elongate stiffener of FIG. 10A taken along plane B-B as shown in FIG. 10A.

FIG. 10C is a top perspective view of an embodiment of a curved elongate stiffener.

FIG. 10D is a cross-sectional view of the elongate stiffener of FIG. 10C taken along plane B-B as shown in FIG. 10C.

FIG. 10E is a top perspective view of an embodiment of an angled elongate stiffener.

FIG. 10F is a cross-sectional view of the elongate stiffener of FIG. 10E taken along plane B-B as shown in FIG. 10E.

DETAILED DESCRIPTION

Figure 1:
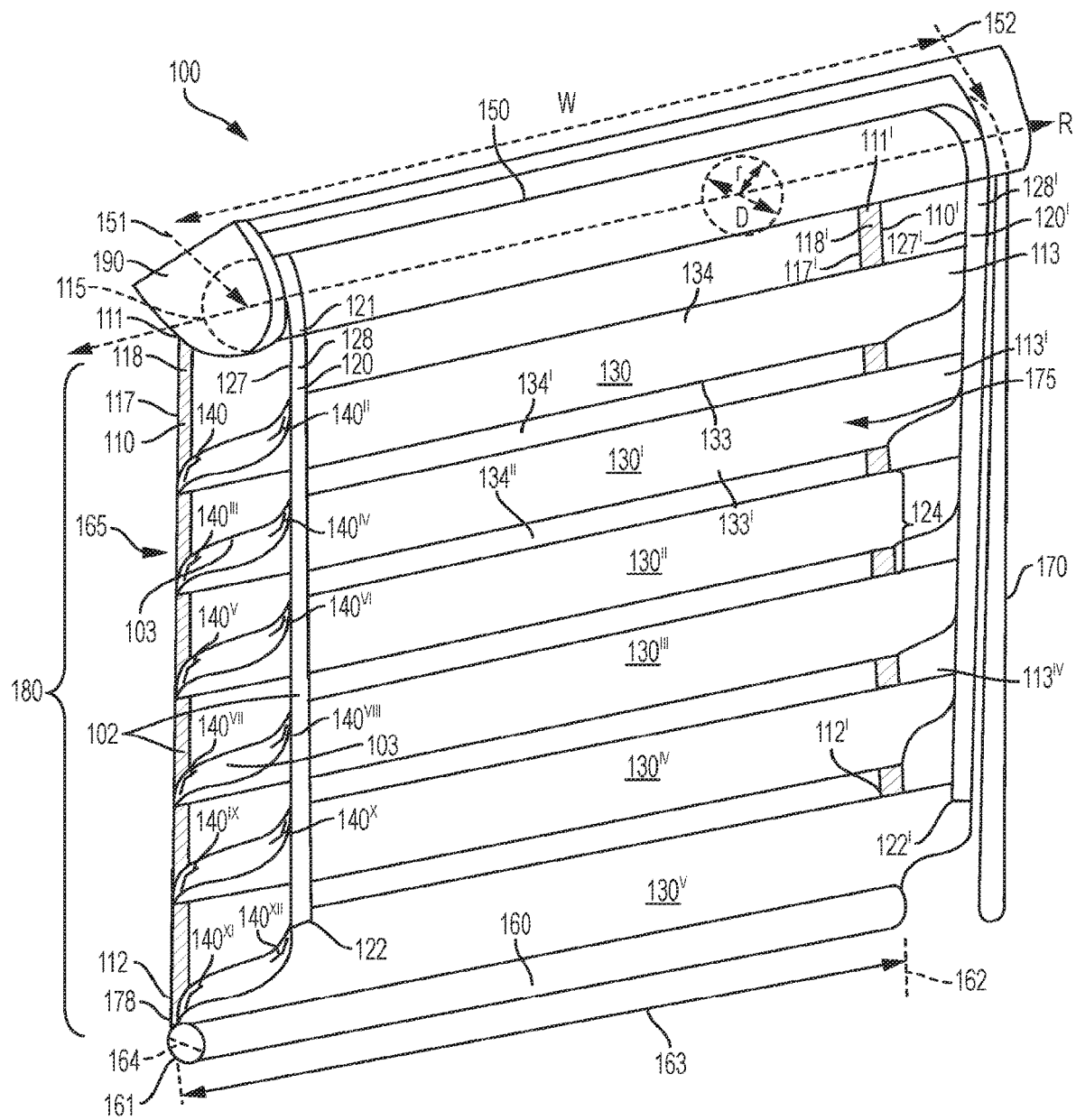
FIG. 1 is a front-side perspective view of an embodiment of a roll-up cellular covering having a subassembly in an unrolled and expanded configuration.

In the following detailed description, numerous details are set forth in order to provide an understanding of an architectural covering, its method of operation, and method of manufacture. The description is directed to one of ordinary skill in the art and in circumstances, well-known methods, procedures, manufacturing techniques, components, and assemblies have not been described in detail so as not to obscure other aspects or features of the architectural covering. However, it will be understood by those skilled in the art that different and numerous embodiments of the architectural covering, and its method of operation and manufacture may be practiced without these specific details, and the claims and inventions should not be limited to the embodiments, subassemblies, or the specified features or details specifically described and shown herein.

Accordingly, it will be readily understood that the components, aspects, features, elements, and subassemblies of the embodiments, as generally described and illustrated in the figures herein, can be arranged and designed in a variety of different configurations in addition to the described embodiments. It is to be understood that the covering may be used with many additions, substitutions, or modifications of form, structure, arrangement, proportions, materials, and components, which may be particularly adapted to specific environments and operative requirements without departing from the spirit and scope of the invention. The following descriptions are intended only by way of example, and simply illustrate certain selected embodiments of an architectural covering. For example, while the architectural covering is shown and described in examples with particular reference to its use as a window covering to control light and view-through, it should be understood that the covering would have other applications as well. In addition, while the detailed description in many examples is generally directed to a covering formed of elongate tapes forming generally vertical supporting elements, and/or multi-layered vanes of a particular structure, it will be appreciated that the disclosure and teachings have application to other materials forming the vertical support elements, such as, for example, strips, sheets, sheers, panels and combinations thereof, as well as other constructions and structures for the multi-layered vanes. The claims appended hereto will set forth the claimed invention and should be broadly construed, unless otherwise clearly indicated to be more narrowly construed to exclude embodiments.

Throughout the present application, reference numbers are used to indicate a generic element or feature of the covering. The same reference number may be used to indicate elements or features that are not identical in form, shape, structure, etc., which provide similar functions or benefits. Additional reference characters (such as primes, letters and superscript) may be used to differentiate similar elements or features from one another. It should be understood that for ease of description the disclosure does not always refer to or list all the components of the covering, and that a singular reference to an element, member or structure, e.g., a singular reference to a tape, an inner tape, an outer tape, a vane, a strip, a slat, a pocket, a stiffener, a vertical support element, or a horizontal vane element may be a reference to one or more such elements, unless the context indicates otherwise.

In the following description of various embodiments of the architectural covering, it will be appreciated that all directional references (e.g., proximal, distal, upper, lower, upward, downward, left, right, lateral, longitudinal, front, rear, inner, outer, back, top, bottom, above, below, vertical, horizontal, radial, axial, clockwise, and counterclockwise) are only used for identification purposes to aid the reader's understanding of the present disclosure unless indicated otherwise in the claims, and do not create limitations, particularly as to the position, orientation, or use in this disclosure. Features described with respect to one embodiment may be applied to another embodiment, whether or not explicitly indicated.

Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings may vary.

The present disclosure features a covering for controlling the transmission of light through an architectural feature, which may include window openings, doors, archways and the like. The covering in one embodiment may include a subassembly; the subassembly may be flexible and suitable of rolling up around a roller. The subassembly has at least a first outer support member, e.g., elongate tape, and a first inner support member, e.g., elongate tape, the support members each may have a first end, a second end, a length extending between the first end and second end, and a lateral width perpendicular to its length. In one embodiment, the support members are elongate tapes, and the width of at least one or both of the first inner and first outer elongate tapes are substantially less than the length of each slat, and in other embodiments, the sum of the widths (e.g., the combined width) of all the inner support members or the sum of the widths (e.g., the combined width) of all the outer support members are less than, preferably substantially less than, the length of each slat. The subassembly, also referred to as a panel, may include a plurality of slats, each slat having at least one slat layer with a first end, a second end, an inner longitudinal edge, an outer longitudinal edge, a length extending between the first end and second end, and a width extending between the inner longitudinal edge and the outer longitudinal edge. The support members and slats are preferable flexible and may be made from any material including fabrics and films. In one embodiment, the vanes are made from translucent, semi-opaque, and/or opaque materials.

In one embodiment, the plurality of slats may be disposed or extend between and spaced apart along the respective lengths of the first outer support member and first inner support member, and each slat may be oriented with its length transverse to the respective lengths of the first outer support member and first inner support member. Movement of the inner and outer support members may be configured to manipulate the slats between multiple positions. In one aspect, at least one slat is a multilayered slat having an inner slat layer and an outer slat layer, with the inner slat layer and outer slat layer having inner and outer longitudinal edges that coincide with the longitudinal edges of the multilayered slat. The inner layer and outer layer may be coupled along their respective inner and outer longitudinal edges, with the inner and outer slat layers being separable from each other between their coupled longitudinal edges to form a cell space circumscribed by the inner slat layer and the outer slat layer when the at least one multilayer slat is in at least one of its multiple positions.

In one embodiment, the width of at least one of the first inner and first outer elongate tapes is substantially less than the length of each slat. In other embodiments, the length of each slat is greater than, preferably substantially greater than, the sum of the widths of all the inner support members, e.g., elongate tapes, or is greater than, preferably substantially greater than, the sum of the widths of all the outer support members, e.g., elongate tapes, and in embodiments, the length of each slat may be greater than, preferably substantially greater than, whichever sum is greater. In a further aspect, the width of both the first inner and outer elongate tapes are at least 5 times less than the length of each slat, and in a still further aspect the widths of first inner elongate tape and first outer elongate tape are from about 5 mm to about 100 mm. The width of the elongate tapes is generally a function of aesthetics, and may be a function of strength and thickness of the tapes, and support of the plurality of vanes.

In another embodiment, the width of at least one of the inner and the outer slat layer of the at least one multilayered slat is greater than the width of the other of the inner and outer slat layer of that same multilayered slat. In further embodiments, the inner slat layer and outer slat layer of the at least one multilayered slat are coupled to each other by ultrasonic cut seal. In one embodiment, a fold line forms along at least one of the inner longitudinal edges and the outer longitudinal edges of the inner and outer slat layers of the at least one slat. The widths of the inner slat layer and the outer slat layer of the at least one slat may be as small as about 1 inch and as large as about 6 inches. The widths of the slat layer may be influenced by aesthetics, size of the covering, and material selection.

The subassembly in another embodiment further includes a second inner elongate tape and a second outer elongate tape, the second inner elongate tape laterally spaced apart from the first inner elongate tape along the length of at least one of the slats a distance of at least about (6) inches, additionally, or alternatively, the second outer elongate tape may be laterally spaced apart from the first outer elongate tape along the length of at least one of the slats a distance of at least about six (6) inches. The separation distance between adjacent elongate tapes may be as low as about six (6) inches to as much as twenty-four (24) inches, and may vary therebetween in increments of about ¼ of an inch. The separation distance of the tapes is influenced by the desired aesthetics, including the support of the vanes between the adjacent tapes.

In yet other embodiments, the first inner elongate tape further has an inner face defined by a surface defined by the length and the width of the first inner elongate tape, an outer face defined by a surface defined by the length and the width of the first inner elongate tape, the inner face and outer face separated by the thickness of the first inner elongate tape, and additionally, or alternatively, the first outer elongate tape further has an inner face defined by a surface defined by the length and the width of the first outer elongate tape, an outer face defined by a surface defined by the length and the width of the first outer elongate tape, the inner face and the outer face separated by the thickness of the first outer elongate tape. The inner slat layer in an embodiment may have an inner face defined by a surface defined by the length and the width of the inner slat layer, and an outer face defined by an opposite surface defined by the length and the width of the inner slat layer, and the outer slat layer may have an inner face defined by a surface defined by the length and the width of the outer slat layer, and an outer face defined by an opposite surface defined by the length and the width of the outer slat layer, where the inner slat layer and the outer slat layer may be arranged and configured so that the outer face of the inner slat layer is oriented and faces toward the inner face of the outer slat layer and the outer face of the outer slat layer of the at least one multi-layered slat is connected to the inner face of the first outer elongate tape, and the inner face of the inner slat layer of the at least one multilayered slat is connected to the outer face of the first inner elongate tape.

In further embodiments, the inner slat layer of the at least one multilayered slat further includes an inner edge region extending along the inner longitudinal edge of the inner slat layer and defined by the length of the inner slat layer and a first portion of the width of the inner slat layer, an outer edge region extending along the outer longitudinal edge of the inner slat layer and defined by the length of the inner slat layer and a second portion of the width of the inner slat layer, and a middle region extending between the inner edge region and the outer edge region and defined by the length of the inner slat layer and a third portion of the width of the inner slat layer. In one aspect, the outer slat layer of the at least one multilayered slat further includes an inner edge region extending along the inner longitudinal edge of the outer slat layer and defined by the length of the outer slat layer and a first portion of the width of the outer slayer, an outer edge region extending along the outer longitudinal edge of the outer slat layer and defined by the length of the outer slat layer and a second portion of the width of the outer slat layer, and a middle region extending between the inner edge region and the outer edge region and defined by the length of the outer slat layer and a third portion of the width of the outer slat layer that is greater than both the first portion of the width and the second portion of the width of the outer slat layer. In another aspect, the inner edge region of the inner slat layer is parallel to the length of the inner elongate tape, and the outer edge region of the outer slat layer is parallel to the length of the outer elongate tape. In one embodiment, at least one of the inner edge region and the outer edge region of the inner slat layer and the inner edge region and the outer edge region of the outer slat layer is stiffened by at least one of the group consisting of a stiffening agent and at least one elongate stiffener. Preferably, at least one of the inner edge region of the inner slat layer and the outer edge region of the outer slat layer is stiffened by at least one of the group consisting of a stiffening agent and at least one elongate stiffener.

The subassembly may have an expanded configuration when the inner elongate tape and outer elongate tape move away from and are separated from each other, and in one embodiment the inner elongate tape and outer elongate tape may be laterally separated by a distance about equal to the diameter of the roller. When the subassembly is in the expanded configuration, the middle regions of the inner and outer slat layers may be substantially horizontal, are transverse to the lengths of the first inner and first outer elongate tapes, and are separated by a distance to form a space between the outer face of the inner slat layer and the inner face of the outer slat layer that extends the length of the multi-layered slat, the distance between the middle regions of the inner and outer slat layers being greater than the width of a first elongate stiffener. The covering optionally may further comprise a roller having a first end and a second end, a width extending between the first end and the second end, a rotational axis, a diameter, and radius of curvature, wherein the first end of at least the first outer elongate tape and the first end of at least the first inner elongate tape are associated with the roller, and rotation of the roller about the rotational axis thereof moves the subassembly with respect to the roller, and the subassembly may be configured to roll-up around the roller.

The subassembly in embodiments may further include one or more (at least a first) elongate stiffeners having a first end, a second end, a length extending between their first ends and the second ends, and a thickness perpendicular to its length, where the length of the stiffener is at least 100 times larger than its thickness, and the elongate stiffener is associated with at least one slat layer and positioned so its length extends in the direction of the longitudinal edge of that slat layer. The elongate stiffeners may be formed of plastic material. In embodiments, the thickness of the first elongate stiffener is as small as about 6 thousandths of an inch to as large as about 30 thousandths of an inch, and may vary there between in increments of a thousandth of an inch, and the width of the first elongate stiffener is as small as about 3/16 of an inch to as large as about 1 inch and may vary therebetween in increments of 1/32 of an inch. In embodiments, the inner slat layer and the outer slat layer of the at least one multilayered slat is formed of translucent materials, and the first elongate stiffener is formed of a material more transparent than the translucent materials of at least one of the inner and outer slat layers. In other aspects, multiple elongate stiffeners are associated with one or more of the multilayered slats and positioned so the length of the stiffener is in the direction of the longitudinal edge of the slat layers.

One or more of the elongate stiffeners may include a first side, a second side, and a width extending between the first side and the second side and perpendicular to its length; and a first surface defined by the length and the width of the elongate stiffener, and a second surface defined by the length and the width of the elongate stiffener, the first surface and second surface separated by the thickness of the elongate stiffener; and where the width of the stiffener is at least 5 times larger than its thickness, and the stiffener is associated with the at least one multilayered slat along and in the direction of the longitudinal edge of at least one of the slat layers. The first elongate stiffener may be an angled stiffener having a crease extending between the first end and second end of the first elongate stiffener, a first face defined by a portion of the first surface between the first side and the crease, a second face defined by a portion of the first surface between the second side and the crease, a third face defined by a portion of the second surface between the first side and the crease, a fourth face defined by a portion of the second surface between the second side and the crease, and an angle between the first face and the second face of less than 180 degrees. In some embodiments, the crease of the first elongate angled stiffener has a peak or apex on the second surface, and the first elongate angled stiffener has a crown height extending between the peak or apex of the crease and a longitudinal edge of the first elongate angled stiffener between the first surface and at least one side of the first elongate angled stiffener, where the crown height is from as low as about 20 thousandths of an inch to as high as about 100 thousandths of an inch. The crown height may vary therebetween in increments of about five (5) thousandths of an inch.

In further embodiments, the subassembly moves from a collapsed configuration to an expanded configuration when the first inner elongate tape and first outer elongate tape move away from each other such that the inner elongate tape and outer elongate tape are separated by a distance greater than the width of the first elongate stiffener, and when the subassembly is in the expanded configuration the inner slat layer has a curved shape.

In some embodiments, at least a portion of the fourth face of the first angled stiffener is attached to the inner slat layer of the at least one multilayered slat and the third face is not attached to either slat layer. Alternatively, at least a portion of the second face of the first angled stiffener is attached to the inner slat layer of the at least one multilayered slat and the second face is not attached to either slat layer.

The subassembly in an embodiment may have more than one elongate stiffener and the second elongate stiffener may be associated with the at least one multi-layered slat and is positioned so that its length extends in the direction of the longitudinal edges of the slat layers. The second elongate stiffener has a first side, a second side, a width extending between the first side and the second side and perpendicular to its length, a first surface defined by the length and the width of the second elongate stiffener, and a second surface defined by the length and the width of the second elongate stiffener, the first surface and second surface separated by the thickness of the second elongate stiffener. The width of the second elongate stiffener may be at least 5 times larger than its thickness. The second elongate stiffener in an embodiment is an angled stiffener having a crease extending between the first end and second end of the second elongate stiffener, a first face of the first surface extending between the first side and the crease, a second face of the first surface extending between the second side and the crease, an angle between the first face and the second face of less than 180 degrees (more preferably as low as about 120 degrees and as high as about 170 degrees, and may vary therebetween in increments of five (5) degrees), a third face of the second surface extending between the first side and the crease, and a fourth face of the second surface extending between the second side and the crease. In some embodiments, at least a portion of the third face of the second angled elongate stiffener is attached to the outer slat layer of the at least one slat and the fourth face of the second elongated stiffener is not attached to the outer slat layer.

In yet further embodiments, the at least one slat further includes at least a first stiffener pocket sheet having a first end, a second end, a first longitudinal edge, a second longitudinal edge, a length extending between the first end and the second end, and a width extending between the first longitudinal edge and the second longitudinal edge, where the first stiffener pocket sheet is coupled to at least one slat layer of the at least one multi-layered slat and forms at least a first stiffener pocket between that slat layer and the first stiffener pocket sheet, and at least a portion of the first elongate stiffener is positioned within the first stiffener pocket. The first stiffener pocket sheet in one embodiment is formed of a substantially transparent material, which in an embodiment may be polyethylene.

The first stiffener pocket sheet may be coupled to the inner slat layer of the at least one multilayered slat or alternatively may be coupled to the outer slat layer of the at least one multilayered slat. The first stiffener pocket sheet may include a fold line extending between the first end and the second end, and a contact area between the fold line and the first longitudinal edge of the first stiffener pocket sheet, where the contact area of the first stiffener pocket sheet is coupled to the inner slat layer of the at least one multilayered slat with the inner longitudinal edge of the inner slat layer closer to the first longitudinal edge of the first stiffener pocket sheet than the fold line of the first stiffener pocket sheet.

In some embodiments, the first elongate stiffener which is at least partially positioned within the first stiffener pocket includes a first side, a second side, and a width extending between the first side and the second side and perpendicular to its length, a crease extending between the first end and second end of the elongate stiffener, a first face defined by a portion of the first surface between the first side and the crease, a second face defined by a portion of the first surface between the second side and the crease, and an angle between the first face and the second face of less than 180 degrees. The first elongated stiffener may be positioned so that the angle of the first elongate stiffener is oriented towards the first stiffener pocket sheet, or alternatively, the first elongated stiffener may be positioned so that the angle of the first elongate stiffener is oriented towards the inner slat layer of the at least one multi-layered slat. The first stiffener pocket sheet in embodiments may further include a fold line extending between the first end and the second end of the first stiffener pocket sheet; and an overlap area between the fold line and the second longitudinal edge of the first stiffener pocket sheet, where the overlap area of the first stiffener pocket sheet is attached to the outer slat layer of the at least one multilayered slat with the outer longitudinal edge of the outer slat layer closer to the second longitudinal edge of the first stiffener pocket sheet than the fold line of the first stiffener pocket sheet, and forming a stiffener pocket between the inner slat layer and the first stiffener pocket sheet. The elongate stiffener may be positioned so that the angle of the first stiffener within the stiffener pocket is oriented towards the stiffener pocket sheet.

In yet another embodiment, a covering for controlling transmission of light through an architectural opening is featured that includes a subassembly, the subassembly including: at least a first outer elongate tape having a first end, a second end, a length extending between the first end and second end, and a lateral width perpendicular to its length; at least a first inner elongate tape having a first end, a second end, a length extending between the first end and second end, and a lateral width perpendicular to its length; a plurality of slats, each slat having a first end, a second end, an inner longitudinal edge, an outer longitudinal edge, a length extending between the first end and second end and, a width extending between the inner longitudinal edge and the outer longitudinal edge, the plurality of slats disposed between and spaced apart along the respective lengths of the first outer elongate tape and first inner elongate tape, each slat oriented with its length transverse to the respective lengths of the first outer elongate tape and first inner elongate tape, movement of the inner and the outer elongate tapes configured to manipulate the slats between multiple positions; and a plurality of relatively thin elongate stiffeners, each elongate stiffener having a first end, a second end, a first side, a second side, a length extending between the first end and the second end, and a width extending between the first side and the second side; where at least one of the plurality of slats is a multilayered slat having an inner slat layer, an outer slat layer, and multiple elongate stiffeners; where the inner slat layer having an inner face defined by a surface defined by the length and the width of the inner slat layer, and an outer face defined by an opposite surface defined by the length and the width of the inner slat layer; the outer slat layer having an inner face defined by a surface defined by the length and the width of the outer slat layer, and an outer face defined by an opposite surface defined by the length and the width of the outer slat layer; the inner slat layer and the outer slat layer each configured and connected to the other along their respective inner and outer longitudinal edges with the outer face of the inner slat layer and the inner face of the outer slat oriented and facing towards each other; the inner slat layer and outer slat layer arranged and configured to be separable in regions between their inner and outer longitudinal edges to form a space between the outer face of the inner slat layer and the inner face of the outer slat layer that extends the length of the multilayered slat when the multilayered slat is in at least one of the multiple positions; a first elongate stiffener is associated with and positioned so the length of the first elongate stiffener extends in the direction of the longitudinal edges of the inner slat layer, and a second elongate stiffener is associated with and positioned so the length of the second elongate stiffener extends in the direction of the longitudinal edges of the outer slat layer; and the inner slat layer of the at least one multilayered slat is attached to the first inner elongate tape, and the outer slat layer of that multilayered slat is attached to the first outer elongate tape.

In still further embodiments, a covering for controlling transmission of light through an architectural feature is disclosed, the covering including a subassembly, where the subassembly has at least a first outer elongate tape having a first end, a second end, a length extending between the first end and second end, and a lateral width perpendicular to its length; at least a first inner elongate tape having a first end, a second end, a length extending between the first end and second end, and a lateral width perpendicular to its length; a plurality of slats, each slat having a first end, a second end, an inner longitudinal edge, an outer longitudinal edge, a length extending between the first end and second end and, a width extending between the inner longitudinal edge and the outer longitudinal edge, the plurality of slats disposed between and spaced apart along the respective lengths of the first outer elongate tape and first inner elongate tape, each slat oriented with its length transverse to the respective lengths of the first outer elongate tape and first inner elongate tape, movement of the inner and the outer elongate tapes configured to manipulate the slats between multiple positions; and at least a first relatively thin elongate stiffener. The elongate stiffener in one embodiment having a first end, a second end, a first side, a second side, a length extending between the first end and the second end, and a width extending between the first side and the second side, where at least one of the plurality of slats is a multilayered slat and the multilayered slat includes an inner slat layer, an outer slat layer, and at least a first stiffener pocket sheet; the inner slat layer having an inner face defined by a surface defined by the length and the width of the inner slat layer, and an outer face defined by an opposite surface defined by the length and the width of the inner slat layer; the outer slat layer having an inner face defined by a surface defined by the length and the width of the outer slat layer, and an outer face defined by an opposite surface defined by the length and the width of the outer slat layer; the inner slat layer and the outer slat layer each configured and connected to the other with the outer face of the inner slat layer and the inner face of the outer slat oriented and facing towards each other; the first stiffener pocket sheet having a first end, a second end, a first longitudinal edge, a second longitudinal edge, a length extending between the first end and the second end, and a width extending between the first longitudinal edge and the second longitudinal edge; the first stiffener pocket sheet connected to at least one of the inner and outer slat layers and forming at least a first stiffener pocket between at least one of the inner and outer slat layers and the stiffener pocket sheet; and the inner slat layer and the outer slat layer arranged and configured to be separable in regions between their inner and outer longitudinal edges to form a space between the outer face of the inner slat layer and the inner face of the outer slat layer that extends the length of the multilayered slat when the multilayered slat is in at least one of the multiple positions, and further where at least a portion of the first relatively thin elongate stiffener is positioned within the first stiffener pocket.

In some embodiments, a covering for controlling the transmission of light through an architectural feature is disclosed, the covering having a flexible subassembly, the subassembly including at least a first outer flexible elongate tape having a first end, a second end, a length extending between the first end and second end, and a lateral width perpendicular to its length; at least a first inner flexible elongate tape having a first end, a second end, a length extending between the first end and second end, and a lateral width perpendicular to its length; a plurality of flexible multilayered slats, each multilayered slat having at least one slat layer with a first end, a second end, an inner longitudinal edge, an outer longitudinal edge, a length extending between the first end and second end, and a width extending between the inner longitudinal edge and the outer longitudinal edge, the plurality of multilayered slats disposed between and spaced apart along the respective lengths of the first outer elongate tape and first inner elongate tape, each slat oriented with its length transverse to the respective lengths of the first outer elongate tape and first inner elongate tape, movement of the inner and the outer elongate tapes configured to manipulate the slats between multiple positions; and at least a first elongate stiffener having a first end, a second end, a length extending between the first end and the second end, and a thickness perpendicular to its length, the length of the stiffener being at least 5 times greater than its thickness, the at least one elongate stiffener associated with at least one slat layer and positioned so the length of the stiffener extends in the direction of the longitudinal edges of that slat layer; where the at least one slat layer is formed of a translucent material, and the at least one elongate stiffener is formed of a plastic, transparent material.

General Operation of the Covering

The present disclosure relates to coverings for architectural feature, which include, for example, window openings, doorframes, archways, and the like. The coverings are particularly useful for windows to provide an aesthetic look, and desirable shading and privacy. The coverings generally comprise a flexible light controlling subassembly or panel that may include one or more generally horizontal vane elements coupled to generally vertical front and rear support members or elements. For ease of reference purposes, when used, for example, as a window covering, the generally vertical support member that faces the exterior of the window opening or is on the exterior or rear side 165 of the window covering is referred to as the "rear" or "back" support member, element or tape, while the support member that faces the interior of the opening or is on the interior or front side 175 of the window covering is referred to as the "front" support member, element, or tape.

The generally horizontal vane elements, also referred to as slats or vanes herein, preferably have a different light transmissivity or translucence than the generally vertical support elements, and the vane and support elements together control view-through and light transmission through the covering. That is the vane elements generally tend to be translucent, semi-opaque, opaque, or blackout, which may inhibit or block light and/or view-through. The tapes may be transparent, translucent, semi-opaque, opaque, or blackout materials. In one embodiment, the front and rear support elements are elongate tapes and the vane elements are translucent, semi-opaque, opaque, or blackout materials so when the vanes are moved, e.g., pivoted, between open and closed positions, the light transmissivity of the covering may be varied.

The shape and angular orientation of the vanes can be controlled by moving the vertical support elements laterally and vertically with respect to each other. In particular, the vane elements can be adjusted, for example, rotated or pivoted, between different angular orientations from extending generally horizontal and substantially perpendicular to the vertical support elements permit light and view-through, to extending generally vertical and substantially parallel to the vertical support elements in order to inhibit or block light and view-through, and thus provide and control light and view-through, or shading effect and/or privacy to the area.

The generally vertical support elements may include, for example, tapes, strips, sheets, panels, or the like, and combinations of these elements. Each vertical support element may be formed of a single or multiple piece(s) of material. The support elements may be relatively thin and have length (height) and width. The vertical support elements in certain embodiments are generally and typically much thinner than their length or width, and their width is generally and typically much smaller than their length. The length of the vertical support elements generally and typically corresponds to and is associated with the height or vertical dimension of the covering or panel, while the width of the vertical support elements generally and in the embodiments disclosed herein typically is much smaller than the width of the covering or panel (and the length of the vanes). For ease of reference, and without intent to limit the disclosure or claims, the vertical support elements sometimes will be referred to in the disclosure as elongate tapes.

The vane elements may be formed from and include, for example, strips, tapes, panels, and the like. Each vane element may be formed from a single or multiple piece(s) of material, e.g., strips, tapes, or panels. The vane elements may be formed of materials that are relatively thin and generally much thinner than their length and/or width. Preferably, but not necessarily, the vane elements have a length that is larger than its width. The length of the vane elements generally corresponds to the width of the covering. For ease of reference, the vane elements sometimes will be referred to in the disclosure as slats or vanes.

The front and rear vertical support elements, and the vane elements, may be substantially any type of material, and are preferably formed from flexible materials, such as, but not limited to, textiles, fabrics, and films, including knits, wovens, non-wovens, and so on. For ease of reference, the subassembly or combination of vertical support elements and vanes sometimes will be referred to as a light-controlling panel, subassembly, or "panel" for short. In one exemplary embodiment, the generally horizontal vane elements are made from generally flexible, soft materials, and the generally vertical support elements are also made from generally flexible, soft materials, and together form a generally flexible subassembly or panel for the covering. In embodiments, the vertical support elements and/or vanes may be formed of relatively stiff or rigid materials interconnected together to form flexible vertical support elements and/or vanes.

Referring generally to FIG. 1, the covering 100 generally includes a headrail 190, a roller 150 associated with the head rail, a light-controlling panel 180, a bottom rail or weight 160, and a mechanism 170 to operate the covering (e.g., a mechanism to rotate the roller) and control the amount, quality, and manner in which light is blocked or transmitted through the panel, as well as the aesthetic look and appearance of the panel. The roller 150, also sometimes referred to as a head tube or roller tube, may be associated with and/or connected to a headrail 190, and a movement mechanism 170 is preferably associated with and connected to the roller 150. The roller 150 supports and is connected, directly or indirectly, to a top end of panel 180, and bottom rail 160 is connected, directly or indirectly, to a bottom end of the panel 180. Movement of the roller 150, for example rotation, may roll-up or unroll the subassembly 180 from the roller 150.

Figure 2:
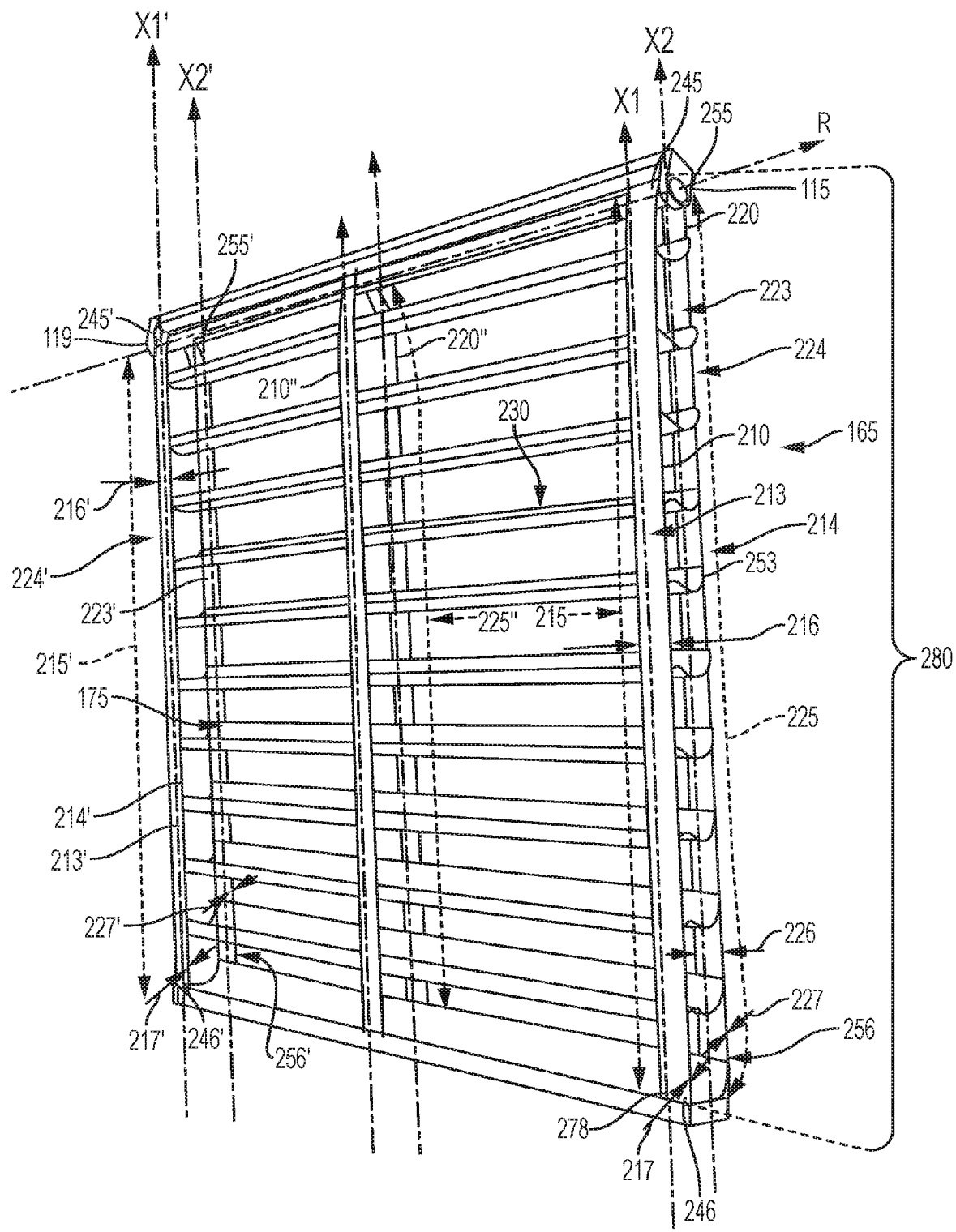
FIG. 2 is a front-side perspective view of another embodiment of a roll-up covering having a subassembly in an unrolled and expanded configuration.

More specifically, as shown in FIG. 1, the roller 150 has a rotational axis "R" about which the roller rotates, a width "W" between a first end 151 and a second end 152, a diameter "D", and a radius of curvature "r". In one embodiment, the diameter of the roller may be as low as about 0.5 inches to as large as 3 inches, and preferably may be about 1.5 inches. Preferably, the subassembly 180 is connected to the roller 150 via at least one elongate tape 102. More preferably, as shown in FIG. 2, the first or top ends 245 of one or more of the inner elongate tapes 210 are associated with, preferably coupled to, the roller 250 such that the longitudinal axes X1 of the inner elongate tape(s) are oriented generally orthogonally with respect to the rotational axis "R" of the roller 150. In further embodiments, the first or top ends 255 of one or more outer elongate tapes 220 may also be associated with, preferably coupled to, the roller 250 such that the longitudinal axes X2 of the outer elongate tape(s) 220 are oriented generally orthogonally with respect to the central rotational axis "R" of the roller 250. As referenced herein, the "inner" features and structures of the panel or covering are those that are located radially inward from the "outer" features when the panel is rolled up around the roller, such that, for example, an "inner" elongate tape is located radially inward from the outward or "outer" elongate tape when the subassembly is rolled up around the roller. The tape(s) may be coupled directly or indirectly to the roller by an adhesive, such as glue, stitching, an insert, and/or other methods of attachment including methods now known and methods developed in the future. Rotation of the roller facilitates deploying, expanding, collapsing, and rolling-up the subassembly to control the light transmitted through the architectural covering and the architectural feature as described below.

Head rail 190 as shown in FIG. 1 may support the roller 150 and panel 180 over an architectural feature and thus may generally correspond to the shape and dimensions (e.g., width) of the top of the architectural feature. In one embodiment, a headrail 190 may be associated with the roller 150 preferably to permit and to facilitate rotation of the roller 150. The roller 150 may be rotatably connected, directly or indirectly, to the headrail 190 by methods now known or methods developed in the future. The headrail 190 typically houses the roller 150 and at least a portion of the roller 150 may be mounted within the headrail 190. The headrail 190 may be a decorative piece or assembly, which may hide the roller 150, and may hide the roller 150 and the entire subassembly 180 from plain view when the subassembly 180 is in the fully rolled-up configuration. The headrail may also hide or make less visible any brackets used for mounting the covering 100. The headrail may also hide the gap between the roller 150 and/or the roller in combination with the rolled-up flexible, light controlling subassembly on the one hand, and the structure of the architectural feature on the other hand. The headrail may be configured such that any gap between the roller and the architectural feature is hidden by at least a portion of the headrail in order to block any light that may otherwise pass through such a gap.

A bottom rail or weight 160 may be associated with and/or coupled directly or indirectly to bottom end 178 of the subassembly 180. The bottom rail provides weight to the bottom of the architectural covering, and, in so doing, applies tension to the subassembly to keep the subassembly substantially taut while the subassembly is partially or fully unrolled from the roller, which facilitates deployment and rolling-up of the subassembly while also acting to restrict the roller from being over rotated when the subassembly is being rolled-up.

Bottom rail 160 may have a first end 161, a second end 162, a length 163 defined between first end 161 and second end 162, and a width perpendicular to the length 163. In some embodiments, the bottom rail may be cylindrical (FIG. 1), and in other embodiments, the bottom rail may be rectangular (FIG. 2) and/or curved, but additional sizes, shapes, configurations, and constructions are contemplated. Bottom rail 160 may be associated with and/or coupled, directly or indirectly, to the second or bottom end of one or more inner elongate tapes, or may be associated with and/or coupled, directly or indirectly, to the second or bottom end of one or more outer elongate tapes, and may in embodiments be coupled, directly or indirectly, to one or more inner elongate tapes and one or more outer elongate tapes. In some embodiments, as shown in FIG. 1, bottom rail 160 is coupled, directly or indirectly, to the second ends 112, 112' of inner elongate tapes 110, 110'. Alternatively, bottom rail 160 may be coupled, directly or indirectly, to vane 130. In some embodiments, bottom rail 160 is coupled, directly or indirectly, to a portion, or the entirety, of one or more longitudinal edges of one or more vanes. The bottom rail may be coupled, directly or indirectly, to the inner longitudinal edge of the bottom most vane, and may be coupled, directly or indirectly, to the lowermost point where the vane is coupled, directly or indirectly, to the elongate tapes, preferably to the inner elongate tapes. The bottom rail may be coupled, directly or indirectly, to the subassembly, or a portion of the subassembly (e.g., the inner elongate tapes), by an adhesive such as glue, stitching, an insert, tacking, stapling, pinning, and/or other methods of attachment including methods now known and methods developed in the future. The bottom rail may be configured and coupled, directly or indirectly, to the panel in a manner similar to the bottom rail shown and described in U.S. Patent application No. 62/414,248, entitled "Covering for Architectural Features, Related Systems and Methods of Manufacture", which was filed on Oct. 28, 2016, and which application is incorporated by reference in its entirety herein.

Movement mechanism 170 is preferably associated with subassembly 180 to adjust the position and configuration of the subassembly 180. Movement mechanism 170 also may be associated with and/or connected with headrail 190, and may also be at least partially housed in and/or mounted in headrail 190. Movement mechanism 170 controls the retraction and extension of light-controlling panel 180 to control the height of the covering in the opening and hence the nature and quality of the light transmitted through, the view-through characteristics, and the shape and aesthetic appeal of the panel 180. Movement or control mechanism 170 may also control the angular orientation of horizontal vane elements 130 with respect to inner and outer elongate tapes 110, 120 that also may affect the nature and quality of the light transmitted through, the view-through characteristics, and the shape and aesthetic appeal of panel 180.

It will be appreciated that the following description of the movement mechanism and the retraction and extension of the illustrated subassembly 180 is provided with reference to use of a roller to facilitate retraction and extension of subassembly 180. However, other arrangements known to those of ordinary skill in the art, for example, stacking or other folding arrangements may instead be used to control movement of the light-controlling panel without departing from the scope and spirit of the present disclosure, as the particular movement or mechanism is not critical to aspects of the disclosure. Rotation of the roller can be achieved by utilizing any desired movement mechanism, including those now known to those of ordinary skill in the art, such as a pull chain or cord for rotating the roller (as shown in FIG. 1 as 170), a tethered wand, a pulley, a direct-drive arrangement, a gear train, a clutch mechanism, a pumping mechanism, a powered mechanism, and/or a control device in wireless communication with a powered mechanism and those movement mechanisms to be developed in the future. Movement mechanism 170 for controlling the rotation of roller 150 may include an electric motor, which may be controlled manually by a user, or through a pre-programmed or programmable software control unit, such as a remote control.

The movement mechanism may rotate the roller in order to retract, extend, or angularly orient the vanes of the light-controlling panel. As shown in FIGS. 3A-3E, rotation of the roller 350 in a first direction (indicated by the arrow in FIGS. 3A-3E) causes the light controlling subassembly 380 to unroll from the roller 350, and rotation of the roller 350 in a second direction opposite the first direction causes the subassembly 380 to roll-up around the roller 350.

The light-controlling panel generally moves between (1) a fully retracted position where the panel is completely wrapped about the roller (FIG. 3A), (2) to a fully extended position where the panel is completely unwound from the roller and generally extends in the opening with the vertical support elements generally parallel and adjacent to each other with the vanes located and extending between the support elements and oriented substantially vertical and generally parallel to the vertical support elements (FIG. 3C), (3) to a fully extended, fully expanded position where the middle portion of the vanes extend between, are generally traverse to, spaced apart along the lengths of, and preferably substantially horizontal to the vertical support elements (FIG. 3E). Further configurations of the illustrated embodiment include a partially-unrolled, collapsed configuration (FIG. 3B), and a fully-unrolled extended, partially-expanded configuration (FIG. 3D).

In particular, the angular orientation and movement of the vanes in a roll-up type window covering comprised of vanes extending horizontally between vertical support tapes is effected by relative movement of the front and rear tapes. Subassembly 380 of FIGS. 3A-C is unrolled by rotation of roller 350 in a first direction (indicated by the arrow in FIGS. 3A-C), where the front and rear tapes 310, 330 move vertically in unison which lowers subassembly 380 from a fully rolled-up retracted configuration (FIG. 3A), to a fully-unrolled, collapsed configuration (FIG. 3C) where subassembly 380 extends in the window opening.

After the window covering is fully extended and unrolled from roller 350 (shown in FIG. 3C), movement of front tape 310 and/or rear tape 320 laterally or horizontally away from each other such as upon further rotation of roller 350 in a first direction as shown by the arrow in FIG. 3C increases the separation of tapes 310, 320, and further moves front and rear tapes 310, 320 in vertically opposite directions (shown in FIGS. 3D-E as 307), and expands flexible subassembly 380. This vertically opposite directional movement 307 of front and rear tapes 310, 320 relative to each other pivots or rotates vanes 330 between tapes 310, 320. The relative vertical motion 307 of the tapes can be any combination of vertical motion by one or more of front tapes 310 and back tapes 320 relative to each other. This pivoting or rotational movement of vanes 330 changes the angular orientation of vanes 330 relative to front and rear tapes 310, 320 and, with other factors, may control the shape of vanes 330. Relative movement of the tapes such as upon rotation of roller 350 in a direction opposite the first direction (opposite the arrow in FIG. 3) causes subassembly 380 to collapse, and further rotation of roller 350 will roll up subassembly 380 around roller 350.

Figure 4C:
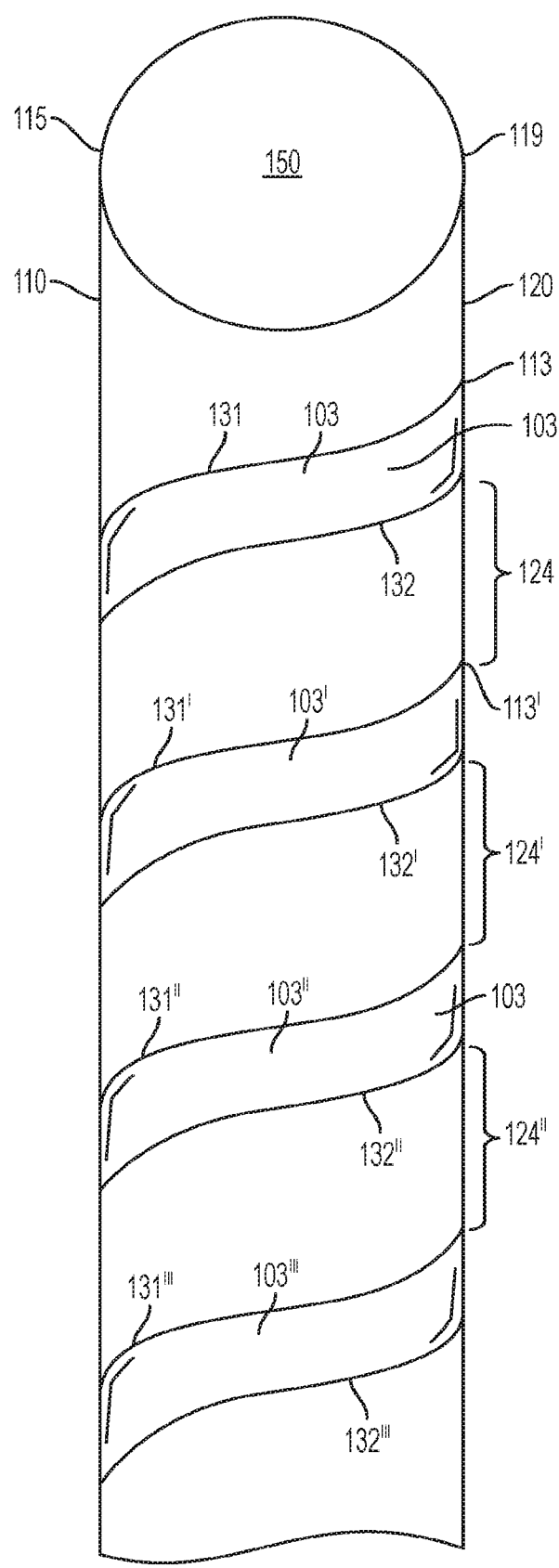
FIG. 4C is a schematic representation of an end view of an embodiment of a roll-up cellular architectural covering in a fully-unrolled, fully-expanded configuration.
Figure 4D:
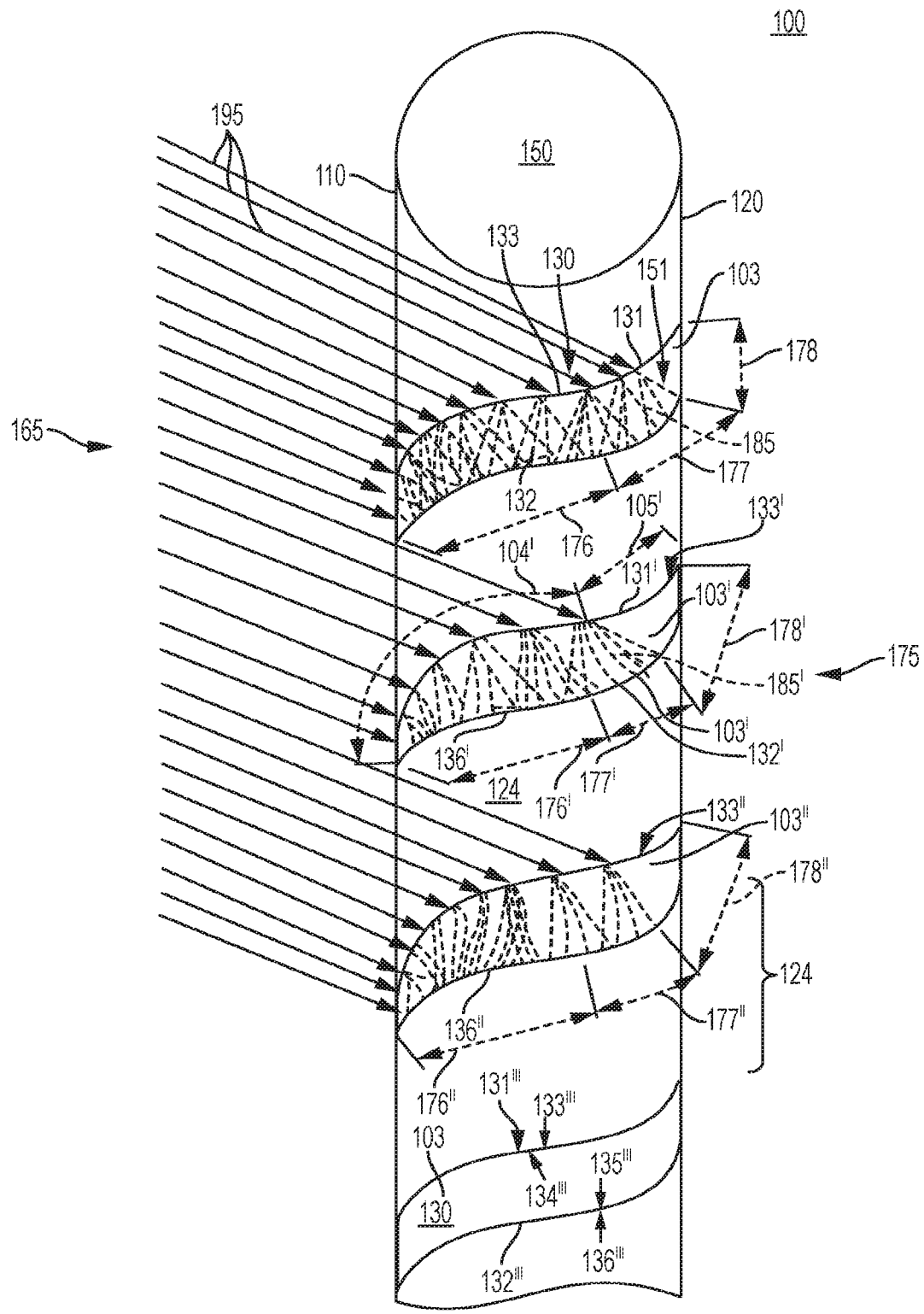
FIG. 4D is a schematic representation of an end view of an embodiment of a roll-up cellular architectural covering in a fully-unrolled, fully-expanded configuration with light interacting with the covering.

The vanes of the window covering may be oriented in different angular orientations or directions and are operable to move in different directions and orientations to affect the amount of light transmitted through the panel and/or the visibility through the covering. In a first orientation, referred to as the shading orientation, and shown in FIGS. 1 and 4A-D, top ends 113 of vanes 130 are associated with, and/or coupled, directly or indirectly, to front tapes 120 and are operable to extend between positions where the middle portion of vanes 130 extend traverse to and generally horizontal toward rear tapes 110 (shown in FIGS. 1, 4C) and/or extend from front tapes 120 downwards towards rear tapes 110 (shown in FIGS. 4A and 4B). Generally, in a shading orientation the end of the vane that is associated with, preferably coupled, directly or indirectly, to the rear tapes is at the same height or lower than the end of the vane coupled, directly or indirectly, to the front tapes. As such, in the shading orientation, depending upon the angular orientation of vanes 130, light entering covering through the rear side 165 may encounter vane elements 130, which depending upon the opacity of the vane material, may block or diffuse light that passes through the covering 100 as shown in FIG. 4D.

In a second orientation, referred to as the privacy orientation and shown in FIGS. 2 and 3A-E, top ends 253, 353 of vanes 230, 330 extend from, and may be coupled directly or indirectly to, rear tapes 220, 320 and vanes 230, 330 are operable to extend between positions where the middle portion of vanes 230 extend generally horizontal toward front tapes 210 (shown in FIG. 2), and/or extend from rear tapes 320 downward towards the front tapes 310 (shown in FIG. 3B-3D). Generally, in a privacy orientation the end of the vane that is coupled, directly or indirectly, to the front tapes is at the same height or lower than the end of the vane coupled, directly or indirectly, to the rear tapes. In this privacy orientation, light 195 entering the covering through the exterior side 165 from a light source (the sun) may be transmitted through the gaps or spaces 324 between vanes 330 (shown in FIG. 3E). In the privacy orientation, a person under the window and looking up may be blocked from viewing into the room due to vanes 230, 330 blocking their view-through, such as shown with vanes 330 in the position shown in FIG. 3D.

One skilled in the art can also appreciate that the light-controlling and view-through characteristics including the angular orientation and relative movement of the vanes in a roll-up type covering, will be affected by whether the tapes extend from a rear side 115 of the roller or a front side 119 of the roller and/or the direction of rotation of the roller. If the window covering rolls up and down from front side 119 of roller 150 as shown in FIGS. 1 and 4A-D, then when tapes 110, 120 are first retracted from a fully extended position, front tapes 120 will be raised vertically upward as rear tapes 110 lower and move laterally toward front tapes 120 (compare FIGS. 4C, 4B, 4A). This relative movement of front and rear tapes 120, 110 rotates or pivots vanes 130 to change their angular orientation relative to front and rear tapes 120, 110 so that vanes 130 extend downward from front tape 120 toward rear tape 110 and are in a shading orientation as shown in FIGS. 4A and 4B. If the window shading, however, rolls up-and-down from rear side 115 of the roller as shown in FIGS. 2, 3A-E, then when the tapes are first retracted from a fully extended and expanded position, rear tapes 220, 320 will be raised vertically upward as front tapes 210, 310 lower and move laterally toward rear tapes 220, 320. This movement of the front and rear tapes rotates or pivots the vanes to change their angular orientation relative to front and rear tapes 210, 310 so that the vanes extend downward from rear tapes 220, 320 towards front tapes 210, 310 and are in the privacy orientation as shown in FIGS. 2, 3C-D. Accordingly, the direction of roll-up about the roller, whether clockwise or counter-clockwise and/or around the front side or rear side of the roller, at least influences whether the covering operates in a shading or privacy orientation.

Overview of the Subassembly

Subassembly 180 in the embodiment illustrated in FIG. 1 preferably includes one or more tapes 102, including one or more inner elongate tapes 110, 110', etc. (generally, inner elongate tapes 110), one or more outer elongate tapes 120, 120', etc. (generally, outer elongate tapes 120), a plurality of vanes 130, 130, etc. (generally, vanes 130), and a plurality of optional stiffeners 140, 140", etc. (generally, stiffeners 140). It will be appreciated that the subassembly 180 may include more or fewer inner elongate tapes 110, outer elongate tapes 120, vanes 130, and or stiffeners 140 than shown. Subassembly 180 is connected to roller 150 (when present) by first ends 111, 111' of inner elongate tapes 110, 110', and first ends 121, 121', of outer elongate tapes 120, 120'. Bottom rail 160 is connected to subassembly 180 by at least one of second ends 112, 112' of inner elongate tapes 110, 110'.

The tapes and vanes preferably are formed of relatively flexible material, while stiffeners 140 preferably are relatively rigid compared to the vanes as in embodiments they form a connecting element or bridge to support the flexible vane material between the tapes to inhibit or prevent sagging, or excessive sagging of the vanes between the tapes. It will be appreciated that stiffeners 140 may also be flexible, in the sense that they may be bendable without breaking, but have sufficient structural integrity and/or rigidity to support vanes 130 with minimal, if any, sagging of vanes 130.

Construction of the Support Members

The subassembly may include one or more support members, each support member having a first end, and a second end defining a support member length there between, a support member width perpendicular to its length, and a support member thickness perpendicular to its length and the width. The one or more support members each have a longitudinal axis "X" extending in the direction of the length of the respective support member. Each support member has an inner face, and an outer face preferably opposite to the inner face, each face defined by the surfaces defined by the width and the length of the respective support member, and separated by the thickness of the respective support member. In one enhancement, one or more of the support members may be elongate tapes.

More particularly, as illustrated in FIG. 2, subassembly 280 includes one or more outer elongate tapes 220 having a length 225 between first end 255 and second end 256, a longitudinal axis "X2" preferably centrally located, a width 226 perpendicular to the length 225 (and preferably when associated with the roller extending in a direction parallel to rotational axis "R"), and a thickness 227 extending in a direction perpendicular to both the length and the width of outer elongate tape 220. First outer elongate tape 220 has an outer face 224 (not visible in FIG. 2) and an inner face 223 preferably opposite to the outer face, each inner and outer face 223, 224 defined by a surface defined by length 225 and width 226 of first outer elongate tape 220, and separated by thickness 227 of first outer elongate tape 220. Subassembly 280 further includes one or more inner elongate tapes 210, having a length of 215 between first end 245 and second end 246, a longitudinal axis X1 preferably centrally located, a width 216 perpendicular to length 215 (and preferably when associated with the roller extending in a direction parallel to rotational axis "R"), and a thickness 217 extending in a direction perpendicular to both the length and width of the inner elongate tape 210. Inner elongate tape 210 has an outer face 214 (not visible in FIG. 2) and an inner face 213, each inner and outer face 213, 214 defined by a surface defined by the length and width of first inner elongate tape 210, and separated by thickness 217 of first inner elongate tape 210.

Subassembly 280 in the embodiment of FIG. 2 further includes a second outer elongate tape 220' and a second inner elongate tape 210' having lengths, widths, longitudinal axes, inner faces and outer faces as described above for first inner elongate tape 210 and outer elongate tape 220.

In addition, it should be appreciated that any number of elongate tapes may be included in embodiments of an architectural covering and the number of inner elongate tapes may be equal to or different from the number of outer elongate tapes. Various numbers of elongate tapes may be utilized depending upon the functional and aesthetic characteristics desired. For example, in one such embodiment, as illustrated in FIG. 2, a third inner elongate tape 210" and a third outer elongate tape 220" are provided between the first and second inner and outer elongate tapes. The first and second inner and outer elongate tapes illustrated in FIG. 2 are located at, proximate of, or adjacent to the ends of the vanes, and a third outer tape, a third inner tape, or both a third inner and third outer tape may exist between, for example equidistant between, the inner and outer tapes. In an alternative embodiment, a third outer elongate tape exists between, for example equidistant between, the first and second outer elongate tapes, but no third inner elongate tape is utilized, such that there are three outer elongate tapes and two inner elongate tapes. Other arrangements of outer and inner elongate tapes may be used in the subassembly.

As illustrated in the embodiment of FIG. 1, the inner elongate tapes 110 and outer elongate tape 120 may be aligned laterally with each other along the width of the subassembly 180, such that they lay on top of each other when the subassembly 180 is rolled around the roller. In an alternative embodiment (not shown), one or more of the inner elongate tapes and one or more of the outer elongate tapes may be laterally displaced from each other along the width of the subassembly such that they are not aligned with each other, and as such do not roll on top of each other when the subassembly is rolled around the roller. As illustrated in FIGS. 1 and 2, the first outer elongate tape may be substantially parallel with the first inner elongate tape along the lengths of the tapes when the subassembly is in, and moving between, the various configurations. Preferably, the faces of the first inner elongate tapes are parallel to the faces of the first outer elongate tapes. More preferably, the outer face of an inner elongate tape and the inner face of an outer elongate tape face in opposite directions, more preferably towards each other. In alternative embodiments, the tapes can be configured not to have parallel faces along at least a portion of the lengths of the tapes.

When subassembly 380 is rolled around roller 350 (as illustrated in FIGS. 3A-3B), the length of inner tape 310, in order to make a complete revolution about roller 350 (circumscribe the roller), is less than the length of outer tape 320. To accommodate these different lengths of inner tapes 310 and outer tapes 320 when the subassembly rotates about roller 350, inner tapes 310 may buckle, and in some circumstances the inner tapes may overlap themselves. In one embodiment, inner tapes 310 may effectively fold upon themselves at one or more hinge segment(s) or line(s). For example, in one embodiment, one or more inner elongate tapes may define a plurality of collapsible hinge segments disposed along the length of the inner elongate tape. In some implementations, each hinge segment can be defined by one or more spaced apart crease lines extending along the width of the inner elongate tape. In some embodiments, the hinge segments can be performed into the inner elongate tape. For example, the inner tapes can be processed to be creased and heat set to form a preferential fold line. The buckling, overlapping, and/or folding of the inner tape may occur in order to shorten the length of inner tapes 310 when rolled up to compensate for being located radially inward from outer tapes 320, and permit subassembly 380 to roll up neater and more uniformly around roller 350. As such, the inner tapes may be configured to buckle, overlap, and/or fold along their lengths in order to decrease the length of the inner elongate tapes to a shortened "effective length" when the inner elongate tapes are rolled up around the roller. The inner tapes are further configured to unbuckle, and/or unfold in order to return the inner elongate tapes to their full length when the roll-up covering is unrolled from the roller. This buckling, folding and/or collapsible hinge segments results in the outer tape and the inner tape having the same, or substantially the same geometric length when the subassembly is unrolled, and at the same time effectively have different lengths when the subassembly is rolled up, thus permitting the roll-up covering to roll up more neatly and reliably.

The lateral spacing along the width of the subassembly between adjacent inner elongate tapes and/or adjacent outer elongate tapes may be varied depending upon the functional and aesthetic characteristics desired. In particular, if first and second inner elongate tapes are used, and first and second outer elongate tapes are used, the lateral spacing between the inner elongate tapes along the width of the subassembly may be set at any desired distance and the spacing between the outer elongate tapes along the width of the subassembly may be set at any desired distance, which may be equivalent distances or different distances.

As described, it should be understood that the lateral spacing (e.g., distance) between a pair of adjacent tapes along the width of the subassembly may be different from the spacing between another pair of adjacent tapes along the width of the subassembly. Preferably, the distance between a first inner elongate tape 110 and an adjacent second inner elongate tape 110', and/or the distance between a first outer elongate tape 120 and an adjacent second outer elongate tape 120' may be greater than 6 inches. More preferably, the distance between a first inner or outer elongate tape and a corresponding adjacent second inner or outer elongate tape is greater than 9 inches, greater than 12 inches, preferably greater than 18 inches, and may be 24 inches or greater depending upon the desired functional and/or aesthetic characteristics of the subassembly and the construction of the vanes.

The spacing of the vanes vertically along the lengths of the inner elongate tapes and outer elongate tapes may be varied depending upon the functional and aesthetic characteristics desired. More specifically, in one embodiment, the length of one or more, and preferably all, the outer elongate tapes may be the same as or longer between at least one pair of adjacent vanes than the length of the inner elongate tapes between the same pair of adjacent vanes, or vice versa, the length of the inner elongate tapes between at least one pair of adjacent vanes may be longer than the length of the outer elongate tapes between the same pair of adjacent vanes. If desired, at least one of, and preferably all of, the outer elongate tapes may have a length between a top most vane and the roller that is the same as or longer than the length of at least one of, and preferably all of, the inner elongate tapes between that top most vane and the roller. Alternatively, one or more, and preferably all of, the inner elongate tapes may have a length between a top most vane and the roller that is longer than the length of at least one of, and preferably all of, the outer elongate tapes between that top most vane and the roller. If desired, at least one of, and preferably all of, the inner elongate tapes may have a length between a bottom most vane and the bottom rail that is the same as or longer than the length of at least one of, preferably all of, the outer elongate tapes between that bottom most vane and the bottom rail, or vice-versa, one or more, and preferably all of, the outer elongate tapes may have a length between the bottom-most vane and the bottom rail that is longer than the length of at least one of, and preferably all of, the inner elongate tapes between that bottom most vane and the bottom rail. Changing the length of the inner tapes compared to the length of outer tapes between adjacent vanes, the roller and/or bottom rails may affect closure of the vanes to the bottom of the subassembly 180.

The elongate tapes are preferably made from a flexible material. For example, the flexible material can be selected from the group including films, fabrics, textiles, plastics, or other materials and combinations thereof. If desired, the textile may be a knit, woven, or non-woven material. The elongate tapes may also be transparent, translucent, or opaque. The elongate tapes may also be formed from a combination of relatively rigid materials interconnected by relatively flexible materials and/or multiple rigid materials interconnected together to form a flexible elongate tape that can bend and roll up about a roller.

The elongate tapes are generally selected to have a length so that the subassembly extends to cover the entire architectural feature, such as a structure and/or opening, from top to bottom. The elongate tapes may have widths, as low as about 5 mm and as large as about 100 mm, with variations therebetween in increments of about 1 mm. Preferably, widths of the elongate tapes are as low as approximately 8 mm and as large as approximately 25 mm, more preferably as low as approximately 8 mm and as large as approximately 12 mm. The width of the elongate tapes may be a function of aesthetics, construction, material, strength to support the window covering, and support of the vanes. An elongate tape preferably has a thickness as low as approximately 0.25 mm and as large as approximately 0.5 mm, with variations therebetween in increments of about 0.01 mm, although other thickness may be used and would be chosen based upon a number of factors, including the material used, its width and susceptibility to UV degradation.

Construction of the Vane Elements

As shown in FIGS. 1 and 4A-D, some embodiments of the covering may have a plurality of preferably independently formed multi-layered vanes 130 that form cells 103 that change volume depending upon the position of the vertical support members, e.g., vertical tapes 110, 120. Multilayered vanes 130 extend between and are spaced along the length of the respective vertical support members. A multi-layered vane configured to have a space (cell) between two or more layers when in one or more positions in the architectural covering, and preferably at least when the subassembly is in an expanded configuration, is referred to herein as a multi-layered cellular vane or "cellular vane," while a vane that is not multi-layered and/or does not form or have a space (cell) between the layers is referred to herein as a "non-cellular vane".

Figure 5A:
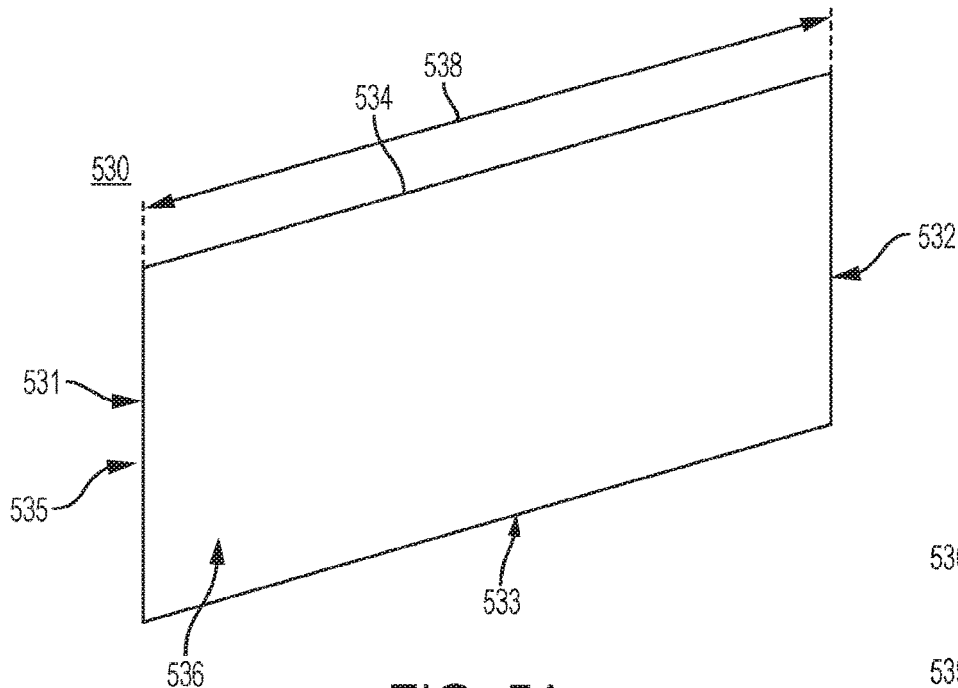
FIG. 5A is a perspective view of a sheet of flexible material.
Figure 5B:
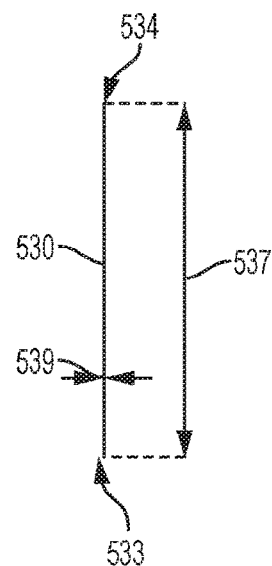
FIG. 5B is an end view of the sheet illustrated in FIG. 5A.
Figure 5C:
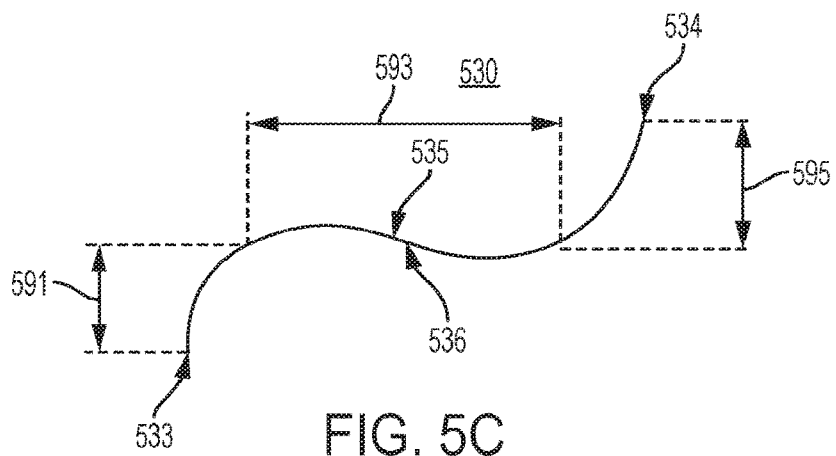
FIG. 5C is an end view of the non-cellular vane in a substantially expanded position.
Figure 5D:
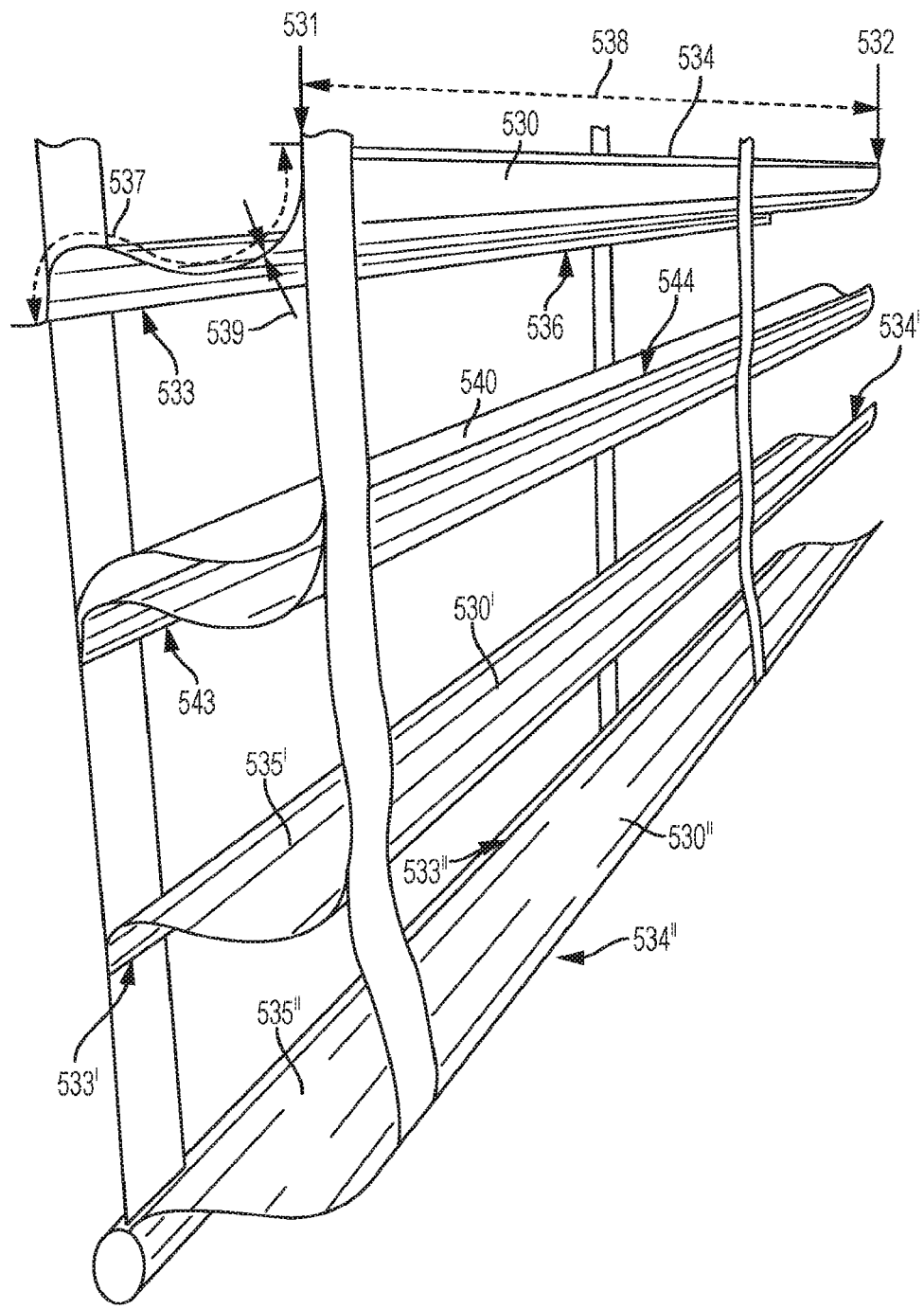
FIG. 5D is a perspective view of a portion of an additional embodiment of a flexible, light controlling subassembly, having both multi-layered cellular vanes and non-cellular vanes.
Figure 6A:
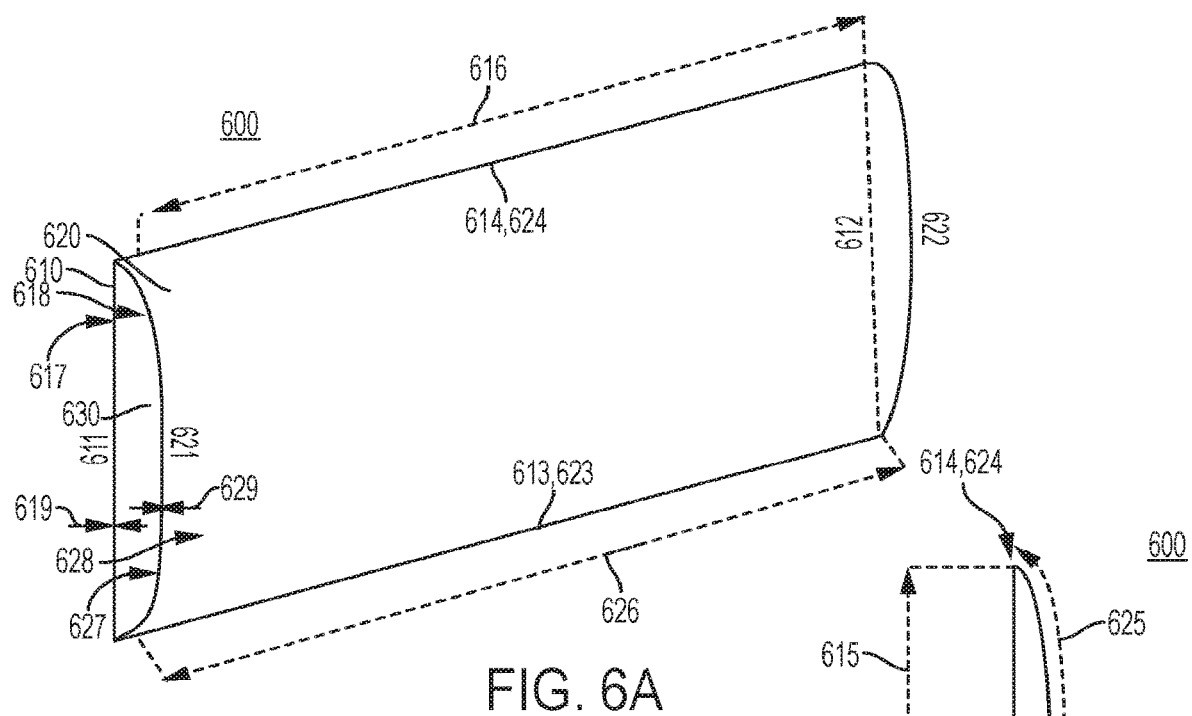
FIG. 6A is a perspective view of a multi-layered vane.
Figure 6B:
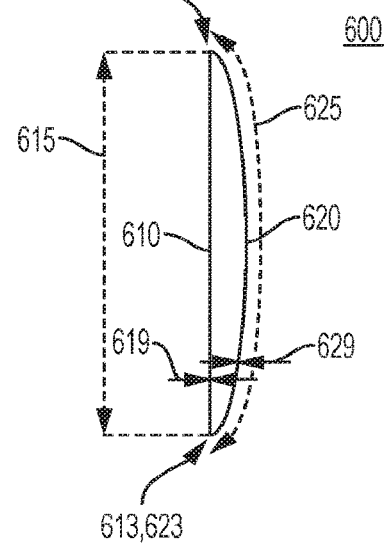
FIG. 6B is an end view of the multi-layered vane of FIG. 6A.
Figure 6C:
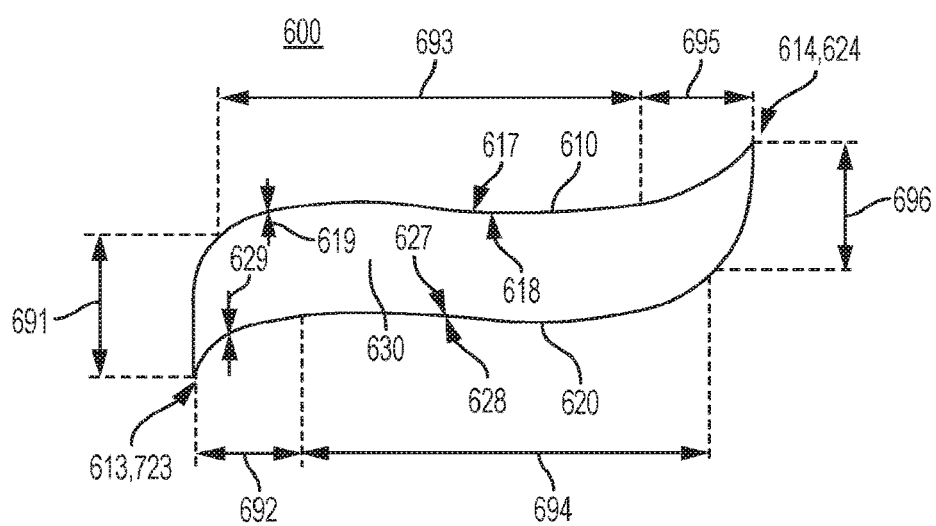
FIG. 6C is an end view of an embodiment of the multi-layered vane as illustrated in FIG. 6A and FIG. 6B in a substantially expanded position.
Figure 6D:
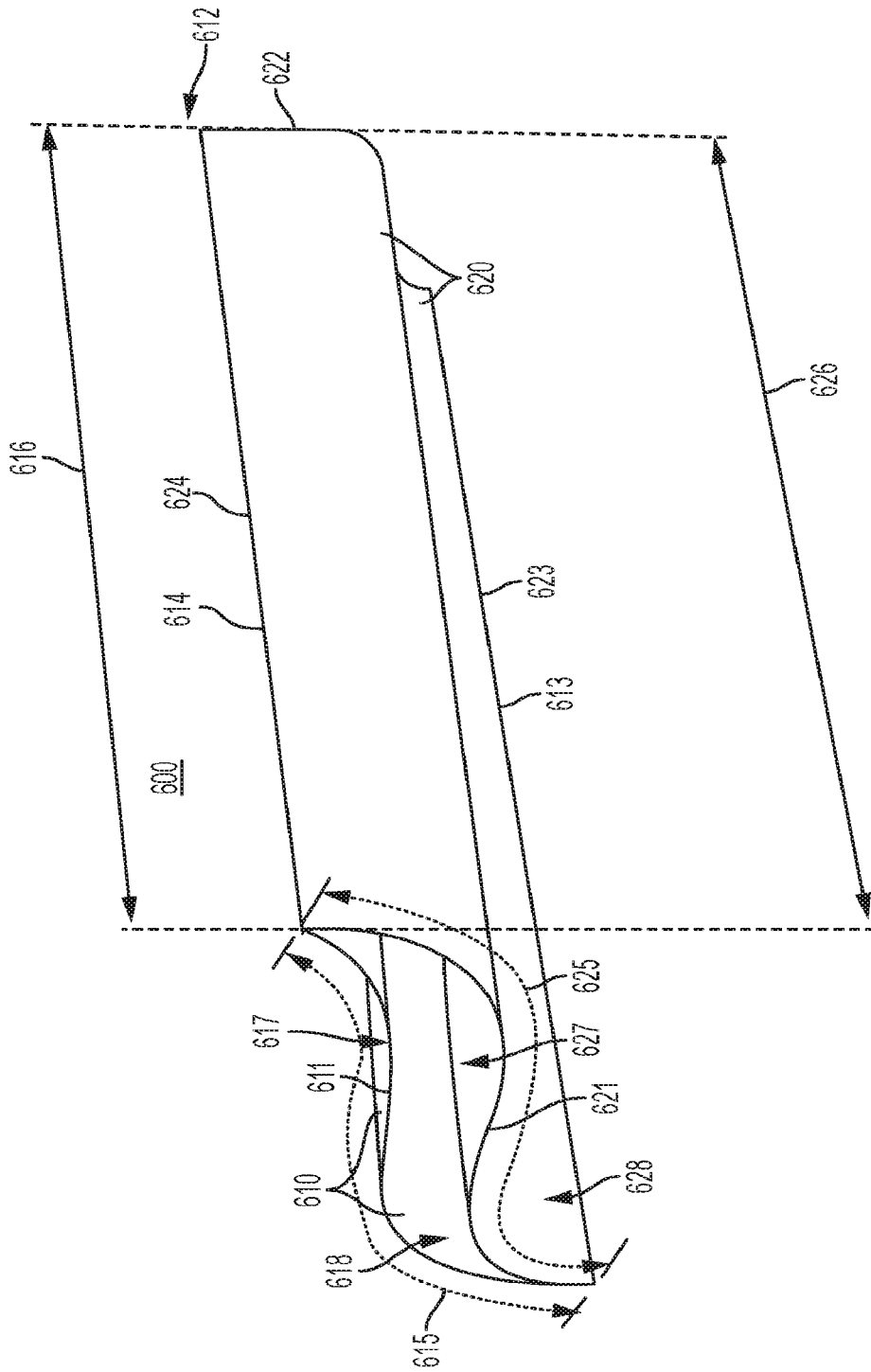
FIG. 6D is a perspective view of the embodiment of the multi-layered vane of FIG. 6C.

FIG. 1 shows a subassembly having all cellular vanes, while FIG. 2 shows a subassembly having non-cellular vanes. FIG. 5D shows a perspective view of a portion of an embodiment of a subassembly having both cellular and multiple non-cellular vanes. Non-cellular vane 530 may be formed of a single sheet of material having a length 538 extending between first and second ends 531, 532; a width 537 extending between side edges 533, 534; an inner face 535 and on outer face 536 defining a thickness 539. It will be readily understood by one of skill in the art that a non-cellular vane of a different shape, size, and/or configuration may be suitable for use within a subassembly of the architectural covering. For example, a non-cellular vane may be formed of multiple pieces of material aligned and coupled predominantly side to side, and/or a non-cellular vane may comprise multiple layers of material bonded or laminated together. FIG. 5D also shows a multi-layered cellular vane 540 which extends between side edges 543, 544.

The lateral and vertical movement of the tapes controls the shape and angular orientation of the multi-layered vanes 130. As a result, the vanes 130 change between a collapsed position or configuration (see FIG. 4A) and an open position or configuration where the vanes 130 form three-dimensional multi-layered cellular vane 130 (see FIGS. 1A, 4C-D) having a cell or space 103 between the layers of vane material.

In the collapsed position, each cell 103 may be substantially flattened and the materials forming the multi-layered vane 130 may be generally vertically and substantially parallel with each other and substantially parallel with each of the supporting elements 110, 120 as shown in FIG. 4A. In some embodiments, in the collapsed position, multi-layered vanes 130 may be adjacent to one another or partially overlap when in a closed position where the cells have collapsed or been flattened so that vanes 130 may form a pseudo-middle sheet positioned between the front and rear support elements, e.g., elongate tapes 120, 110 (see generally FIG. 4A). In some embodiments, there may be no overlap of the vanes and a gap may exist between adjacent vanes when the vanes are in a closed or collapsed position such that light or view through the gaps between adjacent vanes may be possible.

Depending upon the material(s) used and the construction of panel 180, cells 103 formed by the multi-layered vanes 130 may be opened or closed, and their volume changes, by movement of the support elements, e.g. tapes, which may vary the light transmission and view-through of the panel 180. In one or more embodiments, the multi-layered vanes may be constructed and configured, and are preferably coupled, directly or indirectly, to the support elements, e.g., elongate tapes, in a manner so that a cell is formed by the layers of the multi-layered vanes even when the vane is in is closed position, such as when the subassembly is in an unrolled-collapsed configuration shown in FIG. 4A. In embodiments, the larger width of outer vane layer 132 in a multi-layered vane and its construction may cause the outer vane layer 132 to be curved and slightly, laterally positioned or separated from the inner vane layer 131, while the inner vane layer 131 remains substantially straight and taut, to create a spacing 103 between the layers 131, 132 even when the subassembly is in a collapsed configuration. The spacing between the inner vane layer 131 and the outer vane layer 132 creates a cell 103, also referred to as a space. When the subassembly of an embodiment is fully unrolled, or partially unrolled, the subassembly may be in a collapsed-configuration, as illustrated in FIG. 4A, and the plurality of vanes may overlap each other in overlap areas "OA". Preferably, adjacent vanes overlap so that the vanes can control, inhibit, and/or, depending upon the vane materials, block the transmission of light through the subassembly. While the multi-layered vanes may be constructed to form cells even when the panel is in a collapsed configuration, the vanes may be configured in a manner where no or substantially no cellular spacing is formed in the multi-layered vane when the panel is in the collapsed configuration.

When multi-layered vanes 130 are positioned so that cells 103 are open or at least partially open, the middle portion of each vane 130 may be substantially perpendicular (see FIGS. 1, 4C-4D) or angled (See FIGS. 4A-4B) with respect to at least one of support elements, e.g., tapes, 110, 120. Multi-layered vanes 130, when open or partially open, preferably form walls that circumscribe and enclose space or cell 103 with open ends. Multi-layered vanes 130 may be separately coupled to the tapes 110, 120 adjacent and spaced from each other so that the vanes do not share a common wall or material with another vane. In other words, each of the vanes 130 is separate, independent, and spaced from its adjacent vanes 130 along the lengths of the vertical support elements, e.g., elongate tapes. Gaps or spaces 124 may be formed between adjacent vanes 130 such that, for example, adjacent multi-layered cellular vanes 130 are separated by and spaced along a length of front and rear supporting elements 120, 110. That is, gaps 124 may provide view through and permit light transmission through the panel without impinging on vanes 130. In an open configuration, the multi-layered vanes form cells that may provide insulation by trapping air in each cell. Further, the cells may reduce or diffuse shadows created on the exterior side 165 of the covering from being as noticeable on the interior side 111 of the covering. In other words, shadow lines due to light encountering the structure of the covering or an object (e.g., debris) on the exterior side thereof, whether or not at a particular angle of incidence, may be reduced as viewed from the interior side of the covering.

In an embodiment, as shown in FIG. 4B, when a subassembly is in an unrolled partially expanded configuration, the spacing (cell 103) between the inner vane layer 131 and the outer vane layer 132 expands or enlarges as the distance between the inner vane layer and outer vane layer grows. As described herein the inner vane layer is also referred to as an inner slat layer, and the outer vane layer is also referred to as the outer slat layer. In embodiments of an assembled covering, the inner slat or vane layer is located radially inward from its corresponding outer slat or vane layer when the panel subassembly is rolled up around the roller. The enlarged cell 103 diffuses light to a greater extent when in a partially expanded configuration than when the subassembly is in the fully un-rolled, collapsed configuration.

As shown in FIG. 4C, the subassembly can be further deployed from the partially expanded configuration into a fully expanded configuration by further rotation of the roller. When the subassembly is further expanded into a fully-expanded configuration, as shown in FIG. 4C, the elongate tapes separate further, which moves the vanes to a position where the multi-layered cellular vane 130 takes on a substantially double "S" shaped cross section, with the outer vane layer 132 and the inner vane layer 131 becoming further spaced apart, thereby enlarging the vane cell 103. When in a fully expanded configuration the plurality of vanes are fully separated from each other and gaps 124 form between outer vane layer 132 of higher vane 130 and the inner vane layer 131 of lower vane 130'. As a result, some direct light may not be blocked and passes through the gaps 124 between adjacent vanes, and thus passes through the subassembly, and through the architectural opening.

As illustrated in FIG. 4D, cell 103 formed in multi-layered cellular vane 130 when in a shading configuration disperses direct light 110 hitting inner face 133 of inner vane layer 131 into dispersed light 175 that is transmitted to the outer vane layer 132. This results in vane cell 103 diffusing the direct light 195, and, as a result, cell 103 minimizes shadows from debris, dust, bugs or other articles, and imperfections from appearing on the vane layer of the multi-layered vane that is furthest from the source of light, which in the embodiment of FIG. 4D is outer vane layer 132.

As illustrated in FIG. 4D, direct light 195 does not illuminate the entirety of inner faces 133, 133' of inner vane layers 131, 131'. As a result, a portion 105' of inner vane layer 131' is darker than the illuminated portion 104' of inner vane layer 131'. Due to the multiple layers of multi-layered vanes 130, 130', and the translucent nature of inner vane layer 131, 131', direct light 195 passing through the inner vane layers 131, 131' is dispersed and diffuses as it travels between the inner vane layer 131, 131' and the outer vane layer 132, 132' to become dispersed light 175, 175'. As a result of the dispersion of direct light 195 between the vane layers, dispersed light 175 illuminates inner surface 135 of outer vane layer 132, and outer surface 136 of the outer vane layer 132 has a visibly lighter portion 176 and that softly transitions in intermediate portion 177 to a darker portion 178, such that the transition between the light and dark areas on the outer vane layer 132 is spread out and appears much softer. If the vanes were not multi-layered vanes the transition between dark portion 178 and light portion 176 would be more abrupt and with greater contrast. The size of cell 103 (gap between inner and outer vane layers 131, 132) is proportionately related to the amount of diffusion the light undergoes, such that greater light diffusion will occur when the architectural covering 100 is in a fully-expanded, unrolled configuration (as shown in FIG. 4D) than when it is in a partially-expanded, unrolled configuration (as shown in FIG. 4B).

In one or more embodiments of the covering, one or more of the vanes may be multi-layered vanes that include generally a top strip or layer of flexible material and a bottom strip or layer of flexible material. The multi-layered vanes in one embodiment may be independently created and may be coupled, and in some embodiments are preferably coupled directly, to the tapes to form multi-layered vanes. The multi-layered vanes may be formed in a number of different manners and have varying constructions. Generally, the multi-layered vane forms a top strip and bottom strip, each strip having two ends defining a length and two side edges defining a width, and the side edges may be folded, coupled, creased, heat set, manipulated, and/or interconnected to form a flattened tube or multi-layered vane that will be coupled, directly or indirectly, to the supporting elements and may become a cellular vane.

As illustrated in FIGS. 6A-D, a cellular vane may include at least two vane layers forming a space (cell) there between when the multi-layered vane is in at least one position, and preferably at least when the layers of the multi-layered vane separate into a substantially expanded position. The vane layers may be configured and/or connected to form a fully intact multi-layered vane where the layers may separate to circumscribe completely a space.

Multi-layered vane 600 includes an inner or first vane layer 610 (also referred to as inner slat layer) and an outer or second vane layer 620 (also referred to as an outer slat layer). Inner vane layer 610 has a first end 611 and a second end 612, and a first longitudinal edge 613 and a second longitudinal edge 614 between first end 611 and second end

612. Inner vane layer 610 has a length 616 that extends between first end 611 and second end 612 (in the direction of the longitudinal edges 613, 614), and a width 615 that extends between longitudinal edge 613 and longitudinal edge 614 (in a direction transverse to, preferably generally perpendicular to, the edges 613, 614). Inner vane layer 610 has a thickness 619 perpendicular to length 616 and width 615. Inner vane layer 610 has an inner edge region 691 extending along first longitudinal edge 613, an outer edge region 695 extending along second longitudinal edge 614, and a middle region 693 extending between inner edge region 691 and outer edge region 695.

In FIGS. 6A-D, outer vane layer 620 has a first end 621 and a second end 622, and a first longitudinal edge 623 and a second longitudinal edge 624 between first end 621 and second end 622. Outer vane layer 620 has a length 626 that extends between first end 612 and second end 622 (in the direction of the longitudinal edges 614, 624), and a width 625 that extends between longitudinal edge 623 and longitudinal edge 624. Width 625 of outer vane layer 620 preferably is greater than width 615 of inner vane layer 610. Outer vane layer 620 has a thickness 629 perpendicular to length 626 and width 625. Outer vane layer 620 has an inner edge region 692 extending along first longitudinal edge 623, an outer edge region 696 extending along second longitudinal edge 624, and a middle region 694 extending between inner edge region 792 and outer edge region 696.

Inner vane layer 610 has an inner face 617 (FIG. 6C) and an outer face 618 (preferably opposite the inner face 617) preferably separated by the thickness 619 of inner vane layer 610. Outer vane layer 620 has an inner face 627 (not visible in FIGS. 6A-7D) and an outer face 628 (preferably opposite inner face 627) preferably separated by thickness of outer vane layer 620.

The vanes may be configured to "flex" or bend between their longitudinal edges to change from a generally flat orientation to a generally curved, e.g., substantially "S" cross-section, the "S" shape being preferable for aesthetic reasons, although other shapes are also contemplated. Such flexibility of vanes 130 can provide a versatile geometry for the roll-up covering. The subassembly may be configured to reside in or be biased to a collapsed configuration wherein the vanes are substantially collapsed such that they inhibit or block light from passing there through when the subassembly is initially unrolled from the roller.

As will be understood, the lengths of the inner and outer vane layers do not need to be the same, and neither do the widths or thicknesses of each vane layer, and it is likely, but not necessary, that the inner and outer vane layers are made from different materials, e.g., fabrics. Outer vane layer 620 and inner vane layer 610 are preferably dimensioned and configured such that a space 630 may exist between outer vane layer 620 and inner vane layer 610, thereby forming vane cell 630, preferably between inner face 627 of outer vane layer 620 and outer face 618 of inner vane layer 610 when the vane is in at least one position, and preferably at least when the vane is in a substantially expanded position. Width 625 of outer vane layer 620 being larger than width 615 of inner vane layer 610 may facilitate forming cell 630. Other factors that may affect the formation of cell 630 are the material out of which the vane layers 610, 620 are formed, the construction and/or attachment of the vane material(s) and/or layers, as well as the dimensions (thickness, width and length) of the vane layers. The elongate stiffeners described below and their interaction with the vanes will also affect the formation of cell 630.

Preferably, cell 630 extends the length of the vane layers and, in one embodiment, the vane layers may be connected, coupled, or attached to each other, directly or indirectly along their respective longitudinal edges to form an elongate, generally longitudinal sleeve or tube. In one embodiment, the vane layers may be connected, coupled, or attached to each other, directly or indirectly, in proximity of the tapes to facilitate forming the generally elongate, longitudinal sleeve or tube having the spacing or cell. The generally elongate longitudinal sleeve may have any cross-sectional shape.

The vane layers are preferably formed from a flexible material. The vanes layers may be formed of one or more of fabrics, textiles, knits, wovens, non-wovens, plastics, films, and any other material having the desired light transmitting or inhibiting properties, and the desired flexibility and strength characteristics. Materials of different colors, and/or different patterns may be used for the vanes. Opaque, translucent, or transparent materials may be used for the vane material. Different materials may be used to form an outer vane layer and an inner vane layer of a single multi-layered vane. For example, one vane layer may be formed of a translucent textile while the other vane layer is formed of a different material, for example metal or plastic, that is opaque or relatively transparent. A vane layer may also be formed from multiple materials.

In one embodiment the covering may be designed to substantially block light from being transmitted through the architectural opening in a closed configuration, e.g., room-darkening, hereinafter for the sake of convenience but not to limit the disclosure also referred to as "black out", by utilizing multi-layered vanes. For example, the strip or layer that faces the exterior or rear may be black or darker in color than the other strip or layer. The rear-facing strip, for example, may be a black out material that substantially blocks any light from passing through the material and the other front strip can be made from a translucent material. By utilizing a multi-layer vane having a black strip facing the rear or outside and a translucent strip facing the front, any defects in the rear black-out strip, or any light transmitted past the rear layer will be diffused by the front facing layer. In the privacy orientation or version, the black-out or darker strip facing the rear is the bottom strip. In the shading version, the blackout or darker strip facing the rear is the top strip of the multilayered vane. Alternatively, a material that is very light diffusive can be used for the rear strip, preferably the bottom strip, and a textured fabric may be preferred for the front facing strip, preferably the top strip, or vice versa.

The vanes may also contain one or more additional layers besides the top and bottom strips. For example, use of a third strip positioned between the top strip and the bottom strip may be a middle layer in a multi-layered vane. The third or middle layer, and optionally additional layers, may be a film, and films or fabrics made from polyester bond and/or weld well with other polyester materials that may be utilized for the other strips forming the multi-layered vane. The additional layers in a multi-layered vane may provide better shading effect. In an illustrative embodiment, a first roll of fabric of top strip, a second roll of fabric of middle layer material, and a third roll of bottom strip are each unrolled so that the top strip, middle layer material, and bottom strip are arranged as layers and fed to an ultrasonic welder or other attachment process to form a multilayer vane. In particular versions, use of a third layer in a multi-layered vane may provide an improved black-out vane. In one embodiment, the third layer may form a middle layer and materials may be selected to provide blackout so that light does not pass through the multi-layered vane. Metalized films such as DuPont® #329 and Mylar® may be used as the third middle layer to provide a blackout effect. All three layers preferably may be cut-sealed at the same time, and coupled at their edges. The third layer is only bonded to the other layers at its edges and it is free to separate from the other layers to form or contribute to the formation of a cell or spacing.

Static electricity buildup may affect separation of the vane layers and opening of the vane. This is especially an issue with multi-layered vanes that form thin sleek cells. Therefore, treatment of the vane materials with antistatic compounds, particularly on the surfaces of the strips that face each other and form the cavity, may reduce this static effect and facilitate the opening of the cells. An antistatic material may also be incorporated into the strips by, for example, printing the antistatic material on a surface of the vane strips.

If desired, the vane material can be provided with registration markings and printed with discrete segments of an image or design, wherein a complete design is formed when the roll-up covering is in an unrolled-collapsed configuration. Moreover, the image can be printed on the vane material with registration markings during the manufacturing process to provide custom roll-up window coverings.

Preferably, the inner and outer vane layers each have a length of about 10 inches to about 144 inches, which may vary therebetween in increments of about ⅛ of an inch. Shorter and longer lengths are contemplated. The widths of the vane layers may be any desirable width but are generally about one (1) to six (6) inches, preferably about two (2) to about five (5) inches, and most preferably about three (3) to about four (4) inches and may vary in increments therebetween of about ⅛ of an inch. The vanes may be made to be of uniform constant width, or the width of the vanes in a subassembly can be different and have one or more widths. Preferably the width of the first portion of a vane layer, i.e., the width of the inner edge region, may be as low as about ¹⁄₁₆ to as large as about ⅜ of an inch, the width of the second portion of the vane layer, i.e., the width of the outer edge region, may be as low as about ¹⁄₁₆ to about as large as ⅜ of an inch, and the width of the third portion of the vane layer, i.e., the width of the middle region, makes up the remaining width of the vane layer. The width of the inner edge region and the width of the outer edge region in one embodiment may be about the same width as the optional elongate stiffeners or about half the width of angled elongate stiffeners described below, and/or about the same width as the attachment areas of the vane layer(s) to the elongate tapes. While the width of the inner edge regions have been described as being as low as ¹⁄₁₆ to as large as ⅜ of an inch wide, the width may vary therebetween in increments of about ¹⁄₃₂ of an inch and it is contemplated that other widths both smaller and larger are feasible. Preferably, the length of a vane layer is greater than the width of each elongate tape, and more preferably is greater than the sum of the width(s) of each inner elongate tape and/or the sum of the width(s) of each outer elongate tape. A vane layer preferably has a thickness as low as about 0.005 inch to as large as about 0.0005 of an inch and may vary therebetween in increments of about 0.0001 inches. The thickness of each vane layer is generally at least 50 times smaller than either the length and/or the width of the vane layer. In one embodiment, the thickness of the vane layer preferably may be at least 100 times smaller than either its length and/or width, more preferably at least 300 times smaller than either its length and/or width.

To form a multi-layered vane, a single piece or multiple pieces of material may be utilized to form an inner vane layer and an outer vane layer. A single piece of material may be creased, folded, and/or heat set and coupled, directly or indirectly, to itself to create the vane layers. Alternatively, multiple pieces of material may be used to form the inner and/or outer layers, and in one embodiment multiple pieces of material may be coupled at their ends to form an inner vane layer and multiple pieces of material may be coupled at their ends to form an outer vane layer. It will be appreciated that the manner in which the multi-layered vane is formed may affect the profile (cross-section) of the cellular space formed, and it may be desirable to form a multi-layered vane with clean edges that are aesthetically pleasing when viewed between the elongate tapes supporting the vanes, and to otherwise form the vane to achieve various aesthetic effects.

Figure 7A:
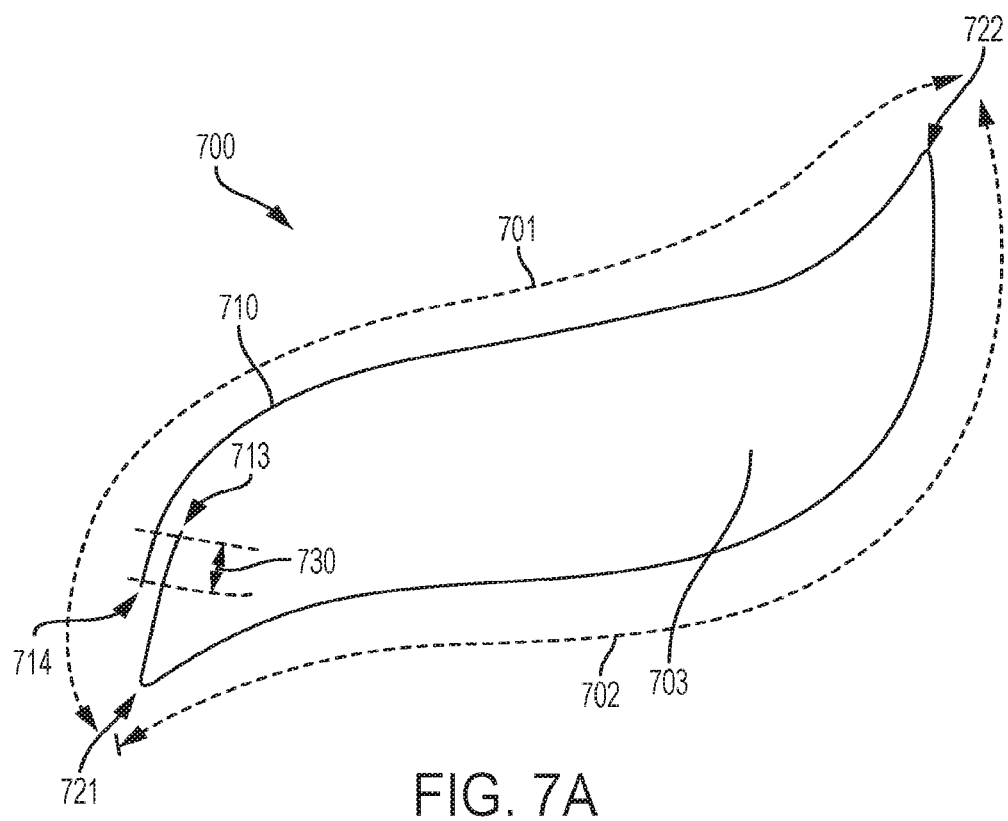
FIG. 7A is an end view of a single piece of material arranged to be formed into an embodiment of a multi-layered vane.
Figure 7B:
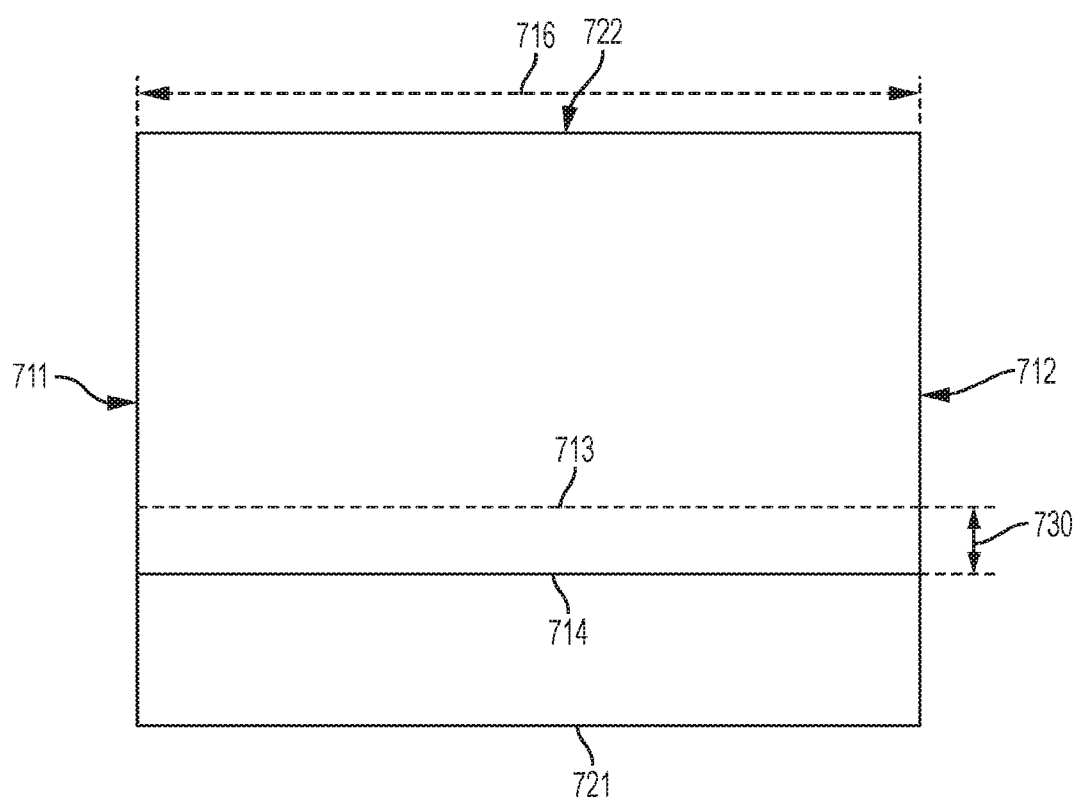
FIG. 7B is a front view of multi-layered vane of FIG. 7A.
Figure 7C:
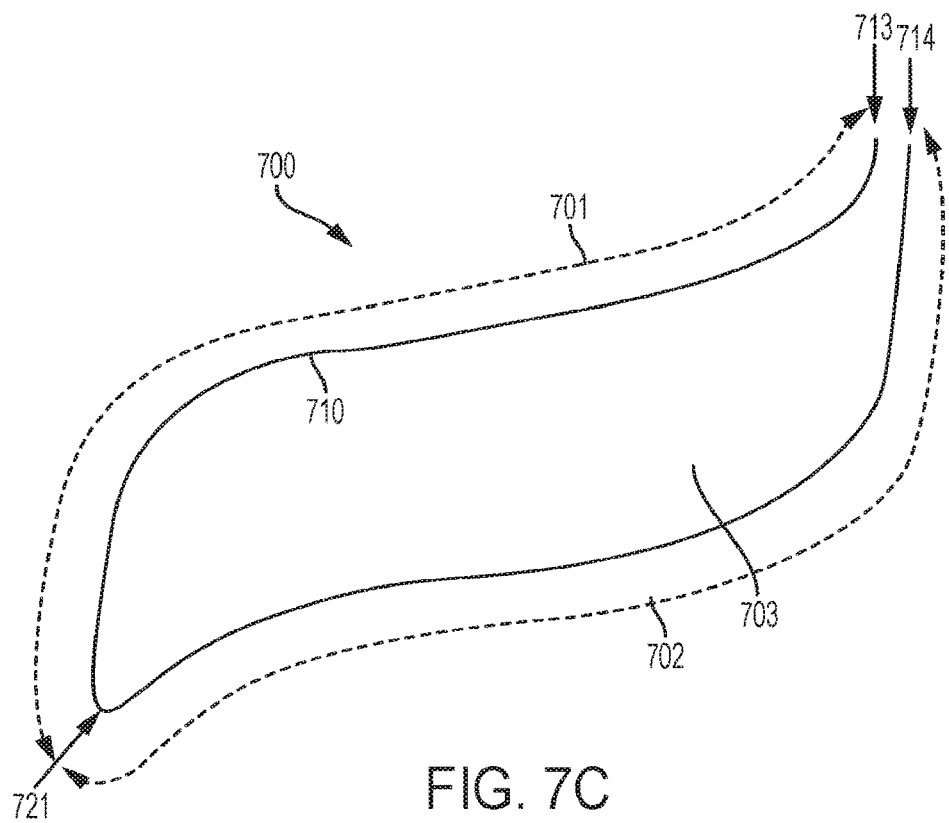
FIG. 7C is an end view of a single piece of material arranged to be formed into another embodiment of a multi-layered vane.
Figure 7D:
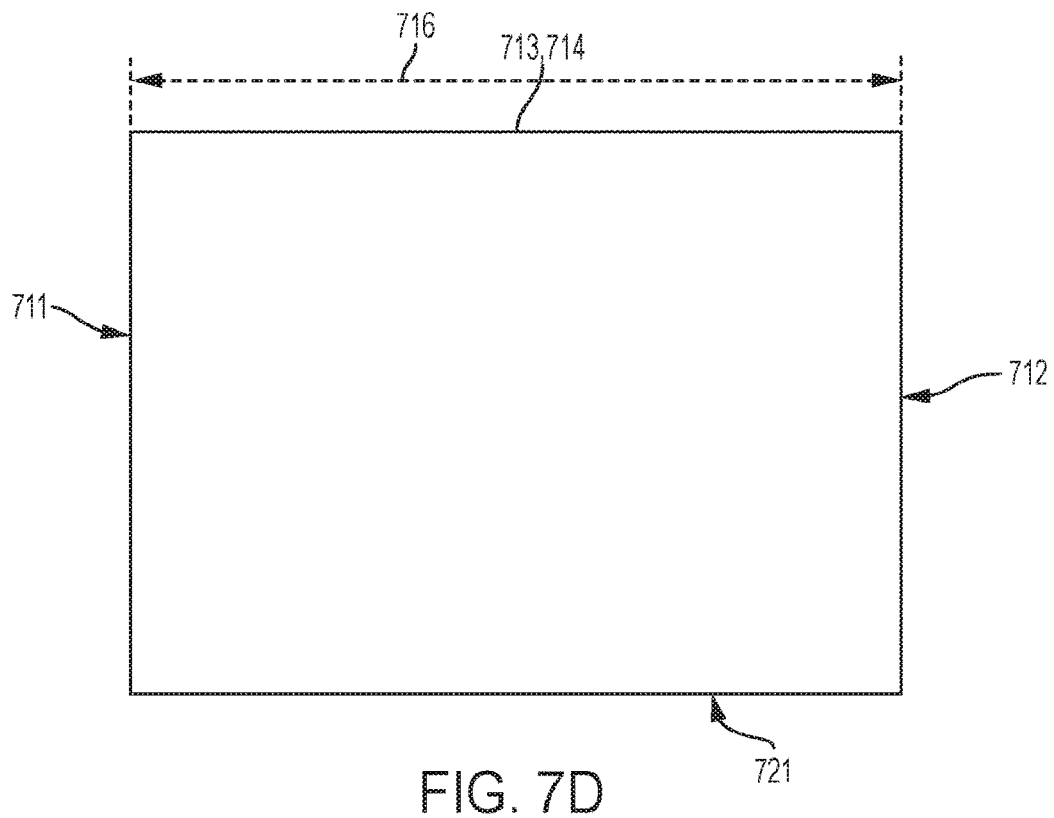
FIG. 7D is a front view of the multi-layered vane of FIG. 7C.
Figure 8A:
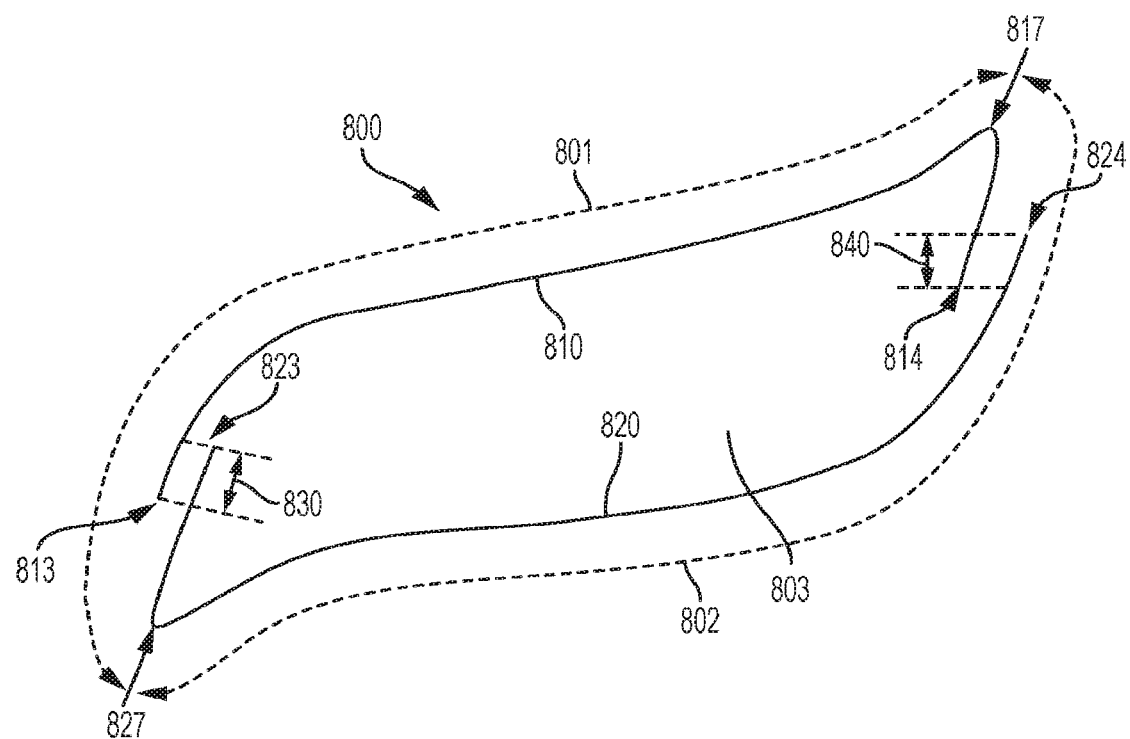
FIG. 8A is an end view of multiple pieces of material arranged to be formed into an embodiment of a multi-layered vane.
Figure 8B:
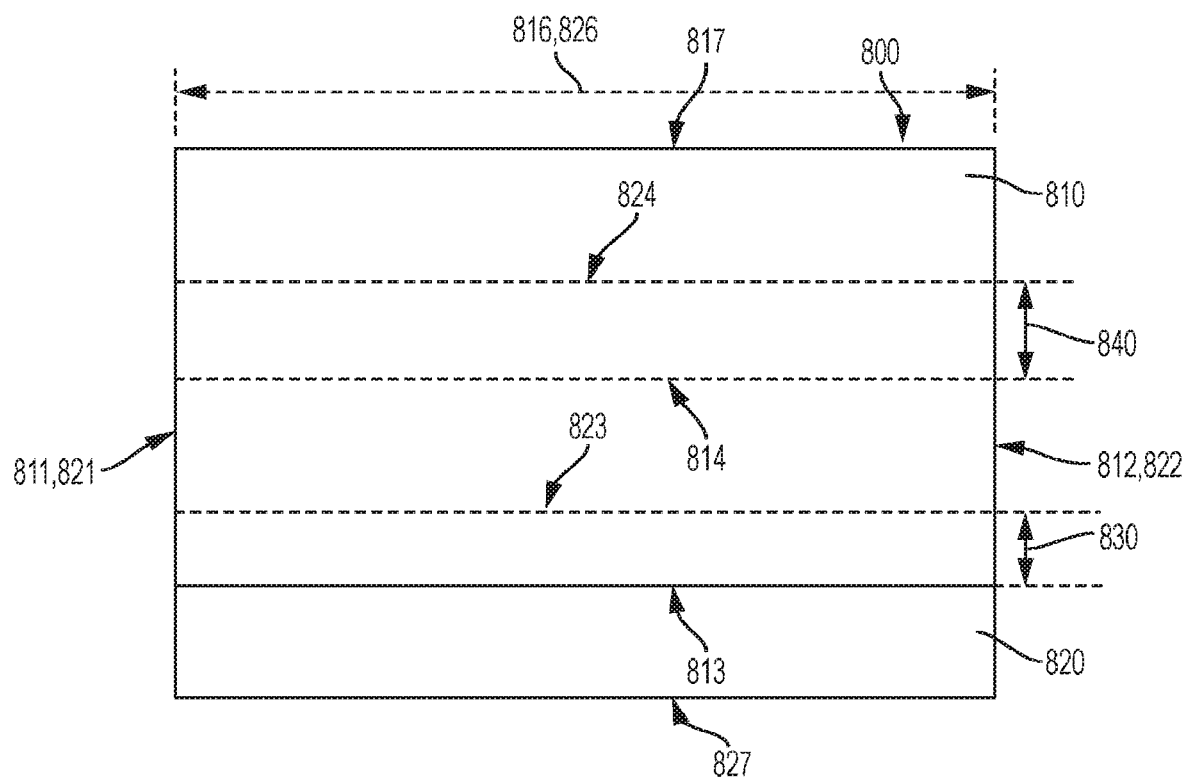
FIG. 8B is a front view of the multi-layered vane of FIG. 9A.
Figure 8C:
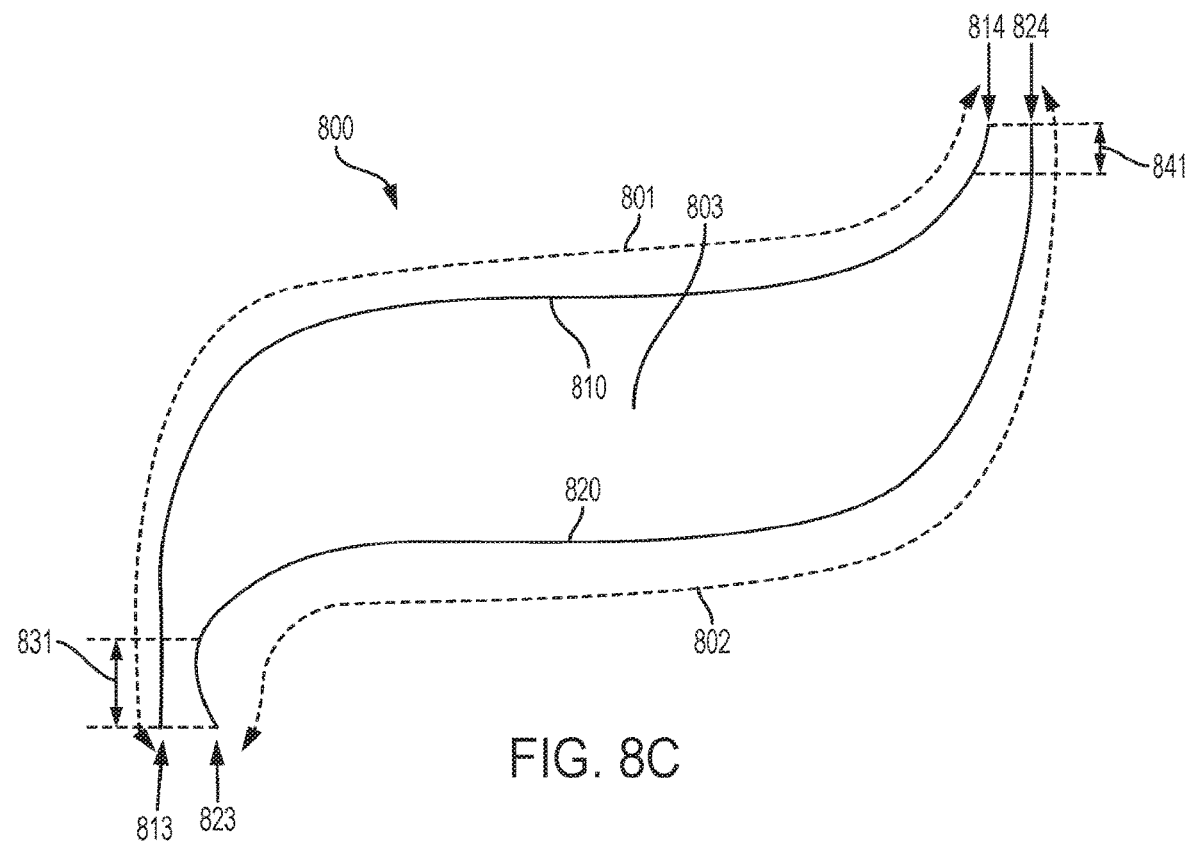
FIG. 8C is an end view of multiple pieces of material arranged to be formed into another embodiment of a multi-layered vane.
Figure 8D:
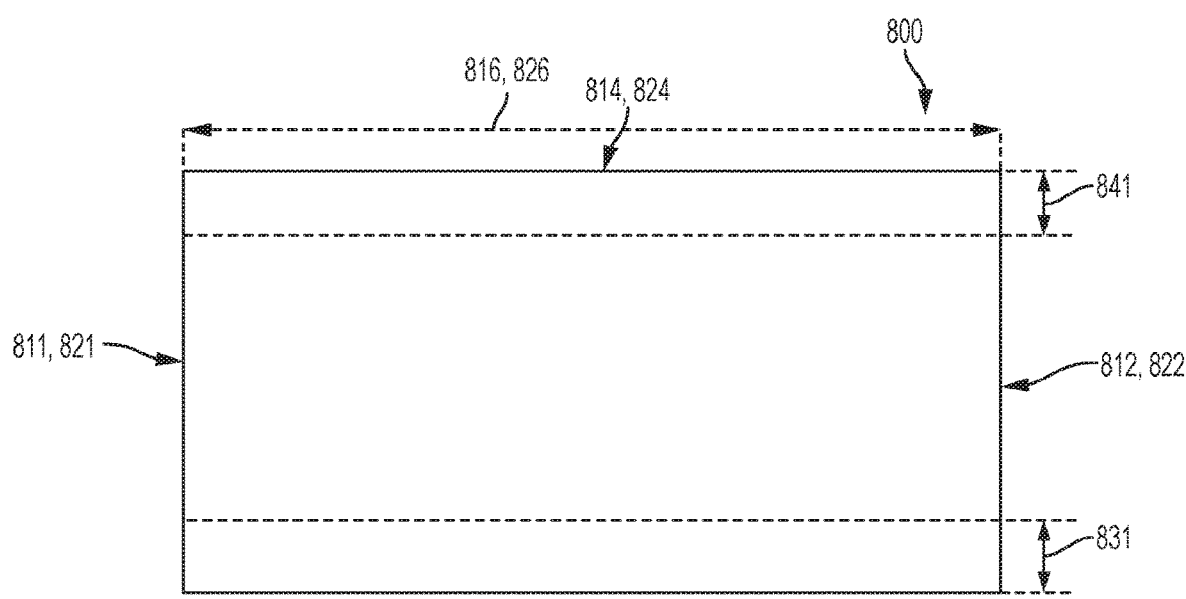
FIG. 8D is a front view of the multi-layered vane of FIG. 9C.
Figure 8E:
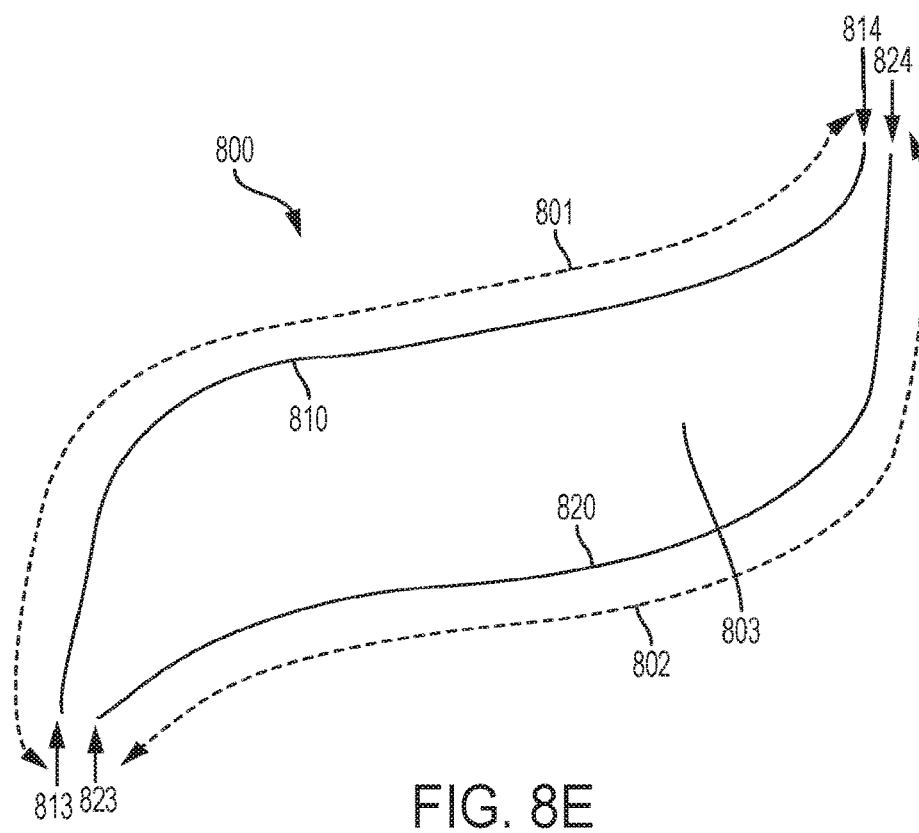
FIG. 8E is an end view of multiple pieces of material arranged to be formed into a different embodiment of a multi-layered vane.
Figure 8F:
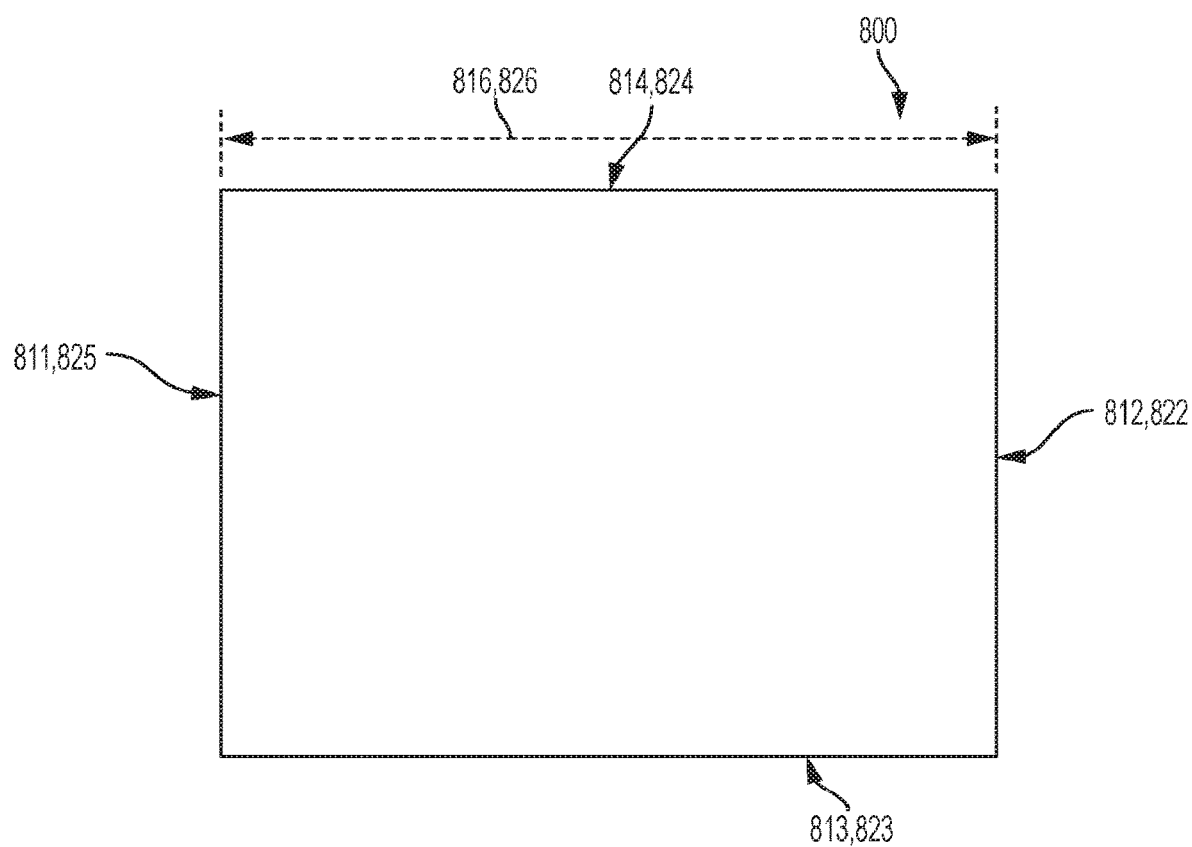
FIG. 8F is a front view of the multi-layered vane of FIG. 8E.
Figure 9A:
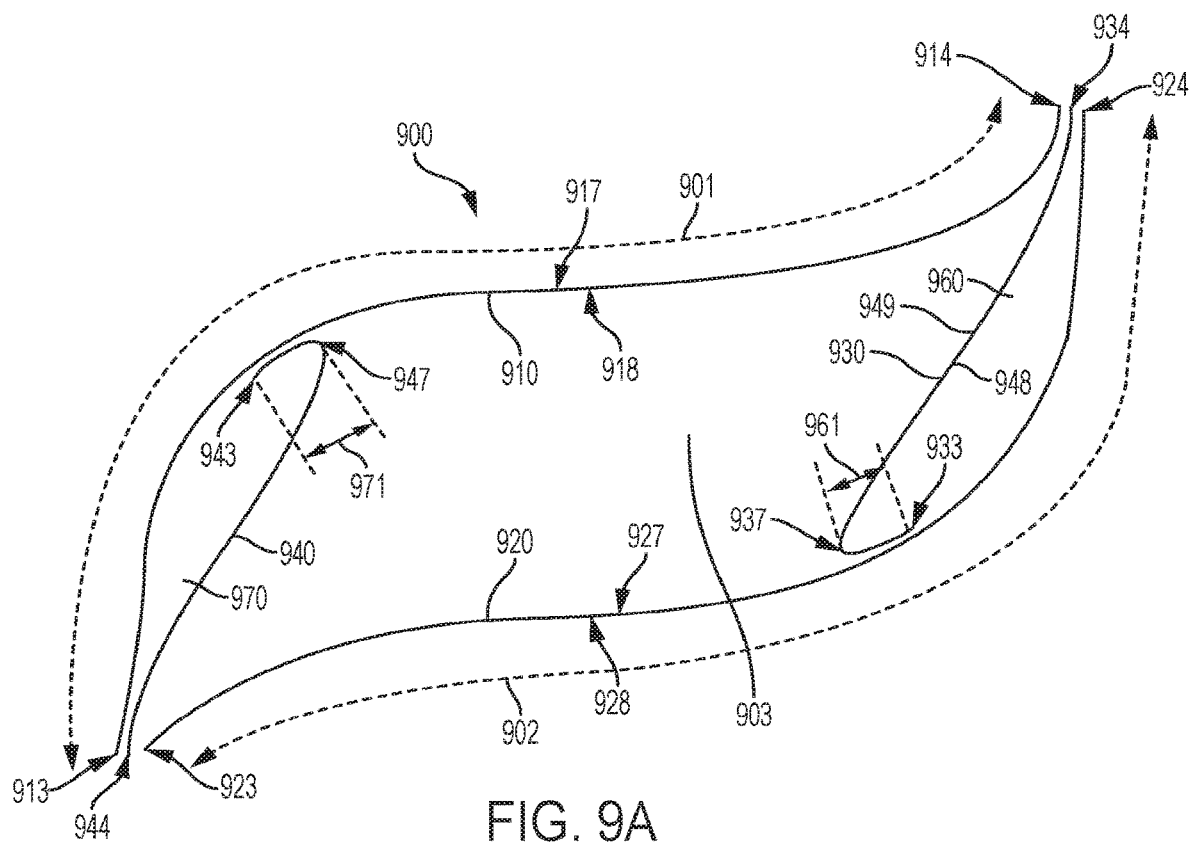
FIG. 9A is an end view of an embodiment of multiple pieces of material arranged to be formed into an embodiment of a multi-layered vane having stiffener pockets.
Figure 9B:
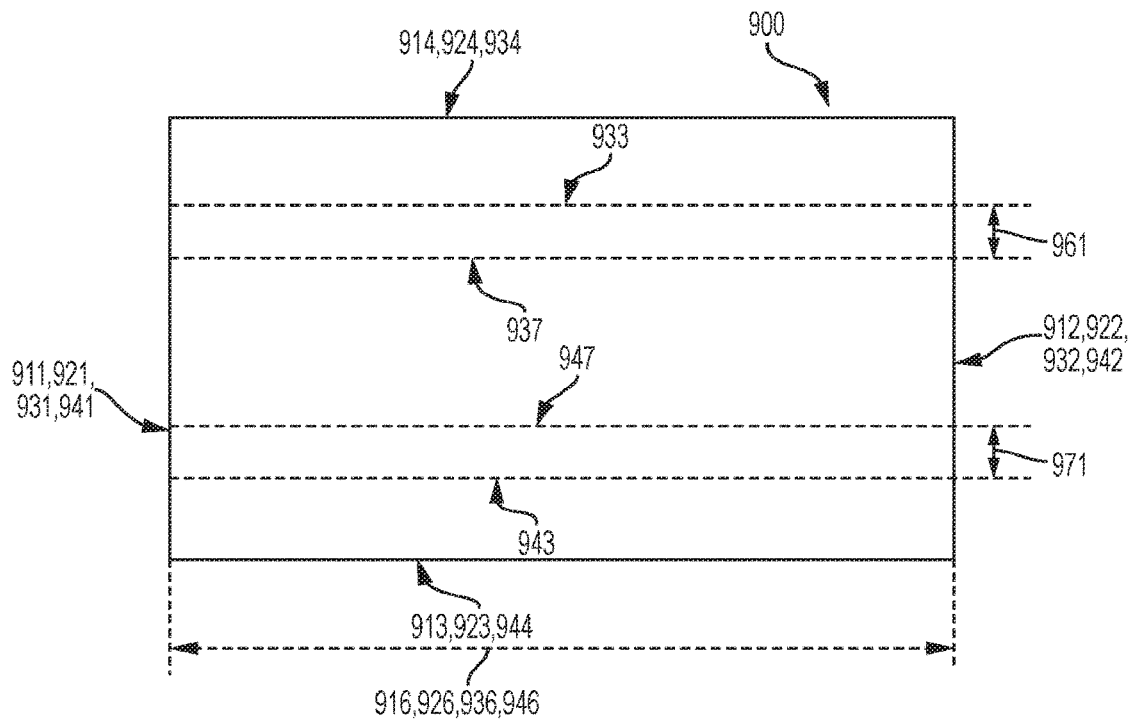
FIG. 9B is a front view of the multi-layered vane of FIG. 9A.

Turning now to FIGS. 7A-9B, constructions of various embodiments of a multi-layered vane will be discussed below. Particularly, FIGS. 7A-7B illustrate a construction of an embodiment of a multi-layered vane formed from a single piece of material, while FIGS. 7C-7D illustrate a construction of another embodiment of a multi-layered vane formed from a single piece of material. FIGS. 8A-8B illustrate a construction of an embodiment of a multi-layered vane formed from two pieces of material, FIGS. 8C-8D illustrate a construction of another embodiment of a cellular vane formed from two pieces of material, and FIGS. 8E-8F illustrate a construction of an additional embodiment of a multi-layered vane formed from two pieces of material. FIGS. 9A-9B illustrate a construction of an embodiment of a multi-layered vane formed from four pieces of material and include stiffener pockets. Other constructions of a multi-layered vane formed of more or less pieces and of construction different than illustrated in FIGS. 7A-9B are contemplated. For example, a single vane layer may be constructed and formed by combining one or more materials, including one or more sheets of material.

As illustrated in FIGS. 7A-7B, a multi-layered vane 700 may be formed from a single piece of continuous (integral) material 710 which may be a sheet having a first end 711, a second end 712, a first longitudinal edge 713 extending between first end 711 and second end 712, and a second longitudinal edge 714 extending between first end 711 and second end 712, and which may be substantially parallel to first longitudinal edge 713. Sheet 710 has a length 716 extending between first end 711 and the second end 712. Sheet 710 is creased, folded, perforated, heat set, and/or otherwise manipulated, and coupled to itself to form a multi-layered vane 700.

More specifically, the single piece of material 710 may be manipulated along its length 716 in order to form the multi-layered vane 700 by creasing, folding, perforating, heat-setting, and/or otherwise to form a first fold line 721, and creasing, folding, and/or heat-setting the sheet along its length 716 to form a second fold line 722, which causes the single piece of material 710 to overlap and/or contact over an area 730 between first longitudinal edge 713 and second longitudinal edge 714 and ends 711, 712. The sheet of material 710 may be coupled to itself within area 730 to form a multi-layer vane 700 having a vane length, which may be, for example, equivalent to the length 716 of single sheet of material 710. Material 710 may be coupled, directly or indirectly, to itself along a single line, or at separate points or areas within area 730, via welding (ultrasonic, hot knife, etc.), glue, stitching, or other methods of attachment.

Once material 710 is folded and coupled, directly or indirectly, to itself, cellular vane 700 is configurable to form, and preferably in at least the expanded condition in the architectural covering forms, a cellular spacing 703 between an inner vane layer 701 and an outer vane layer 702. The resulting inner vane layer 701 has a width extending between the first fold line 721 and second fold line 722. Outer vane layer 702 extends between first fold line 721 and second fold line 722. While overlap area 730 is shown as being part of inner vane layer 710 it can be appreciated that alternatively overlap area 730 may form part of outer vane layer 720 and may be configured to be located in different positions of inner or outer vane layers 710, 720.

Alternatively, as illustrated in FIG. 7C-7D, a single sheet of material 710 may form a multi-layered vane 700 by creasing, folding and/or heat setting the sheet along its length 716 to form a first fold line 721 and attaching longitudinal edges 713, 714, of material 710 to each other via welding (ultrasonic, hot knife, etc.), glue, stitching, or other methods of attachment. Preferably the area where longitudinal edges 713, 714 of the sheets are coupled is small and of limited width. In FIG. 7C, once folded and coupled, an inner vane layer 701 extends between first longitudinal edge 713 and first fold line 721 and an outer vane layer 702 extends between first fold line 721 and second longitudinal edge 714. While the embodiment of multi-layered vane 700 was shown and described as being formed of a single piece of material, multi-layered vane 700 may be formed of multiple pieces of material.

An example of a multi-layered vane formed from multiple pieces of material will now be described. As illustrated in the embodiment of FIG. 8A-B, two distinct sheets of material may be coupled, directly or indirectly, to each other to form a multi-layered vane 800. Sheet 810 has a length 816 extending between a first end 811 and a second end 812, and a width extending between a first longitudinal edge 813 and a second longitudinal edge 814. Second sheet 820 has a length 826 extending between a first end 821 and a second end 822, and a width extending between a first longitudinal edge 823 and a second longitudinal edge 824.

The two sheets of material 810, 820 may be manipulated by creasing, folding, and/or heat setting first sheet 810 along its length 816, thereby forming a first fold line 817, and by creasing, folding, and/or heat setting second sheet 820 along its length 826, thereby forming a second fold line 827. Sheets 810, 820 may overlay each other and be positioned with respect to each other so that second longitudinal edge 814 of first sheet 810 is positioned beyond second longitudinal edge 824 of second sheet 820 to form a first overlapping area 840 where sheets 810, 820 preferably overlap each other and are coupled, directly or indirectly, and first longitudinal edge 813 of first sheet 810 is positioned beyond first longitudinal edge 823 of second sheet 820 to form a second overlapping area 830 where sheets 810, 820 preferably overlap each other and are coupled. The two sheets of material 810, 820 may be coupled, directly or indirectly, to each other along a single line, at multiple separate locations within the areas of overlap 830, 840, or within the entire areas of overlap 830, 840, via welding (ultrasonic, hot knife, etc.), glue, stitching, and/or other methods of attachment including methods now known and methods developed in the future. The two sheets of material 810, 820 may be coupled, directly or indirectly, to each other within the first area of overlap 840 and within second area of overlap 830, but are preferably not coupled in other areas or regions so these unattached regions may separate from each other to form a space or cell 803. Attachment areas 830, 840 may be located in positions other than those illustrated in FIGS. 8A-8B. Once coupled to each other, first sheet of material 810 and second sheet of material 820 may form a multi-layered vane 800 having an inner vane layer 801 and an outer vane layer 802 that extend between first fold line 817 and second fold line 827 and which facilitate the formation of a space or cell 803 between inner layer 801 and outer layer 802.

Alternatively, the first and second sheets of material 810, 820 may be manipulated such that a multi-layered vane 800 may be formed, but neither sheet is creased and/or folded. As illustrated in FIG. 8C-D, first sheet 810 having first end 811 and second end 812, and second sheet 820 having first end 821 and second end 822 can overlay each other and first longitudinal edge 813 of front sheet 810 is aligned roughly end to end with first longitudinal edge 823 of second sheet 820 to form a first area of overlap 831, and second longitudinal edge 814 of first sheet 810 is roughly aligned end to end with second longitudinal edge 824 of second sheet 820 to form a second area of overlap 841. The two sheets of material 810, 820 may be coupled, directly or indirectly, to each other along a single line within overlap areas 831, 841, at separate or discrete areas within overlap areas 831, 841, or the entire area of overlap areas 831, 841, via welding (ultrasonic, hot knife, etc.), glue, stitching, and/or other methods of attachment, including methods now known and/or methods developed in the future. Once coupled, the first sheet of material 810 forms an inner layer 801 and the second sheet of material 820 forms an outer layer 802. The first sheet and second sheet preferably are not coupled in regions other than areas 831, 834 so those other unattached regions may separate as illustrated in FIG. 8C. In this manner sheets 810, 820 are configurable to form, and preferably in at least the expanded condition in the architectural covering forms, a multi-layered vane 800 having a space 803 between inner vane layer 801 and outer vane layer 802.

In another embodiment, as illustrated in FIG. 8E-F, sheets 810, 820 are aligned and arranged to overlay each other and are cut-welded so sheets 810, 820 are coupled at a limited region along their longitudinal edges. The multiple sheets of material 810, 820 may be coupled, directly or indirectly to each other along first longitudinal edges 813, 823 of each sheet 810, 820 and coupled, directly or indirectly, along second longitudinal edges 814, 824 of each sheet 810, 820. Coupling and attachment may be accomplished via welding, such as, for example, ultrasonic cut weld seal, hot knife, or other methods of attachment. Once coupled, the first sheet of material 810 forms an inner vane layer 801 and second sheet of material 820 forms an outer vane layer 802. Preferably, first vane layer 801 and second vane layer 802 are dimensioned, configured, and constructed to facilitate the formation of a multi-layered vane 800 having a space or cell 803 between inner and outer layers 801, 802.

Multi-layered vanes also may be configured and assembled as shown and described in U.S. patent application Ser. No. 13/830,241, which application is hereby incorporated by reference in its entirety, or as shown and described in U.S. Patent application No. 62/414,248, entitled "Covering for Architectural Features, Related Systems and Methods of Manufacture", which was filed on Oct. 28, 2016, and which application is hereby incorporated by reference in its entirety. The attachment of sheets 8E-F may be along a limited attachment region and preferably forms a hinge so that the inner and outer layers easily separate as described in the aforementioned U.S. Patent Application No. 62/414,248, entitled "Covering for Architectural Features, Related Systems and Methods of Manufacture" filed on Oct. 28, 2016.

Preferably, in each of the embodiments of multi-layered vanes 700, 800, in at least the expanded position, the cellular spacing extends the length of the vane and with the vane layers forms an elongate tube or sleeve with open ends. Preferably, the distance (width) between the longitudinal edges (for example, formed by attachment regions or fold lines) of the outer layer is longer than the distance (width) between the longitudinal edges (for example, formed by attachment regions or fold lines) of the inner layer such that the width of the outer vane layer is greater than the width of the inner vane layer which facilitates the formation of the cellular space.

In further embodiments, a multi-layered vane may also include at least one stiffener pocket to hold an elongate stiffener within the multi-layered vane. Other embodiments may include two or more stiffener pockets. As illustrated in FIGS. 9A-B, a multi-layered vane 900 may be constructed from a first sheet of material 910 having a first face 917 and a second face 918, a second sheet of material 920 having a first face 927 and a second face 928, and at least a third sheet of material 930 (also referred to herein as a "pocket sheet") configured to form at least one stiffener pocket 960 and having a first face 948 and a second face 949. The sheets of material have first longitudinal edges 913, 923, 933 and second longitudinal edges 914, 924, 934. The sheets 910, 920 have first ends 911, 921 and second ends 912, 922; lengths 916, 926 extending between respective ends 911, 912, and ends 921, 922; and widths extending between respective longitudinal edges 913, 914 and 923, 924. The third piece of material 930 (also referred to herein as a pocket sheet 930), preferably a sheet, has a length 936 extending between a first end 931 and a second end 932, and a width, generally transverse and preferably perpendicular its length, and extending between a first longitudinal edge 933, and a second longitudinal edge 934. Third sheet 930 may be manipulated along its length 936 by, for example, folding, creasing, perforating, heat-setting and/or otherwise, to form a first fold line 937, thereby forming an overlap area 961 between first longitudinal edge 933 and fold line 937. The sheet 930 may be coupled to first face 927 of second sheet of material 920 in area of overlap 961. The second longitudinal edge 934 may be coupled to, or along, longitudinal edge 914 of first sheet of material 910 and/or longitudinal edge 924 of second sheet of material 920 to form stiffener pocket 960 between first face 927 of second sheet 920 and pocket sheet 930.

A second stiffener pocket 970 may be similarly formed by attaching to first sheet 910 at least one sheet of material 940 (also referred to herein as a "pocket sheet") that is manipulated by folding, creasing, perforating, heat setting, and/or otherwise to form a fold line 947. An overlap area 971 is formed between a first longitudinal edge 943 and fold line 947 of pocket sheet 940, where pocket sheet 940 preferably overlaps the first sheet 910. Second pocket sheet 940 may be coupled to second face 918 of first sheet 910 in the overlap area 971. Second longitudinal edge 944 of second pocket sheet 940 may be coupled to, or along, first longitudinal edge 923 of second sheet 920 and/or first longitudinal edge 913 of first sheet of material 910 to form second stiffener pocket 970 between second face 918 of first sheet 910 and second pocket sheet 1040.

Longitudinal edge 933 of pocket sheet 930 and longitudinal edge 943 of second pocket sheet 940 alternatively may be coupled, directly or indirectly, to respective sheets 920, 910 without utilizing fold lines 937, 947 by extending pocket sheets 930, 940 basically parallel to sheets 920, 910 and in a manner that provides a space for the elongate stiffener.

First sheet of material 910 preferably forms an inner vane layer 901 extending between first longitudinal edge 913 and second longitudinal edge 914 of first sheet of material 910, and second sheet of material 920 preferably forms an outer vane layer 902 extending between first longitudinal edge 923 and second longitudinal edge 924 of second sheet of material 920. Preferably outer vane layer 902 and inner vane layer 901 are dimensioned and configured to form a cell or space 903 between vane layers 901, 902. Preferably, in at least the expanded position, cellular spacing 903 extends the length of the vane, and with the vane layers, forms an elongate tube or sleeve with open ends. Preferably the distance between longitudinal edges 923, 924 of second sheet 920 is longer than the distance between longitudinal edges 913, 914 of first sheet 910 such that the width of outer vane layer 902 is greater than the width of inner vane layer 901, which facilitates the formation of a cell 903. While sheets 910, 920 have been described and illustrated in the embodiment of FIGS. 9A-B as single, integral sheets of material, sheets 910, 920 may be formed of multiple pieces of material.

The pocket sheets may be coupled, directly or indirectly, to a face of a vane, and/or face of a piece of material forming a vane, via an adhesive, glue, bonding, welding, heat seal, stitching, stapling, ultrasonic weld, or ultrasonic cut seal, among other options. The stiffener pocket preferably is sized and configured to have an elongate stiffener disposed within, and it may be further sized and configured to constrain the stiffener from twisting or rotating. The stiffener pocket preferably will permit lateral movement, expansion and contraction of the stiffener within the stiffener pocket, and will permit the stiffener to expand and contract at different rates than the vanes, including the vane layers, to avoid wrinkling, bulging, and other undesired deformations of the vane material caused by different thermal rates of expansion between the stiffener and vane materials. The pocket sheet may be formed from a flexible material, such as fabrics, textiles, woven and non-woven materials, knitted fabrics, and plastic materials, including films. The pocket sheet may be formed of transparent, opaque, or translucent materials. The pocket sheet preferably may be formed of a thin nonwoven fabric. Preferably, a pocket sheet is formed of thin, transparent (preferably very transparent) flexible thermoplastic film, preferably in one embodiment a polyethylene film having a thickness as high as approximately 0.005 inches and as low as approximately 0.0005 inches thick, with variations therebetween in increments of about 0.0001 inches, most preferably having a thickness of about 0.0005 inches.

Construction of Elongate Stiffeners

A subassembly may further include one or more elongate stiffeners. Preferably, subassembly 180, as illustrated in FIG. 1, further includes a plurality of elongate stiffeners 140, more preferably, each vane has two relatively thin elongate stiffeners. The elongate stiffeners are associated with, disposed along, and in some embodiments coupled, directly or indirectly, to the vanes to provide stiffness and/or torsional rigidity to vanes in certain locations, such as, for example, along the longitudinal edges of the vanes where they preferably may be coupled, directly or indirectly, to the vertical support elements. The elongate stiffeners preferably inhibit or prevent the vanes from sagging and drooping along their length and in between the vertical support elements, e.g., elongate tapes. The stiffeners may also improve the control and movement of the vanes so that the vanes may more reliably move, rotate, flex, and/or pivot. For example, the stiffeners facilitate torsion being applied to the vanes by the elongate tapes along the length of the vanes so the vanes rotate, flex, and pivot more reliably. The elongate stiffener generally is a single piece of integral material that has a length that generally corresponds to or is approximately the same as or is the same as the length of the vanes, but multiple pieces of material may form an elongate stiffener and its length need not correspond to or be approximately the same as the length of the vanes. These and other benefits will be apparent to a person of ordinary skill in the art.

Turning to FIGS. 10A-10F, details of various embodiments of an elongate stiffener, as introduced generally above, will be described in further detail below. Particularly, FIGS. 10A-10B illustrate the details of an embodiment of a planar elongate stiffener, FIGS. 10C-10D illustrate the details of an embodiment of a curved elongate stiffener, and FIGS. 10E-10F illustrate the details of an embodiment of an angled elongate stiffener. Other shapes and sizes of elongate stiffeners are contemplated.

As illustrated in FIGS. 10A-10F, an elongate stiffener 1000 preferably has a first end 1001 and a second end 1002, a length 1008 extending between first end 1001 and second end 1002, a lateral axis "Y" preferably centrally located along its length 1008, a first side 1003 and a second side 1004, and a width 1007 extending between first side 1003 and second side 1004 such that width 1007 is generally perpendicular to length 1008. Elongate stiffener 1000 preferably has a thickness 1009, generally perpendicular to both its length 1008 and width 1007, as low as about 6 thousandths of an inch to as large as about 30 thousandths of an inch, with variations therebetween in increments of about one thousandth of an inch, and preferably a thickness of about 15 to 20 thousandths of an inch. Thickness 1009 is generally at least 5 times smaller than either length 1008 and/or width 1009. In one embodiment, thickness 1009 of stiffener 1000 preferably may be at least 10 times smaller than either its length 1008 and/or width 1007, more preferably at least 30 times smaller than either its length 1008 and/or width 1007. The elongate stiffener has a length that generally corresponds to, is approximately the same as, or is the same as the length of the vanes.

In some embodiments, elongate stiffener 1000 has a first face 1005 and a second face 1006, each face 1005, 1006 formed by a surface defined by length 1008 and width 1007 of the stiffener, and separated by thickness 1009. The stiffener may be substantially flat, curved, have angled surfaces with a crease along its length 1008, have both angled surfaces and curved surfaces, curved in cross-section along its length 1008, or other shapes and cross-sectional configurations. While elongate stiffeners 1000 in FIGS. 10A-F have been described as having a first side 1003 and a second side 1004, it will be appreciated that the sides may come to longitudinal edges at the intersections of faces 1005, 1006.

As illustrated in FIGS. 10A-B, a substantially flat stiffener 1000 has a first planar face 1005, and a second planar face 1006. First face 1005 is preferably within a plane that is parallel to the plane of second face 1006, as illustrated. Alternatively, first face 1005 may be relatively flat, and in a plane that is not parallel to the plane of second face 1006. First face 1005 and second face 1006 may also have contouring.

As illustrated in FIGS. 10C-D, an elongate stiffener 1000 may be curved along its length, thereby creating a curved stiffener. The curved stiffener of FIGS. 10C-D preferably has a curved cross-section in a plane B-B perpendicular to the lateral axis Y (e.g., it is "crowned") such that a first curved surface 1005 of the elongate stiffener may be concave, and a second, opposite curved surface 1006 of the elongate stiffener may be convex. Concave surface 1005 of the stiffener may have a radius of curvature "r" that substantially matches or is close to the radius of curvature of the roller used in the architectural covering. The radius of curvature "r" of the curved stiffener may, for example, be about as low about 1 inch to as large as about 4 inches, and may vary therebetween in increments of about 1/16 of an inch. Other values for the radius of curvature for the curved stiffener are contemplated, which may be influenced by the radius of curvature of the roller used. Convex surface 1006 of elongate stiffener 1000 may have a radius of curvature that is the same as, nearly the same as, or different then the radius of curvature of first surface 1005.

The curved stiffener has a crown height "CH", which is the largest vertical distance between one or more of longitudinal edges 1013, 1014 and the apex or highest point/line along second surface 1006. Longitudinal edges 1013, 1014 may be formed between sides 1003, 1004 and first surface 1005. As shown in FIG. 10D, the crown height CH of the curved elongate stiffener may vary from about 0 to about 100 thousandths of an inch, and may vary therebetween in increments of five (5) thousandths of an inch. More preferably the crown height CH is about 20 to about 70 thousandths of an inch, and more preferably about 50 thousandths of an inch.

One or more of faces 1005, 1006 may be concave, convex, or substantially planar (flat). For example, the elongate stiffener may have a curved concave face 1005 as illustrated in FIG. 10B and a substantially flat planar face as illustrated in FIG. 10A. Other combinations and shapes are also contemplated.

As illustrated in FIGS. 10E-F, an elongate stiffener 1000 may be creased or bent along or about its length, thereby creating an elongate angled stiffener. An angled stiffener may have a crease "C", a first face 1015 along first surface 1005 (see FIG. 10F), a second face 1025 along first surface 1005 (see FIG. 10F), a third face 1036 along second surface 1006, and a fourth face 1046 along second surface 1006. The elongate stiffener may be angled in cross-section in a plane B-B perpendicular to the lateral axis Y (e.g., may be "crowned"). The angled stiffener shown in FIG. 10F has an angle "A" between first face 1015 and second face 1025 preferably less than 180 degrees and more preferably about 120 degrees to about 170 degrees. The apex or peak of the angle A, where first face 1015 and second face 1025 meet may be centrally located along the length of the stiffener, or the apex (e.g., peak) of the angle A may be laterally offset to be closer to one of sides 1003, 1004. The angled stiffener has a crown height "CH", which is the largest vertical height of the elongate stiffener between one or more of longitudinal edges 1013, 1014 of first surface 1005 and the apex point or line along second surface 1006 (preferably the peak of crease C). Longitudinal edges 1013, 1014 may be formed between sides 1003, 1004 and the first surface 1005. The crown height CH of the angle stiffener may vary from about 20 to about 100 thousandths of an inch, more preferably about 50 thousandths of an inch. The crown height may vary depending upon the properties and characteristics desired, which may be a function of the material out of which the elongate stiffener is made, the vane configuration, and the properties of the materials of the vanes.

While FIGS. 10E-F show an angled elongate stiffener with substantially flat, planar faces 1015, 1025, 1036, and 1046, it can be appreciated that one or more of faces 1015, 1025, 1036, and 1046 may take a different shape. The faces may be rounded or curved or take any other shape and do not have to be flat or substantially planar. The apex of the angle where the faces 1015, 1025 meet may be centrally located or located at a different position offset from the center.

The width of the elongate stiffeners is relatively small, and generally smaller than the diameter of the roller to facilitate rollup of the stiffeners when the subassembly is rolled up about the roller. In some embodiments, the width of a stiffener may be as small as about 3/16 of an inch to as large as about 5/8 inch, may be up to about one inch, and may vary therebetween in increments of about 1/32 of an inch. A larger stiffener width may be appropriate, particularly for vanes of larger width (e.g., 4, 4.5, 5, 5.5, or 6 inches). The width of the stiffener may vary depending upon aesthetics, desire shape of the vanes and the cells formed in between the vanes, and the spacing or form of the support elements (e.g., relatively thin tapes or wider strips or sheets).

An elongate stiffener may be formed from translucent or opaque material, although in some embodiments a transparent or substantially transparent stiffener is preferred. The stiffeners preferably are relatively rigid or stiff, as compared to the construction of the vanes, and may be formed from at least one of a plastic or polymeric material, a metallic material (such as, for example, aluminum, titanium, brass, or steel), ceramic, rigid foam, wood, or the like. Alternatively, in addition to the configurations shown in FIGS. 10A-F, the stiffeners may be formed and shaped like wires, cables, or thin rods. Preferably, an angled elongate stiffener is formed of transparent plastic, and, more preferably is formed of polycarbonate.

Figure 11A:
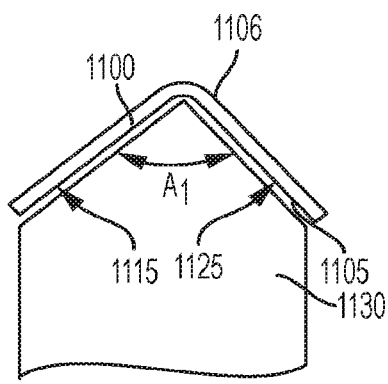
FIGS. 11A-11C illustrate a process for creating an angled elongate stiffener.
Figure 11B:
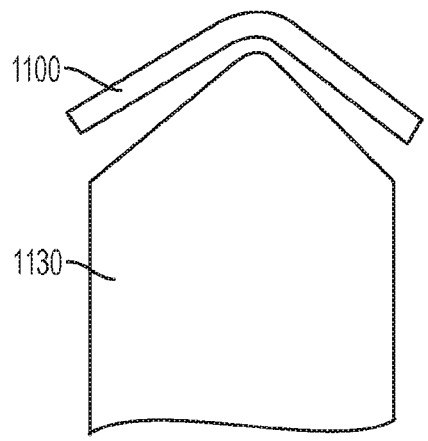
Figure 11C:
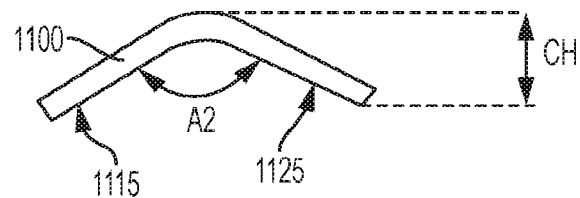

Turning to FIGS. 11A-11C, formation of an embodiment of an angled stiffener, as illustrated in FIGS. 10E-10F will be described in further detail below. The angled stiffener may be created by cold-form bending a substantially thin, flat, planar, piece of plastic material 1100, that may be rectangularly-shaped. The substantially thin, flat piece of plastic material 1100, having a first face 1105 and a second face 1106, is drawn through at least one die 1130 shown in FIG. 11A having an angle $A_1$ of about 90 degrees. After the plastic stiffener material 1100 is drawn through the at least one die 1130 having an angle of about 90 degrees, the angle in the plastic material between a first portion 1115 of first face 1105 and a second portion 1125 of the first face 1105 relaxes to an angle A2 shown in FIG. 11C that is between about 110 degrees and about 170 degrees, thereby creating an angled stiffener having an angle A2 and a crown height "CH". In one embodiment, multiple elongate stiffeners are formed by rolling out two continuous rolls of straight, flat polycarbonate film, bending the film to about a 90-degree angle by running the films through a die with an angle of about 90 degrees where, thereafter, the angle A2 in the plastic relaxes to about 110 to about 170 degrees, and the stiffeners are cut to length.

Construction of Stiffened Multi-Layered Vanes

Construction of the light-controlling subassembly of FIG. 1 generally involves constructing the multi-layered vanes with one or more elongate stiffeners, and connecting the one or more stiffened multi-layered vanes to the elongate tapes. In one embodiment, a subassembly includes one or more multi-layered vanes having two vane layers, and at least two elongate stiffeners, where the multi-layered vane is connected to elongate tapes, preferably one or more inner elongate tapes and one or more outer elongate tapes. Preferably, in at least the expanded position, the multi-layered vane forms and the vane layers circumscribe a space or cell that extends the length of the vane and, with the vane layers (and preferably one or more stiffeners), forms an elongate tube or sleeve, preferably with open ends.

A multi-layered vane may be constructed and have the structure illustrated in FIGS. 6A-6D, 7A-D, 8A-F, or 9A-B or may have other constructions as appreciated by one of skill in the art. Elongate stiffeners may be constructed as illustrated in FIGS. 10A-10F, and 11A-C. In one embodiment, elongate stiffeners are formed and a multi-layered vane is constructed where the stiffeners are then associated with, disposed along, or coupled directly or indirectly to, the multi-layered vane and positioned along the length of the multi-layered vane to form a stiffened multi-layered vane. Then the stiffened multi-layered vane is associated with or coupled directly or indirectly to, multiple elongate tapes. In other embodiments, the elongate stiffeners are associated with, disposed along, or coupled directly or indirectly to, one or more pieces of material, then a stiffened multi-layered vane is constructed from the one or more pieces of material combined with the elongate stiffeners, and then the stiffened multi-layered vane is associated with, or coupled directly or indirectly to, multiple elongate tapes. In other embodiments, the vanes, stiffeners and tapes may be constructed in one integrated process.

Preferably, in one embodiment, a first elongate stiffener is associated with, disposed along, or connected directly or indirectly to an inner face of an outer vane layer, and a second elongate stiffener is associated with, disposed along, or connected directly or indirectly to an outer face of an inner vane layer. The inner vane layer may be associated with, disposed along, or connected directly or indirectly to inner or outer elongate tapes, and the outer vane layer may be associated with, disposed along, or connected directly or indirectly to the other remaining elongate tapes, e.g., outer elongate tapes or inner elongate tapes. Most preferably, the stiffeners are angled elongate stiffeners.

Associating, disposing, and/or connecting an elongate stiffener to a vane, preferably such that the elongate stiffener is positioned along the length of the vane, more preferably along an edge region of the vane, functions to increase the stiffness of that region of the vane, such that the vane can bridge the horizontal distance between elongate tapes without the vane sagging or drooping excessively across the distance separating the elongate tapes to meet the structural and aesthetically desired characteristics and properties of the vanes. Elongate stiffeners also function to apply a torsional force across the vane, preferably across the full length of the vane, when the subassembly is moving between configurations such that the vane will move (e.g., rotate, pivot) into a desired position (e.g., substantially expanded, substantially collapsed, or angled). In some embodiments, a vane is stiffened along an edge of a vane layer without using an elongate stiffener, such as by impregnating and/or coating an edge region of a flexible vane material with a stiffening material or agent along the edge to create a stiffened edge.

Various embodiments of a subassembly of a roll-up cellular architectural covering are illustrated in FIGS. 12A-12E, 13A-13E, and 14A-14E. FIGS. 12A-B, 13A-B, and 14A-B illustrate exploded views of different embodiments of a stiffened multi-layered vane. While only one stiffened multi-layered vane 1230, 1330, 1430 is shown illustrated in FIGS. 12A-B, 13A-B, 14A-B, it is understood that the subassembly may include one or numerous additional stiffened multi-layered vanes 1230, 1330, 1430 of similar or different construction, non-stiffened multi-layered vanes, non-cellular vanes, and further may include fewer elongate tapes or stiffeners, and/or additional elongate tapes or stiffeners.

Figure 12A:
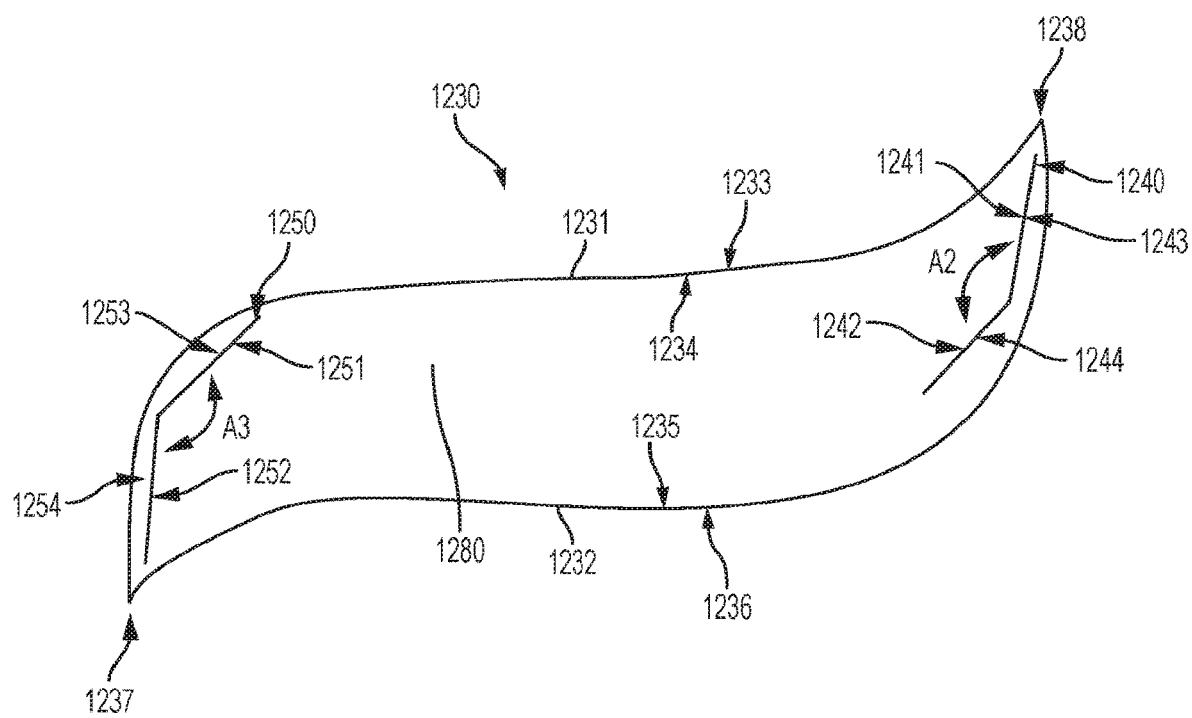
FIG. 12A is an exploded end view of an embodiment of a stiffened multi-layered vane.
Figure 13A:
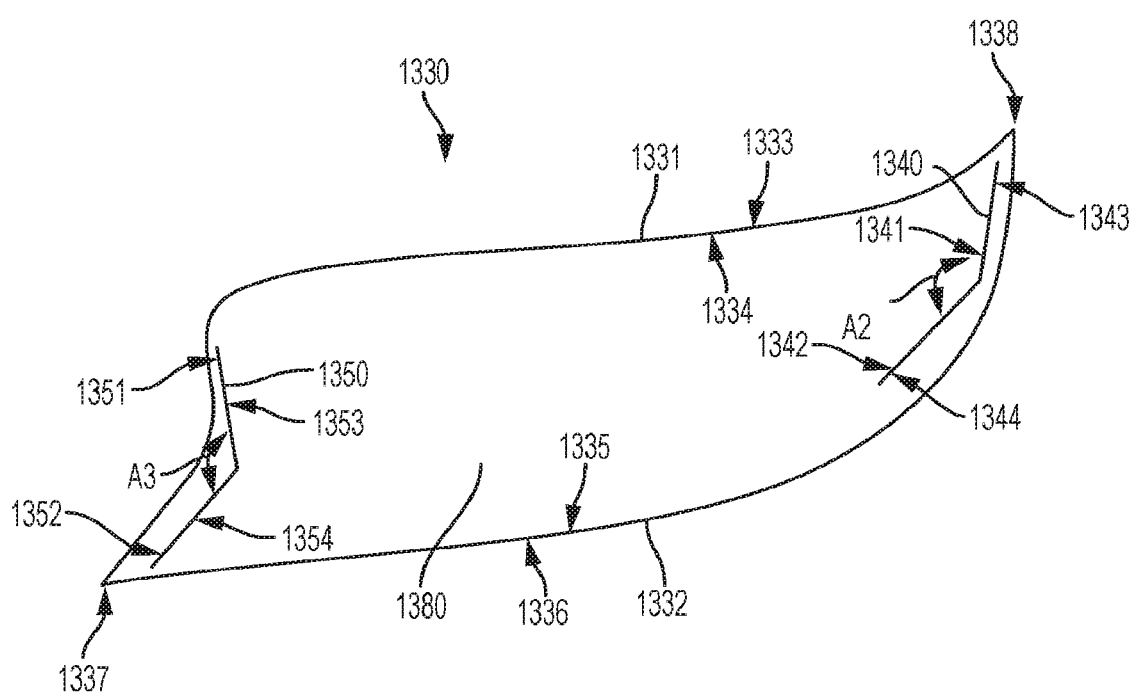
FIG. 13A is an exploded end view of another embodiment of a stiffened multi-layered vane.
Figure 14A:
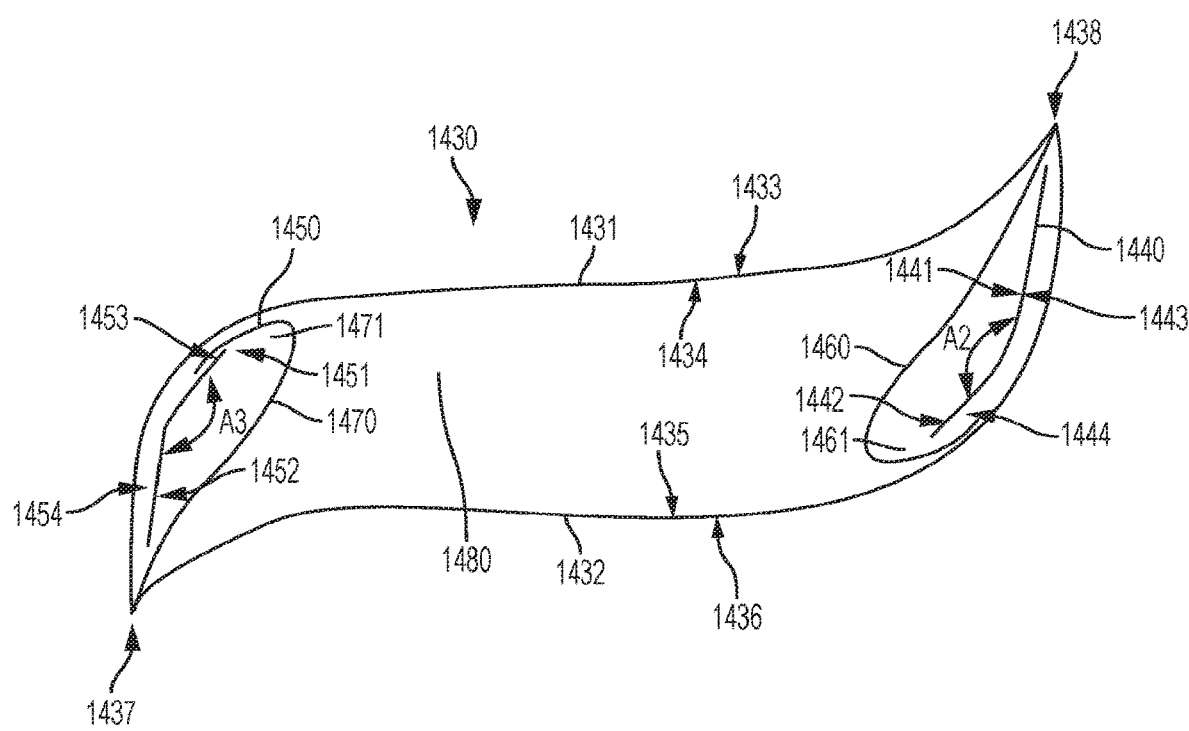
FIG. 14A is an exploded end view of another embodiment of a stiffened multi-layered vane.

Turning to FIGS. 12A, 13A, 14A, various configurations and connections of elongate stiffeners to a multi-layered vane to form various embodiments of a stiffened multi-layered vane are illustrated and will be described in further detail below. Particularly, FIG. 12A illustrates an embodiment of a cellular vane having multiple angled elongate stiffeners oriented and configured so that the angles A2, A3 are in opposite directions and face each other. FIG. 13A illustrates another embodiment of a cellular vane having multiple angled elongate stiffeners oriented and configured so that the angles A2 and A3 are in the same direction. FIG. 14A illustrates an additional embodiment of a cellular vane having multiple angled elongate stiffeners positioned in stiffener pockets and oriented and configured so that the angles A2 and A3 are in opposite directions and face each other.

Figure 12B:
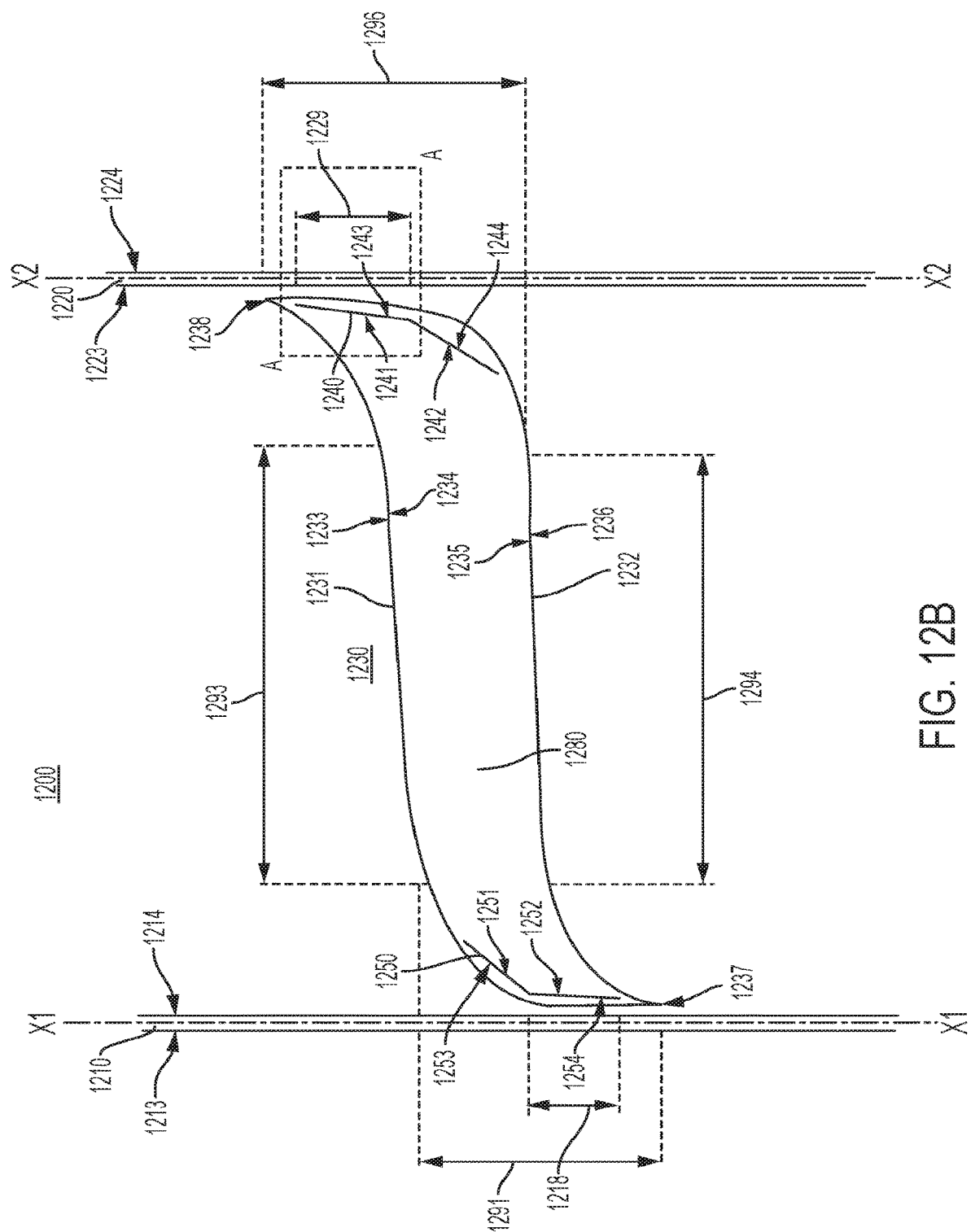
FIG. 12B is an exploded end view of an embodiment of a flexible, light controlling subassembly having the stiffened multi-layered vane illustrated in FIG. 12A and elongate tapes.
Figure 12C:
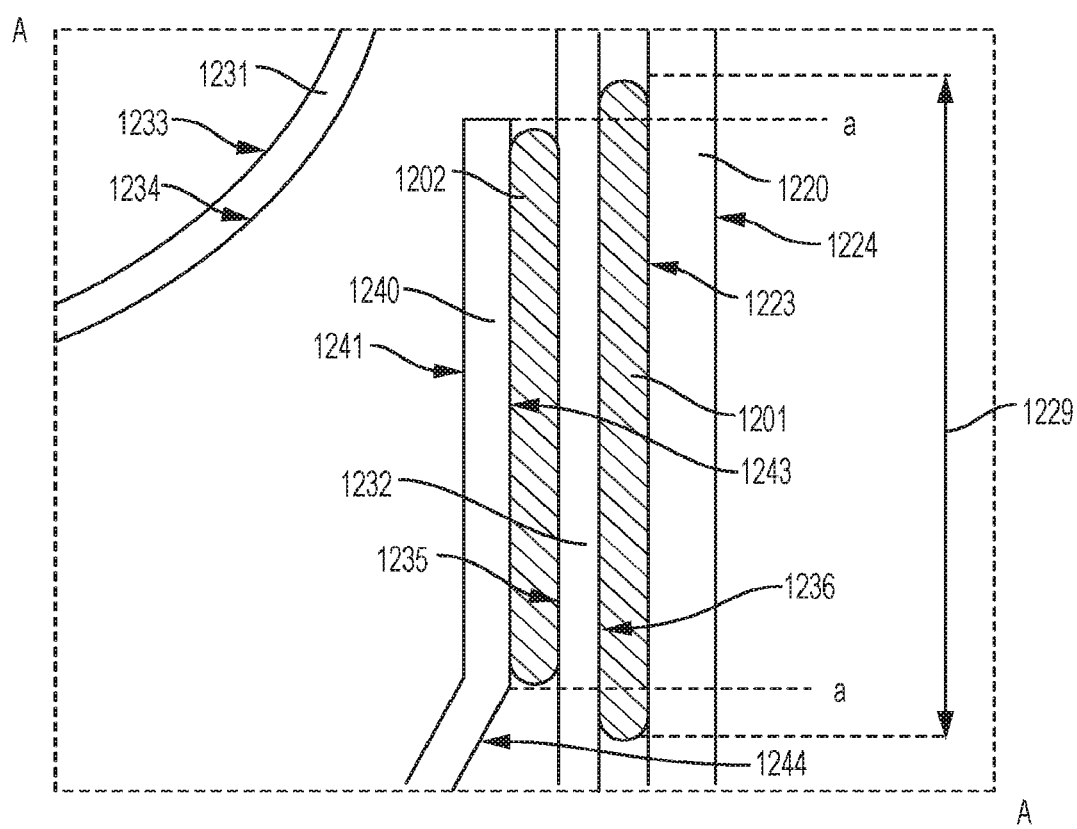
FIG. 12C is a magnified view of portion A-A of FIG. 12B showing the attachment of the multi-layered vane to the elongate tapes.

As illustrated in FIG. 12A-B, and magnified in FIG. 12C, a first angled stiffener 1240 is coupled to and extends along, preferably the entire length of inner face 1235 of outer vane layer 1232 of multi-layer vane 1200 where outer vane layer 1232 extends from longitudinal edge 1237 to longitudinal edge 1238. A second angled stiffener 1250 is coupled to outer face 1234 of inner vane layer 1231 of multi-layer vane 1200 where inner vane layer 1231 extends from longitudinal edge 1237 to longitudinal edge 1238. Multi-layered vane 1200 may be constructed as illustrated in FIGS. 6A-D, 7A-D, 8A-F, or may have other construction as appreciated by one of skill in the art. At least a portion, or the entirety, of third face 1243 of first angled stiffener 1240 may be connected or coupled, directly or indirectly, to inner face 1235 of outer vane layer 1232 within outer edge region 1296 of vane layer 1232, as shown is FIGS. 12B-12C. As shown in FIG. 12C, substantially the entire third face 1243 of angled elongate stiffener 1240 is coupled to outer vane layer 1232 via an adhesive attachment 1202 in the illustrated embodiment, while substantially the entire fourth face 1244 is not coupled to outer vane layer 1232. At least a portion, or the entirety, of fourth face 1254 of second angled stiffener 1250 may be connected or coupled to outer face 1234 of inner vane layer 1231 within inner edge region 1291 of vane layer 1231, while substantially the entire third face 1253 is not coupled to inner vane layer 1231 as shown in FIGS. 12B-12C. The area of attachment for both the first and second stiffeners to the vane layers are about half of the respective widths of the stiffeners, which in one embodiment is preferably about as low as ⅟₁₆ of an inch to as large as about ⅜ of an inch, and may vary therebetween in increments of about ⅟₃₂ of an inch.

First angled stiffener 1240 has an angle A2, between first face 1241 and second face 1242, and has a crown height. Second angled stiffener 1250 has an angle A3 between first face 1251 and second face 1252, and has a crown height. In the embodiment of FIG. 12A, the angles A2 and A3 of the elongate stiffeners face in different directions, and are oriented away from the vane layer to which each stiffener is connected. The angles A2 and A3 of the elongate stiffeners preferably may be as low as about 120 degrees and as large as about 170 degrees and may vary therebetween in increments of about 5 degrees.

Figure 13B:
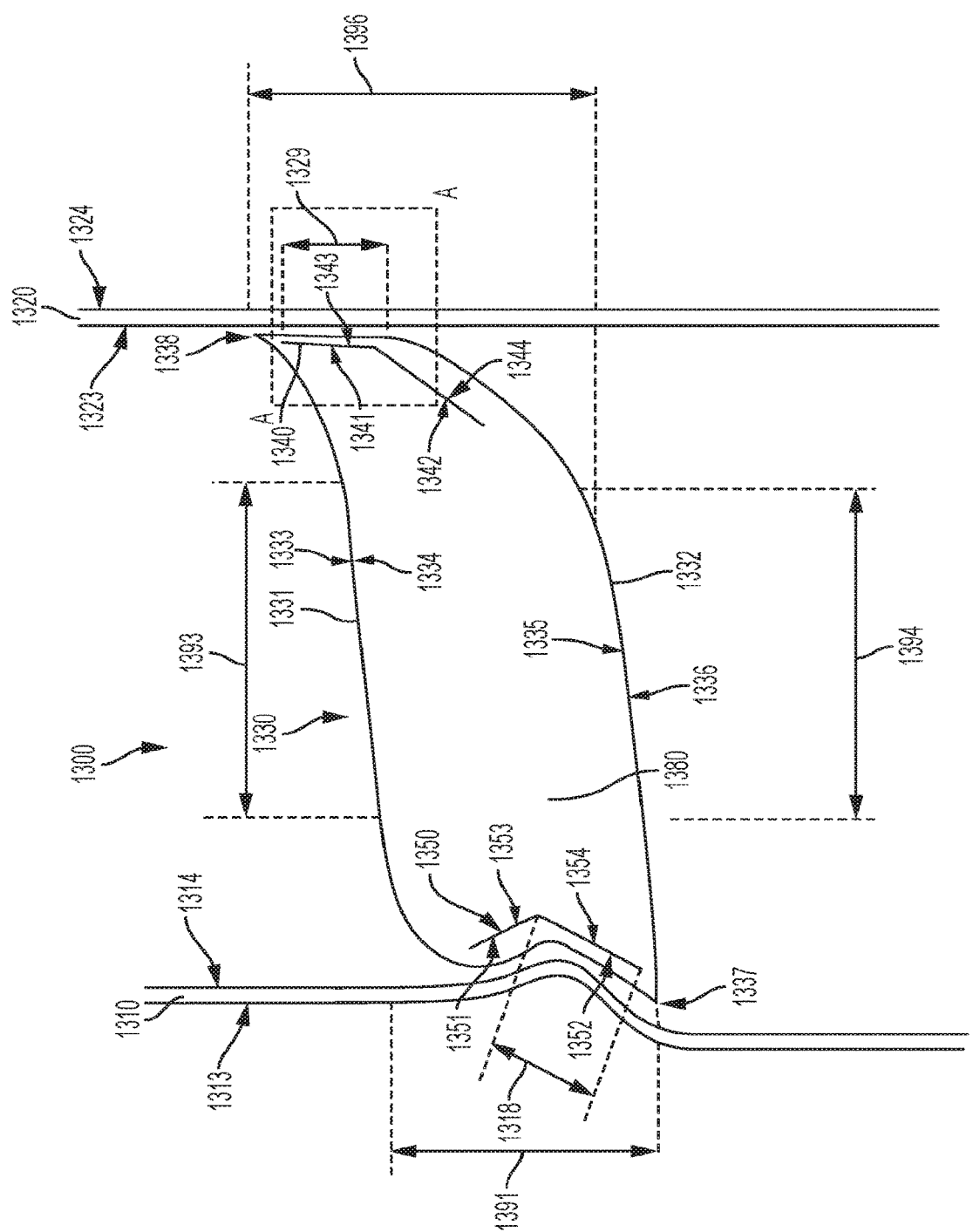
FIG. 13B is an exploded end view of an embodiment of a flexible, light controlling subassembly having the stiffened multi-layered vane illustrated in FIG. 13A and elongate tapes.
Figure 13C:
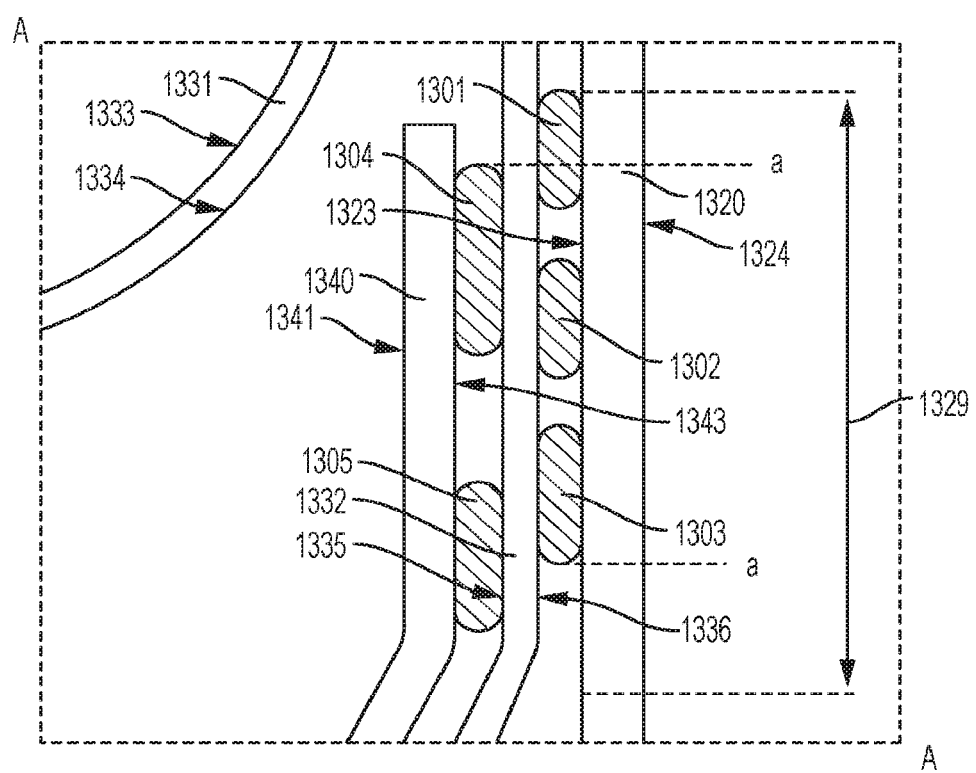
FIG. 13C is a magnified view of portion A-A of FIG. 13B showing the attachment of the multi-layered vane to the elongate types.

Alternatively, as illustrated in FIG. 13A, the stiffeners in another embodiment may be associated with, disposed along, or coupled, directly or indirectly to, a multi-layered vane 1330 in a different manner. Multi-layered vane 1330 may be constructed as illustrated in FIGS. 6A-D, 7A-D, 8A-F, or may have other constructions as appreciated by one of skill in the art. In the multi-layered vane 1330 of FIG. 13A, at least a portion, or the entirety, of third face 1343 of first angled stiffener 1340 may be connected or coupled, directly or indirectly, to inner face 1335 of outer vane layer 1332 within outer edge region 1396 of vane layer 1332 as shown in FIGS. 13B-13C where outer vane layer 1332 extends from longitudinal edge 1337 to longitudinal edge 1338. As illustrated in FIG. 13C, multiple portions making up less than the entirety of third face 1343 of angled stiffener 1340 are coupled to vane layer 1332 via adhesive attachments 1304, 1305. At least a portion, or the entirety, of second face 1352 of second angled stiffener 1350 may be connected or coupled to outer face 1334 of inner vane layer 1331 within inner edge region 1391 of the layer 1331 as shown in FIGS. 13B-C where inner vane layer 1331 extends from longitudinal edge 1337 to longitudinal edge 1338.

First angled stiffener 1340 has an angle A2 between first face 1341 and second face 1342, and has a crown height and second angled stiffener 1350 has an angle A3 between first face 1351 and second face 1352, and has a crown height. In the embodiment, as illustrated in FIG. 13A, the angles A2, A3 of elongate stiffeners 1340, 1350 are less than 180 degrees, and preferably about 120 degrees to about 170 degrees, and face in the same direction such that the elongate stiffeners can be stacked or nested together when the architectural covering is rolled up.

Figure 14B:
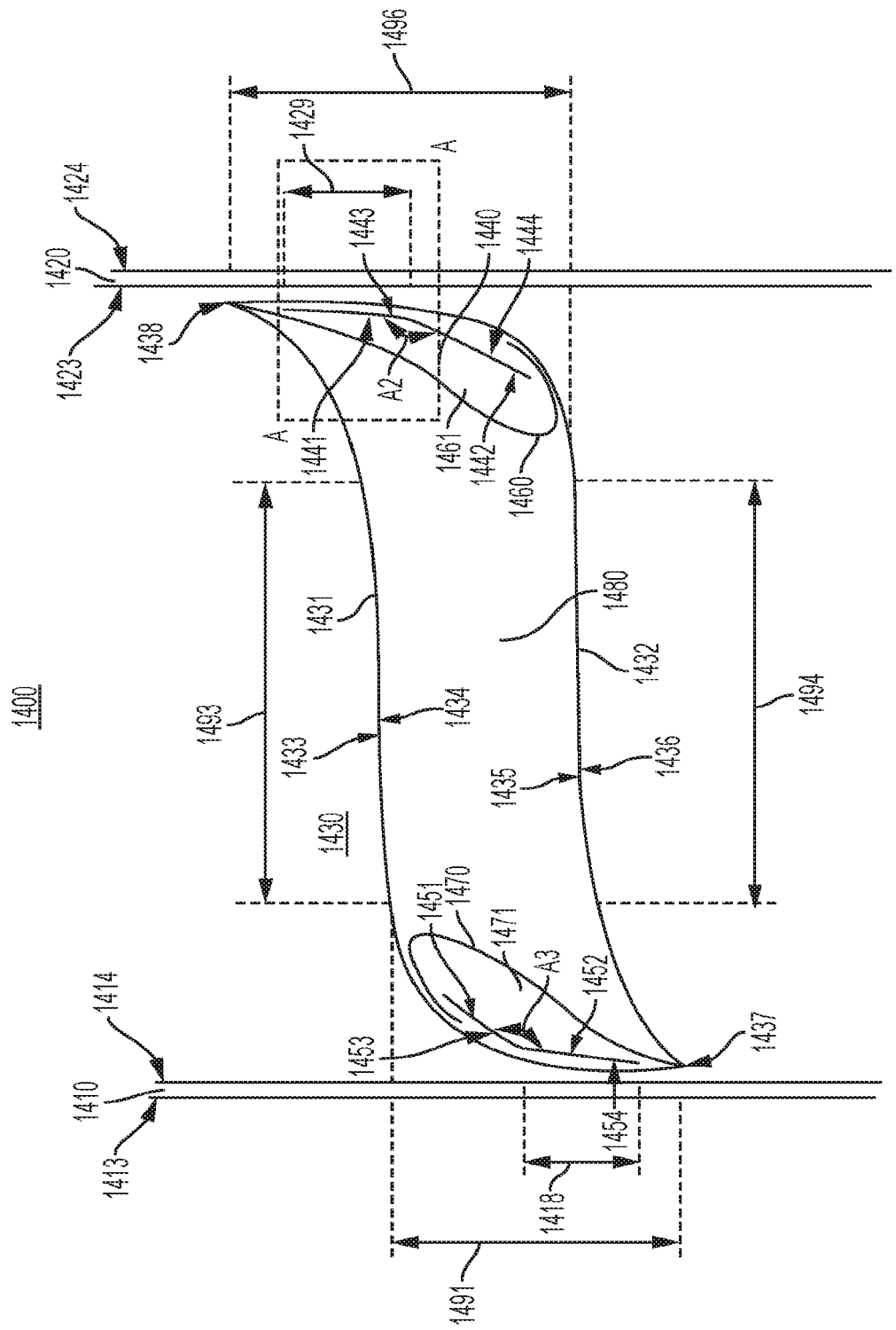
FIG. 14B is an exploded end view of an embodiment of a flexible, light controlling subassembly having the stiffened multi-layered vane illustrated in FIG. 14A and elongate tapes.

Additionally, as illustrated in FIG. 14A, the stiffeners in another embodiment are associated with, disposed along, or connected indirectly to, the multi-layered vane 1430 in a different manner. Multi-layered vane 1430 may be constructed as illustrated in FIGS. 9A-B, but may have other constructions as appreciated by one of ordinary skill in the art. In multi-layered vane 1430 of FIG. 14A, and as magnified in FIG. 14C, a first angled stiffener 1440 is connected to the multi-layered vane 1430 by being constrained in a pocket 1461 formed between a first stiffener pocket sheet 1460 and inner face 1435 of outer vane layer 1432. First angled stiffener 1440 is associated with, disposed along, connected to, and/or constrained with respect to outer vane layer 1432 within outer edge region 1496 of vane layer 1432 as shown in FIG. 14B where outer vane layer 1432 extends from longitudinal edge 1437 to longitudinal edge 1438. A second angled stiffener 1450 is also connected to the multi-layered vane 1430 by being constrained in a pocket 1471 formed between a second stiffener pocket sheet 1470 and outer face 1434 of inner vane layer 1431. Second angled stiffener 1450 is associated with, disposed along, connected to, and/or constrained with respect to inner vane layer 1431 within inner edge region 1491 of vane layer 1431 as shown in FIGS. 14A-14B where inner vane layer 1431 extends from longitudinal edge 1437 to longitudinal edge 1438.

First face 1441 and second face 1442 of first angled stiffener 1440 form an angle A2 less than 180 degrees that is oriented towards first stiffener pocket sheet 1460, while third face 1443 and fourth face 1444 of first angled stiffener 1440 are oriented towards inner face 1435 of outer vane layer 1432. First face 1451 and second face 1452 of second angled stiffener 1450 form an angle A3 less than 180 degrees that is oriented towards second stiffener pocket sheet 1470, while third face 1453 and fourth face 1454 of second angled stiffener 1450 are oriented towards outer face 1434 of inner vane layer 1431. In the embodiment of FIG. 14, angled elongate stiffeners 1440, 1450 preferably are constrained in respective pockets 1461, 1471 such that they can move laterally within, but are restrained or prevented from twisting or rotating within, pockets 1461, 1471 such that the orientation of the faces and angles may alter slightly but is substantially fixed.

The angle of each stiffener and the crown height of each stiffener facilitate the formation of a cell between the outer vane layer and the inner vane layer. The connection and orientation of the angled stiffeners, as well as the construction of the vane, also facilitates formation of the cell. Preferably, the cell extends the length of the vane, and, together with the vane layers, forms a sleeve-like or tube-like structure, preferably with open ends. While the multi-layered vanes have been shown with an angled stiffener it will be appreciated that stiffeners such as those illustrated in FIGS. 11A-D may be used, and other shapes and sizes are contemplated.

Figure 14C:
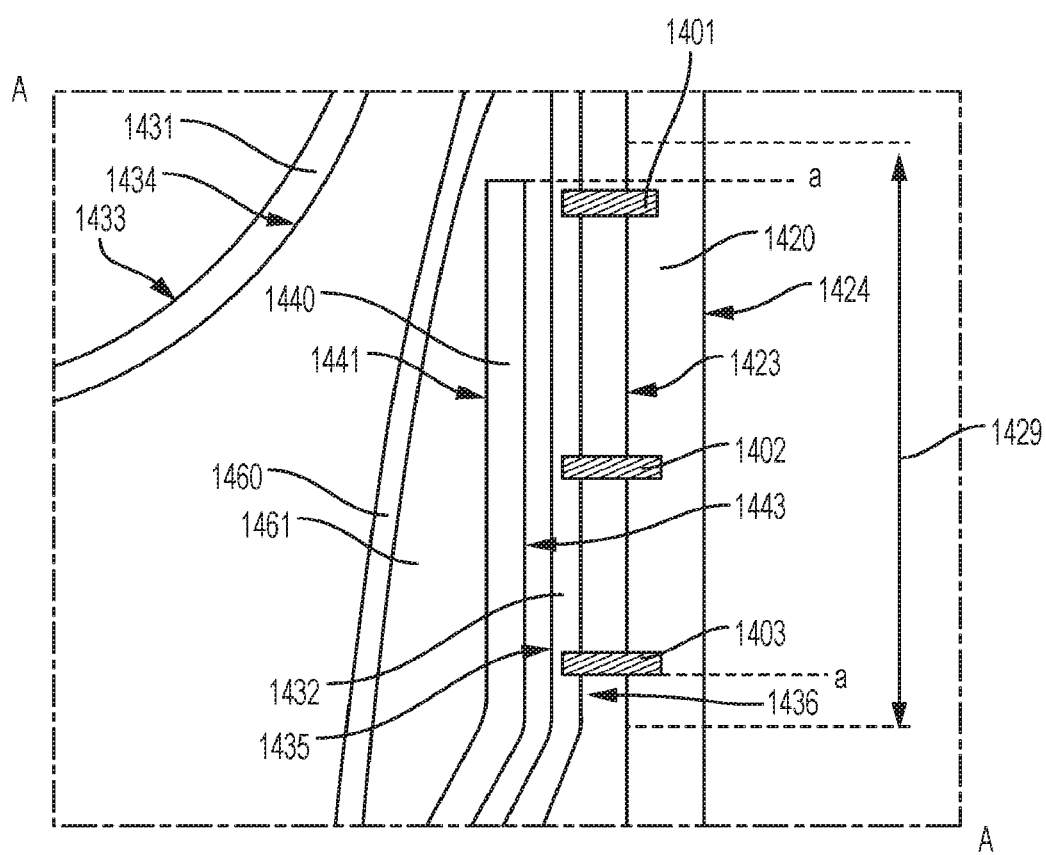
FIG. 14C is a magnified view of portion A-A of FIG. 14B.

As illustrated in FIGS. 12C, 13C, 14C, a stiffener may be coupled, directly or indirectly, to a vane along an entire face of the stiffener (FIG. 12C), along a portion or multiple portions of the face of the stiffener (FIG. 13C), or by constrained association (FIG. 14C). A stiffener may be coupled to a vane by an adhesive, one or more fasteners, stitching, three dimensional weaving, welding, constraining pockets and/or other known methods or methods to be developed in the future.

Furthermore, in some embodiments, a stiffener may be coupled to a vane along a portion or portions of the length of the vane. In other embodiments, a stiffener may be continuously coupled to a vane along its entire length. In some embodiments, a stiffener may be intermittently coupled to a vane along a portion of, or the entire length of, the vane. The angles A2, A3 as well as the crown height may be different for each stiffener.

Attachment of Vanes to Tapes

Turning to FIGS. 12B, 13B, 14B, various configurations and embodiments of a stiffened multi-layered vane are illustrated in exploded views as associated with and/or connected directly or indirectly to elongate tapes to form various embodiments of a subassembly. Particularly, FIG. 12B illustrates an exploded view of an embodiment of a stiffened multi-layered vane, constructed as described and illustrated in FIG. 12A, oriented and coupled to multiple elongate tapes; FIG. 13B illustrates an exploded view of an embodiment of a stiffened multi-layered vane, constructed as described and illustrated in FIG. 13A, oriented and coupled to multiple elongate tapes; and FIG. 14B illustrates an exploded view of an embodiment of a multi-layered vane, constructed as described and illustrated in FIG. 14A, oriented and coupled to multiple elongate tapes. FIGS. 12C, 13C, 14C, illustrate magnified views of respective portions of the embodiments of FIGS. 12B, 13B, and 14B. It will be appreciated that while much of the description is directed to a stiffened vane, vanes including multi-layered vanes that do not include elongate stiffeners are contemplated.

In the embodiments of FIGS. 12B, 13B, 14B, the subassembly includes stiffened, multi-layered vanes disposed between and coupled directly to outer elongate tapes and inner elongate tapes. More specifically, the length of the stiffened, multi-layered vanes are oriented transversely with respect to a first longitudinal axis X1 of the first inner elongate tape and oriented transversely with respect to a second longitudinal axis X2 of the first outer elongate tape, preferably with the longitudinal edges of the multi-layered vane being substantially and preferably perpendicular to longitudinal axis X1, X2.

Preferably, in the embodiment of FIG. 12B, inner face 1233 of inner vane layer 1231 is coupled to an area 1218 on outer face 1214 of first inner elongate tape 1210. Preferably, outer face 1236 of outer vane layer 1232 is coupled, directly or indirectly, to an area 1229 on inner face 1223 of outer elongate tape 1220. More preferably, as illustrated in FIG. 12C, due to the attachment 1202 of angled stiffener 1240 to vane 1232 and attachment 1201 of tape 1220 to vane 1232 being at least partially within an area of alignment (a-a), the area 1229 of inner face 1223 of outer elongate tape 1220 is aligned and juxtaposed with third face 1243 of first angled stiffener 1240. Similarly, the area 1218 of outer face 1214 of inner elongate tape 1210, where inner face 1233 of inner vane layer 1231 is coupled to inner elongate tape 1210, is preferably aligned and juxtaposed with fourth face 1254 of second angled stiffener 1250. The angles A2, A3 of the elongate stiffeners preferably face in different directions and are oriented towards each other as shown in FIG. 12B.

Preferably, in the embodiment of FIG. 13B, inner face 1333 of inner vane layer 1331 is coupled, directly or indirectly, to an area 1318 of outer face 1314 of first inner elongate tape 1310 and outer face 1336 of outer vane layer 1332 is coupled, directly or indirectly, to an area 1329 of inner face 1323 of outer elongate tape 1320. More preferably, as illustrated in FIG. 13C, due to the attachment of angled stiffener 1340 to vane 1332 at areas 1304, 1305 and the attachment of tape 1320 to vane 1342 at areas 1301, 1302, 1303 being at least partially within an area of alignment (a-a), the area 1329 of inner face 1323 of outer elongate tape 1320 is aligned and juxtaposed with third face 1343 of first angled stiffener 1340. Similarly, area 1318 of inner face 1313 of inner elongate tape 1310 where inner face 1333 of inner vane layer 1331 is coupled to inner elongate tape is preferably aligned and juxtaposed with second face 1352 of second angled stiffener 1350. The angles A2, A3 of elongate stiffeners 1340, 1350 preferably face in the same direction, as shown in FIG. 13A.

Preferably, in the embodiment of FIG. 14B, inner face 1433 of inner vane layer 1431 is coupled, directly or indirectly, to an area 1418 of outer face 1414 of first inner elongate tape 1410 and outer face 1436 of outer vane layer 1432 is coupled, directly or indirectly, to an area 1429 of inner face 1423 of outer elongate tape 1420. More preferably, as illustrated in FIG. 14C, due to angled stiffener 1440 being constrained and the attachment of tape 1420 to vane 1442 at areas 1401, 1402, 1403 being at least partially within an area of alignment (a-a), the area 1429 of inner face 1423 of outer elongate tape 1420 is aligned and juxtaposed with third face 1443 of first angled stiffener 1440. Similarly, area 1418 of inner face 1413 of inner elongate tape 1410, where inner face 1433 of inner vane layer 1431 is coupled to inner elongate tape 1410, is aligned and juxtaposed with fourth face 1454 of second angled stiffener 1450. The angles A2, A3 of the elongate stiffeners preferably face in different directions and are oriented towards each other, as shown in FIG. 14B.

In some embodiments a layer of a vane can be coupled, directly or indirectly, to the elongate tapes along a single dimensional contact or bonding area such as, for example, a straight line or dot, or the layer of a vane can be coupled, directly or indirectly, to the tapes along a two-dimensional contact or bonding area that lies within the plane of the tapes. For example, the contact or bonding area can be generally rectangularly-shaped, triangularly-shaped, "X"-shaped, "L"-shaped, or any other shape as desired. As illustrated in FIG. 12C, an elongate tape 1220 may be coupled, directly or indirectly, to vane layer 1232 with a single attachment 1201. Alternatively, as illustrated in FIGS. 13C and 14C, an elongate tape may be coupled, directly or indirectly, to vane layer 1332, 1432 with multiple attachment areas and means, e.g., 1301, 1302, 1303, 1401, 1402, and 1403. The flexible material of the vane layers may be coupled to the tapes by an adhesive (as illustrated in FIGS. 12C and 13C), one or more fasteners such as staples or pins (as illustrated in FIG. 14C), stitching, three-dimensional weaving, welding, and/or other known methods or methods to be developed in the future.

Figure 12D:
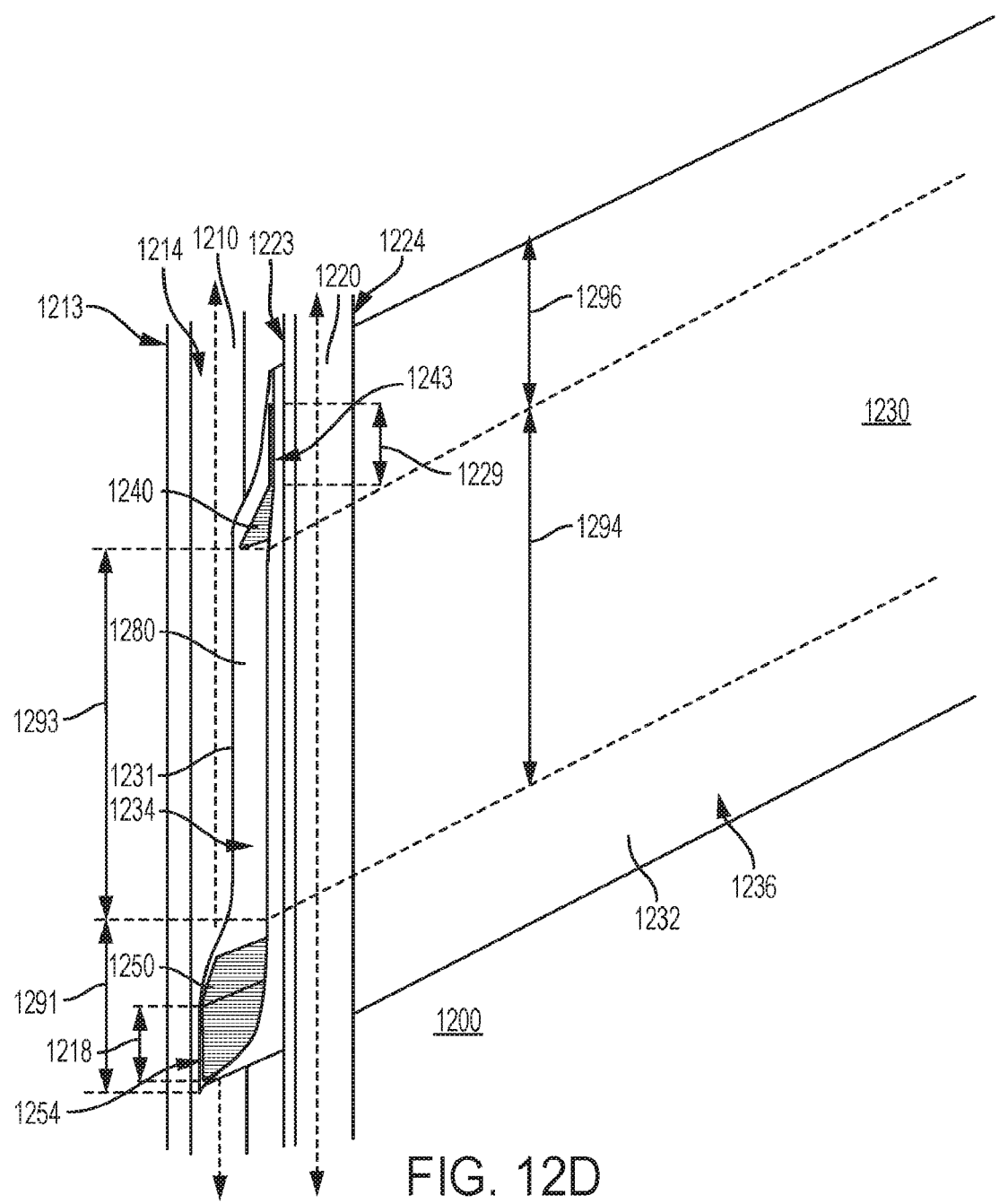
FIG. 12D is a perspective view of the light controlling subassembly illustrated in FIG. 12B in a substantially collapsed configuration.
Figure 12E:
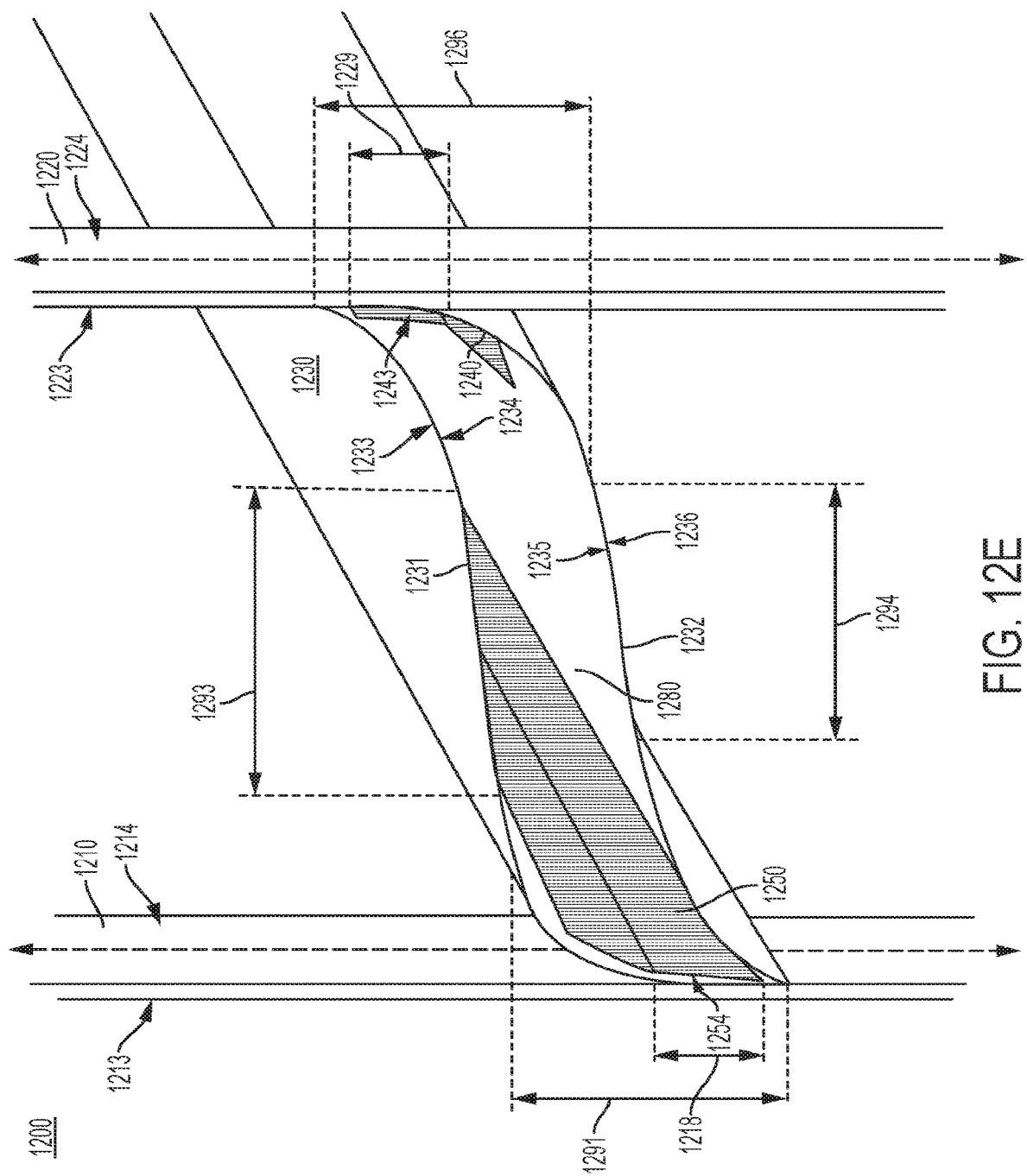
FIG. 12E is a perspective view of the light controlling subassembly illustrated in FIG. 12B in a substantially expanded configuration.
Figure 13D:
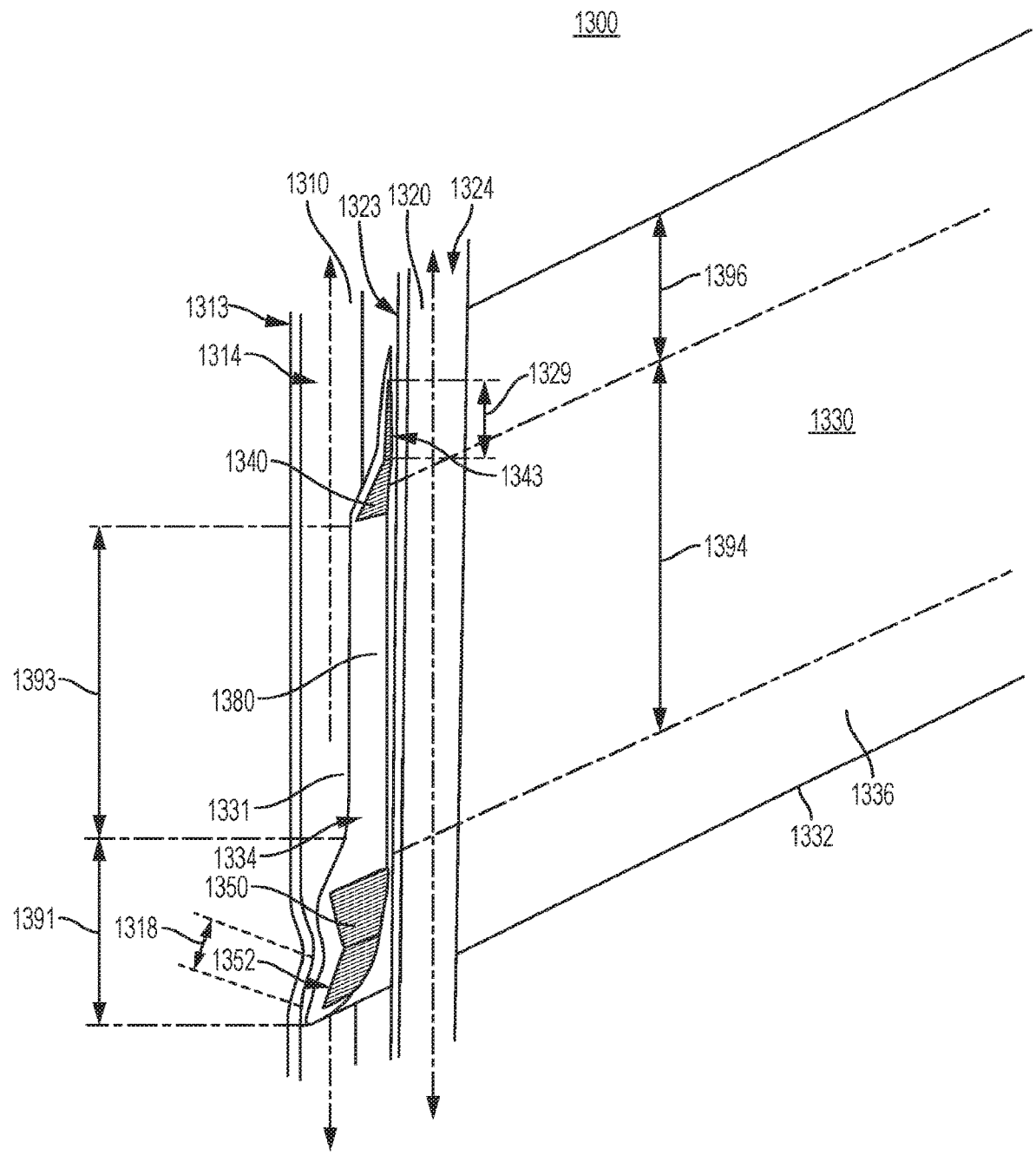
FIG. 13D is a perspective view of the subassembly illustrated in FIG. 13B in an unrolled substantially collapsed configuration with the multi-layered vane in a substantially collapsed position.
Figure 13E:
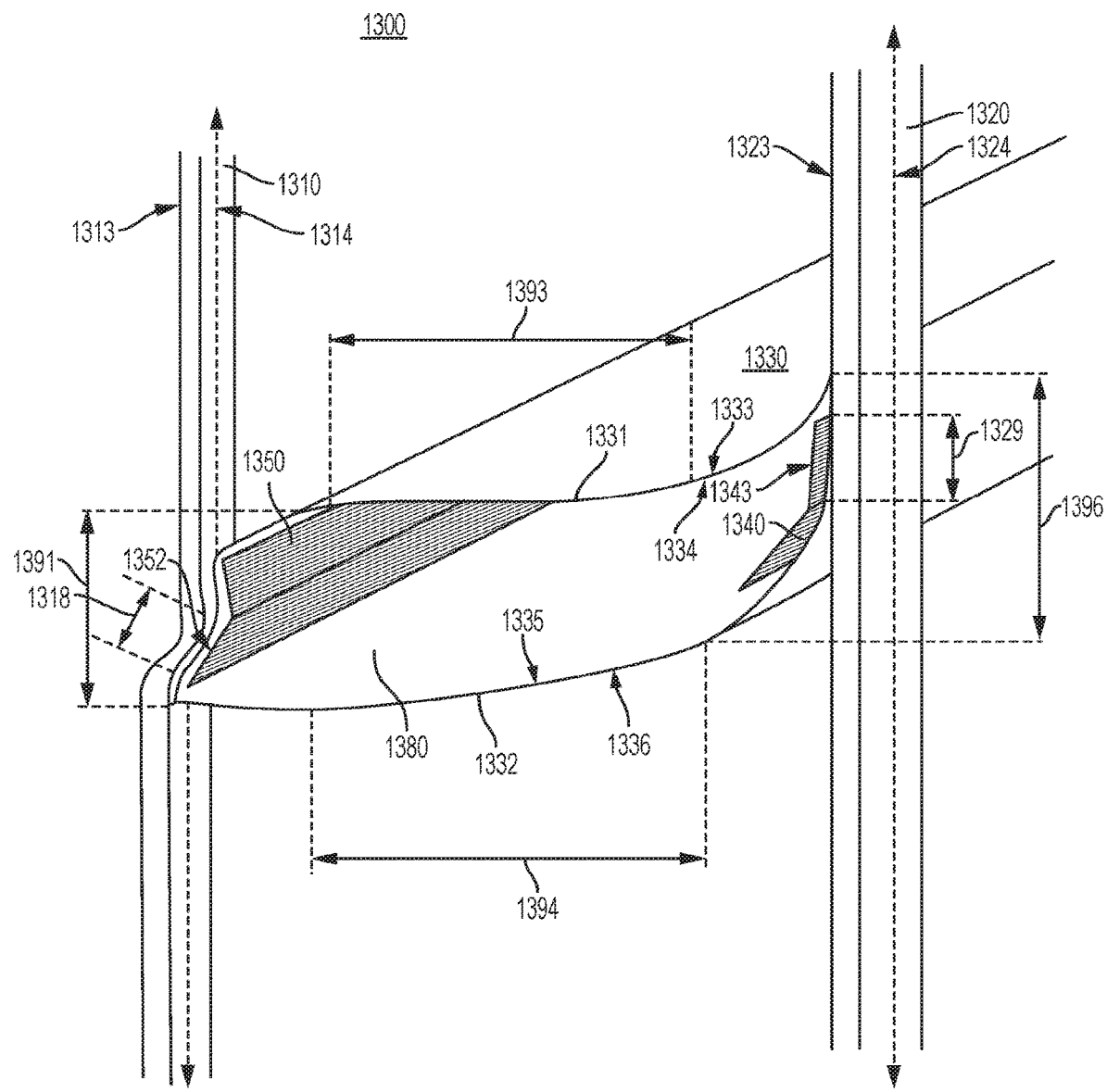
FIG. 13E is a perspective view of the subassembly illustrated in FIG. 13B in an unrolled substantially expanded configuration with the multi-layered vane in a substantially expanded position.
Figure 14D:
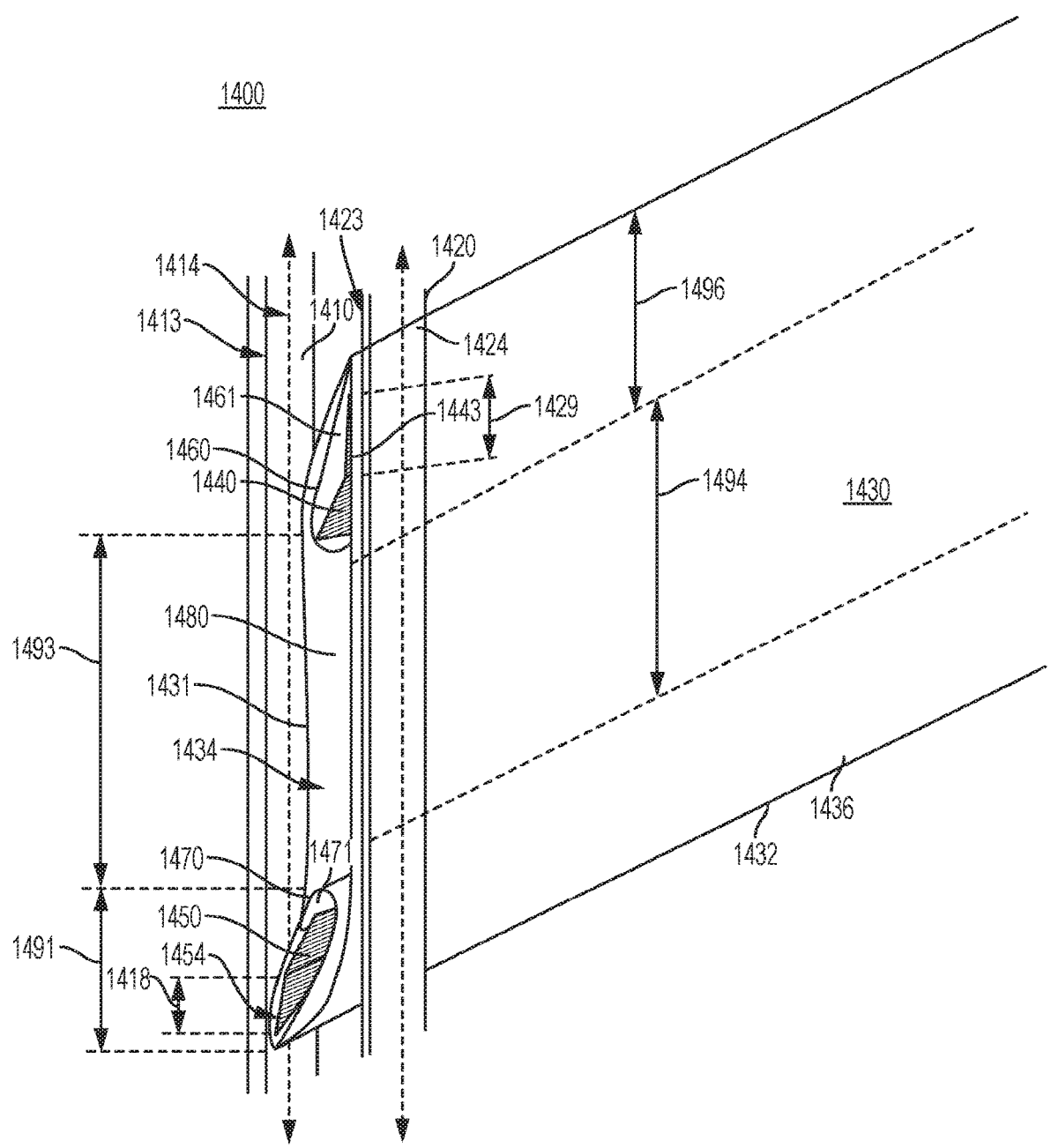
FIG. 14D is a perspective view of the subassembly illustrated in FIG. 14B in a substantially collapsed configuration.
Figure 14E:
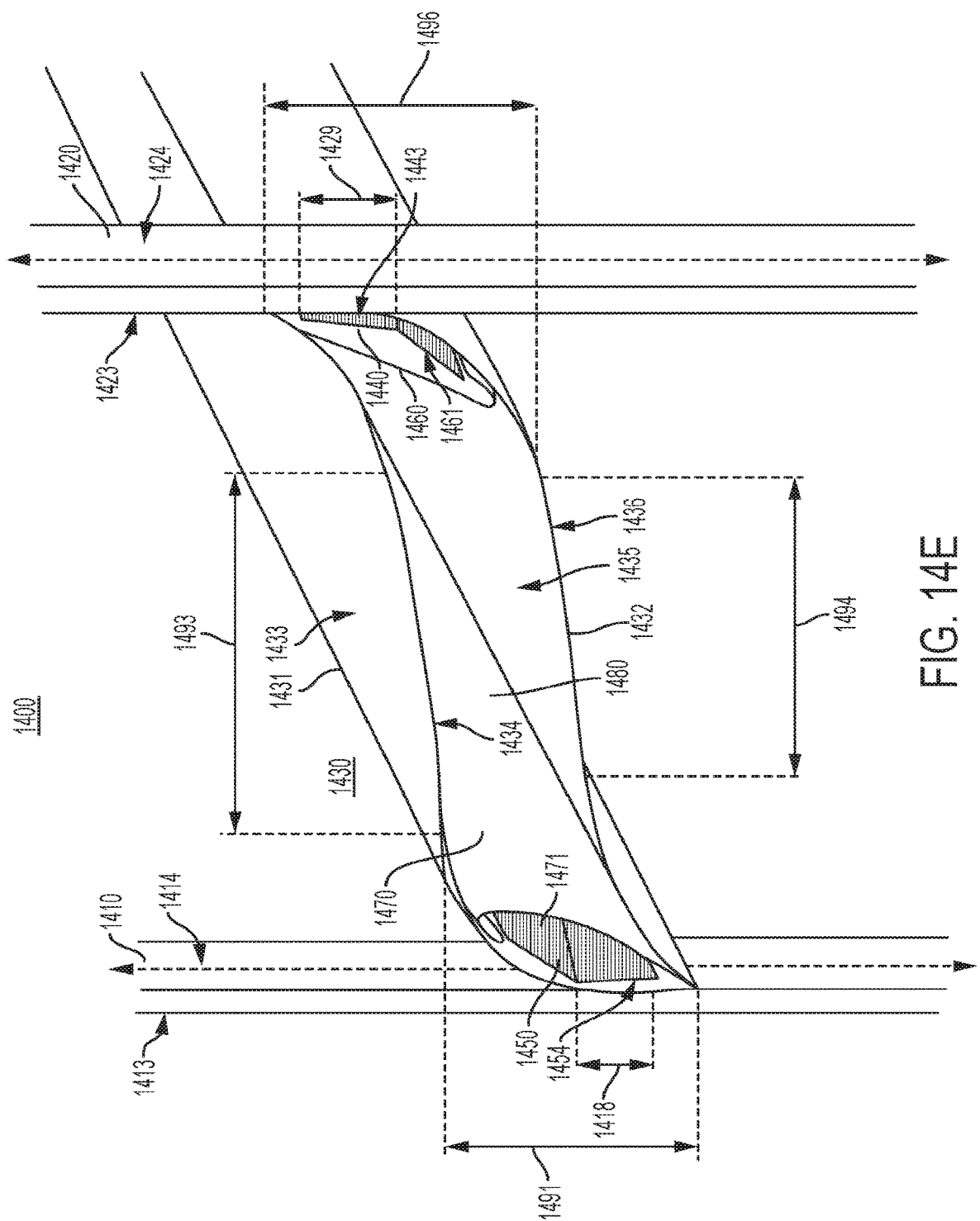
FIG. 14E is a perspective view of the subassembly illustrated in FIG. 14B in a substantially expanded configuration.

Movement of the inner and outer tapes in relation to each other facilitates separating the inner and outer layers of the multi-layered vane as shown in FIGS. 12D-E, 13D-E, 14D-E such that space (cell) 1280, 1380, 1480 can be enlarged and reduced, the vane can be moved and/or pivoted into various positions, and the subassembly can be manipulated into various states of expanded and collapsed configurations. FIGS. 12D, 13D, 14D illustrate various embodiments of a subassembly with a multi-layered vane in a collapsed or substantially collapsed position with the middle regions vertical or substantially vertical, while FIGS. 12E, 13E, 14E illustrate the various embodiments of a subassembly with a multi-layered vane in expanded or substantially expanded positions with the middle regions generally or substantially horizontal. Preferably, in the fully-unrolled, expanded configuration the subassembly has a plurality of sleeve-like or tube-like structures fully circumscribing a space or cell along its length that is disposed and extending between one or more inner and outer elongate tapes. The cell or space of the sleeve-like or tube-like structures may have any cross-sectional shape.

Preferably, as shown in FIGS. 12D, 13D, and 14D, the vane layers are connected to the elongate tapes such that inner edge regions 1291, 1391, 1491 of inner vane layers 1231, 1331, 1431 are substantially parallel to a portion (e.g. 1218, 1318, 1418) of inner elongate tapes when the multi-layered vanes are in both the substantially collapsed and substantially expanded positions and when at least the middle regions of the vanes are both substantially vertical and substantially horizontal. Outer edge regions 1296, 1396, 1496 of outer vane layers 1232, 1332, 1432 also are preferably substantially parallel to at least a portion (e.g., 1229, 1329, 1429) of the outer elongate tapes when the vanes are in both the substantially collapsed and substantially expanded positions. More preferably, third faces 1243, 1343, 1443 of first angled stiffeners 1240, 1340, 1440 are substantially vertical, and fourth faces 1254, 1454 of second angled stiffeners 1250, 1450 are substantially vertical, when the vanes are in both the substantially collapsed and substantially expanded positions as illustrated in FIGS. 12D-E, 13D-E and 14D-E). The second face 1352 of the second angle stiffener 1350, however, as shown in FIGS. 13D-13E, may not be substantially vertical in the substantially extended or substantially collapsed positions.

Furthermore, when the vanes are in the substantially collapsed position as shown in FIGS. 12D, 13D, and 14D, preferably the areas 1229, 1329, 1429 of inner faces 1223, 1323, 1423 of the outer elongate tapes are vertically separated from areas 1218, 1318, 1418 of outer faces 1214, 1314, 1414 of inner elongate tapes by a distance greater than the horizontal distance separating the elongate tapes, and preferably middle regions 1294, 1394, 1494 of outer vane layers 1232, 1332, 1432 are separated from middle regions 1293, 1393, 1493 of inner vane layers 1231, 1341, 1441 by a distance smaller than the width of first angled stiffeners 1240, 1340, 1440 and/or the width of second angled stiffeners 1250, 1350, 1450. More preferably, when the vanes are in the substantially collapsed position, the middle regions of the vane layers are separated by a distance of about the crown height of the first angled stiffener and/or the crown height of the second angled stiffener.

Furthermore, when the vanes are in the substantially expanded position as shown in FIGS. 12E, 13E, and 14E, preferably areas 1229, 1329, 1429 of inner faces 1223, 1323, 1423 of the outer elongate tapes are vertically separated from areas 1218, 1318, 1418 of outer faces 1214, 1314, 1414 of the inner elongate tapes by a distance less than the horizontal distance separating the elongate tapes, and preferably the middle regions of the outer vane layers are separated from the middle regions of the inner vane layers by a distance greater than the crown height of first angled stiffeners 1240, 1340, 1440 and/or the crown height of second angled stiffeners 1250, 1350, 1450. More preferably, when vanes 1230, 1330, 1430 are in the substantially expanded position, middle regions 1294, 1394, 1494 of outer vane layers 1232, 1332, 1432 are separated from middle regions 1293, 1393, 1493 of inner vane layers 1231, 1331, 1431 by a distance greater than the width of first angled stiffeners 1240, 1340, 1440 and/or the width of second angled stiffeners 1250, 1350, 1450.

As will be appreciated by one of skill in the art, when the subassembly is in the collapsed configuration and the vanes are in the substantially collapsed position (FIG. 12D, 13D, 14D) the material characteristics and angle of angled stiffeners 1240, 1250, 1340, 1350, 1440, 1450 facilitate keeping vane layers 1231, 1232, 1331, 1332, 1431, 1432 at least partially separated by resisting compressional forces acting on the vane layers and elongate tapes. Furthermore, when the subassembly is moving from an unrolled, collapsed configuration (FIGS. 12D, 13D, 14D) to a fully-unrolled, expanded configuration (FIG. 12E, 13E, 14E), outer elongate tapes 1220, 1320, 1420 and inner elongate tapes 1210, 1310, 1410 move further away from each other, and inner elongate tapes 1210, 1310, 1410 may move slightly vertically such that areas 1218, 1318, 1418 of inner elongate tapes 1210, 1310, 1410 rises, causing the vertical distance separating areas 1218, 1318, 1418 of inner elongate tapes 1210, 1310, 1410 from areas 1229, 1329, 1429 of outer elongate tapes 1220, 1320, 1420 to decrease. When the subassembly is in the fully-unrolled, expanded configuration (FIG. 12E, 13E, 14E), angled stiffeners 1240, 1250, 1340, 1350, 1440, 1450 act to cause vane layers 1231, 1232, 1331, 1332, 1431, 1432 to separate further due to the material characteristics and angle of the angled stiffener resisting the gravitational force that naturally would cause inner vane layers 1231, 1331, 1431 to fall towards respective outer vane layers 1232, 1332, 1432. The larger width of outer vane layers 1232, 1332, 1432 as compared to the respective inner vane layers 1231, 1331, 1431 also facilitates separation of the inner vane layers from the outer vane layers.

Roll-Up of Covering with Stiffened Multi-Layered Vanes

Operation and use of covering having subassemblies including cellular vanes, elongate tapes and elongate stiffeners as described herein may be prone to potential problems as a result of their construction and method of operation, which may result in wrinkles and other imperfections, as well as large and untidy rolls of the light-controlling subassembly. That is, the multiple layers of material from the multi-layered vanes, the elongate tapes and elongate stiffeners may result in a covering that rolls up very large and untidy. Several techniques discussed below may provide possible solutions to the roll-up of the subassemblies described herein.

Figure 15:
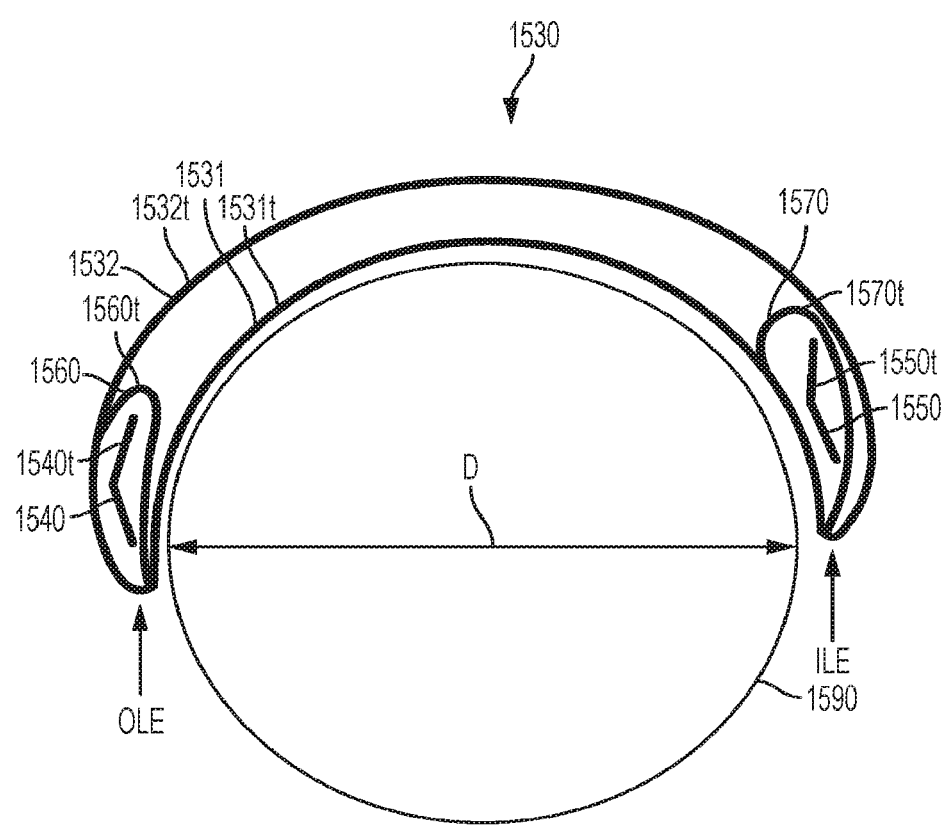
FIG. 15 is an end view of a portion of an embodiment of a roll-up cellular architectural covering with a cellular vane rolled around the roller.

For example, when a multi-layered vane is rolled up about the rotational axis of a roller, such that the multi-layered vane has an arced shape around at least a portion of the roller, as shown in FIG. 15, one vane layer will be located radially inwardly (inner vane or slat layer) from the other vane layer (outer vane or slat layer), which may result in wrinkles and buckling of the subassemblies. To inhibit or prevent wrinkling or buckling from occurring in the vane layers, the outer vane layer may have a larger width than the inner vane layer. In the embodiment of FIG. 15, outer vane layer 1532 has a greater width, which extends between outer longitudinal edge (OLE) and inner longitudinal edge (ILE) of vane 1530, than inner vane layer 1531. The outer vane layer has a greater width to account for the thickness of the tapes and vane construction (e.g., vane layers 1531, 1532, and optionally one or more of elongate stiffeners 1540, 1550, and pocket sheets 1560, 1570), which results in a larger circumference for outer vane layer 1532, thereby requiring a larger width to prevent stress and/or stretching of vane layers, particularly outer vane layer 1532. An exemplary, representative difference in width between an outer vane layer and an inner vane layer for a 1.5-inch diameter roller and an approximately 3.5 inch inner vane width would be about 0.06 inches so that the outer vane width would be about 3.56 inches. Smaller and larger differences between the width of the inner and outer vane layers is contemplated, and the larger width of the outer vane layer is readily calculated based on the diameter of the roller and the thickness of the vanes and the tapes. In other words, the difference in the width between an inner and outer vane layer may be influenced based upon the diameter of the roller, the thickness of the vanes and tapes, the width of the vanes, and the desired aesthetics of the vanes. As the thickness of the vanes and tapes increases, and the diameter of the roller increases, the difference in width between the outer and inner vane width may increase.

Figure 16:
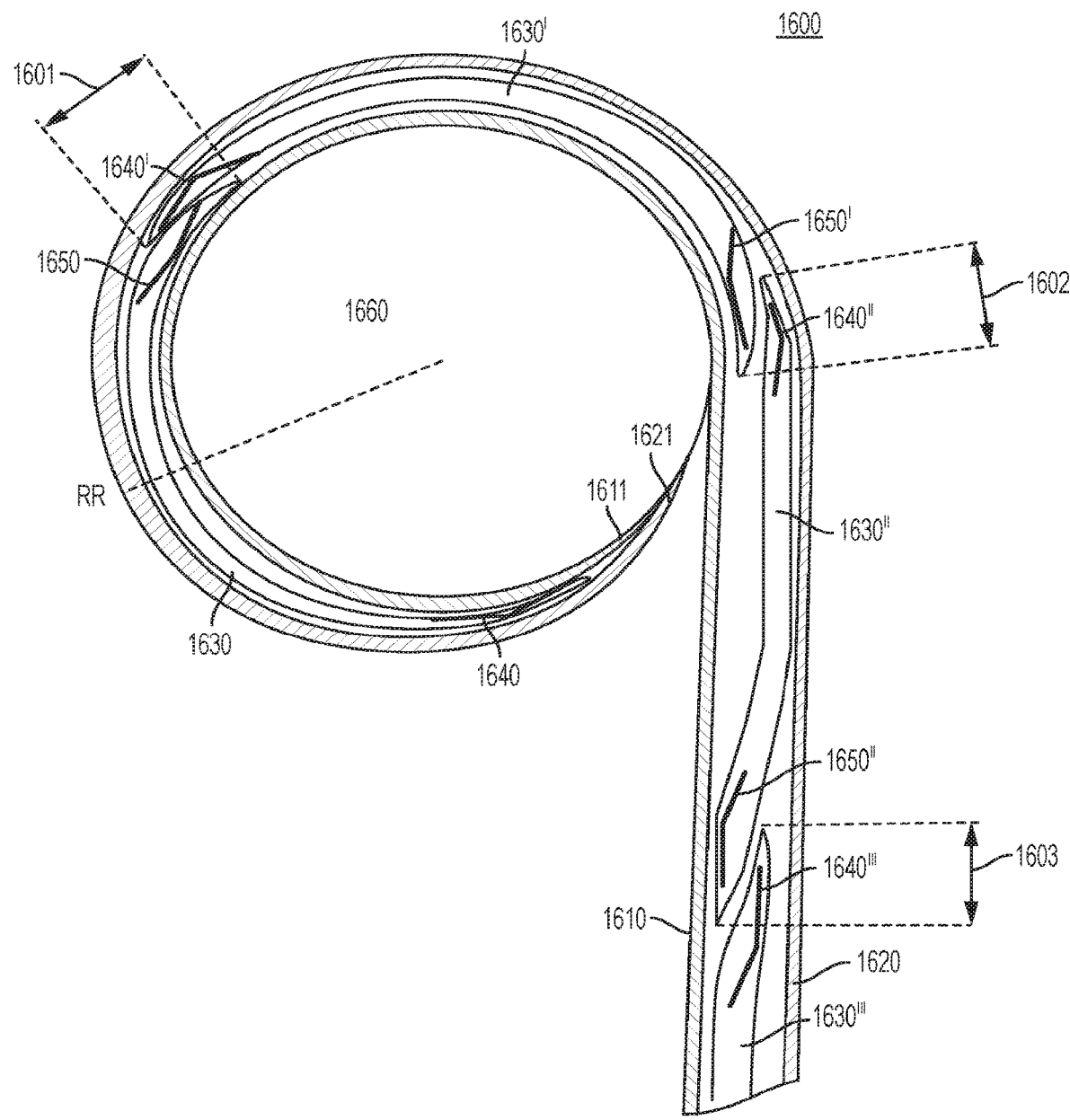
FIG. 16 is an end view of a portion of an embodiment of a roll-up cellular architectural covering with a subassembly in a partially-unrolled, collapsed configuration.

As illustrated in FIG. 16, a roll-up architectural covering 1600 may have a subassembly having inner elongate tapes 1610, outer elongate tapes 1620, a plurality of vanes 1630, a plurality of first elongate stiffeners 1640, and a plurality of second elongate stiffeners 1650, that is rolled about a roller 1660. The numerous layers of material and bulk of material can create a large diameter and mass of materials to be hidden by the head rail. The radius of rollup RR for first vane 1630 is approximately the same radius of curvature as the roller 1660, but the radius grows for every additional vane. When the subassembly is in a rolled configuration, or in a partially unrolled-collapsed configuration, the plurality of vanes may overlap one another as the vanes are rolled around the roller. When rolled about the roller, inner elongate tape 1610 having a first end 1611 is located radially inward along the radius of rollup RR from the corresponding portion of outer elongate tape 1630, having a first end 1621. To minimize the size of the subassembly when rolled about the roller 1660, the respective stiffeners 1650, 1640' of adjacent vanes 1630, 1630' may be positioned about the roller such that a first elongate stiffener 1640' is aligned with and overlaps with a second elongate stiffener 1650 along the radius of rollup in a compact manner as illustrated in FIG. 16. Second vane 1630' partially overlaps the adjacent first vane 1630 within a first area of overlap 1601. Third vane 1630'' partially overlaps the adjacent second vane 1630' within a second area of overlap 1602. Fourth vane 1630''' partially overlaps the adjacent third vane 1630'' within a third area of overlap 1603. In some embodiments, such alignment of respective first and second stiffeners may result in the subassembly rolling up about the roller in a more compact or neat fashion, such that when the subassembly is fully rolled-up about the roller the circumference of the subassembly may be reduced.

Design and Construction of the Roller

Figure 17A:
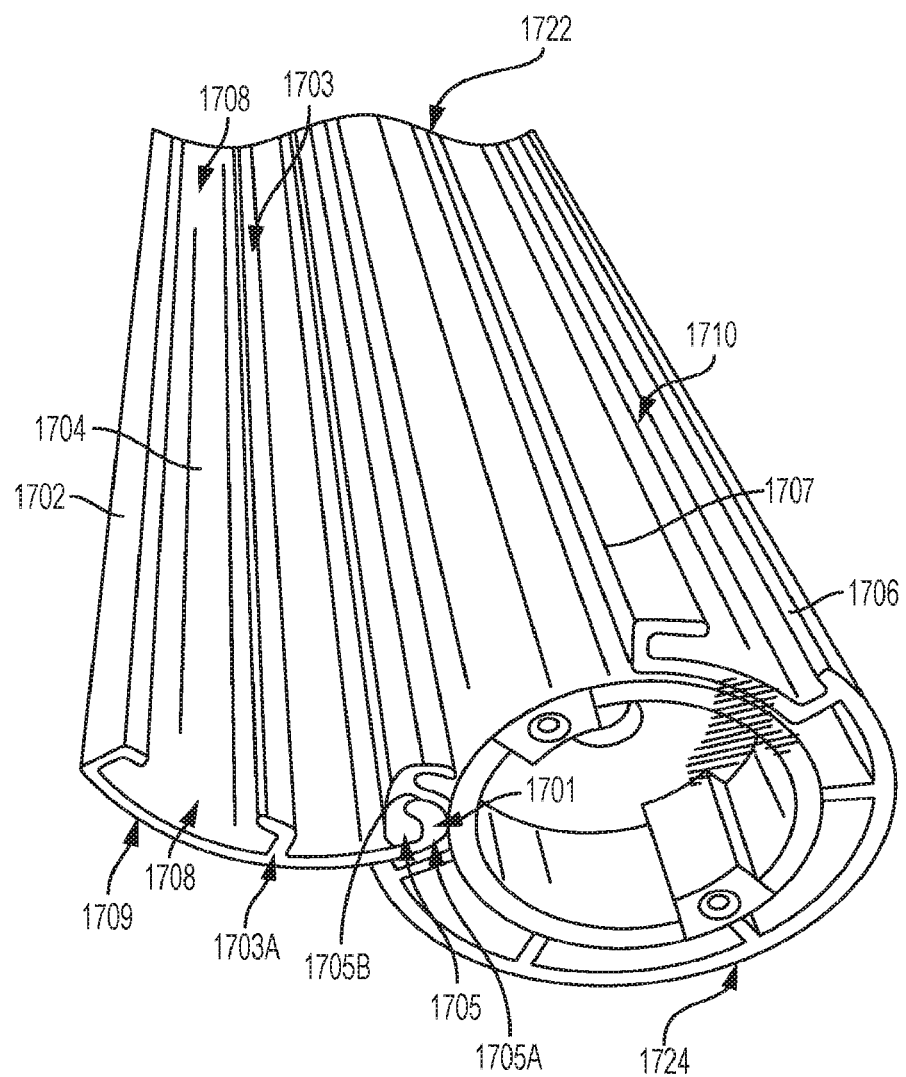
FIG. 17A is a perspective view of an embodiment of a roller having a door in the open position.
Figure 17B:
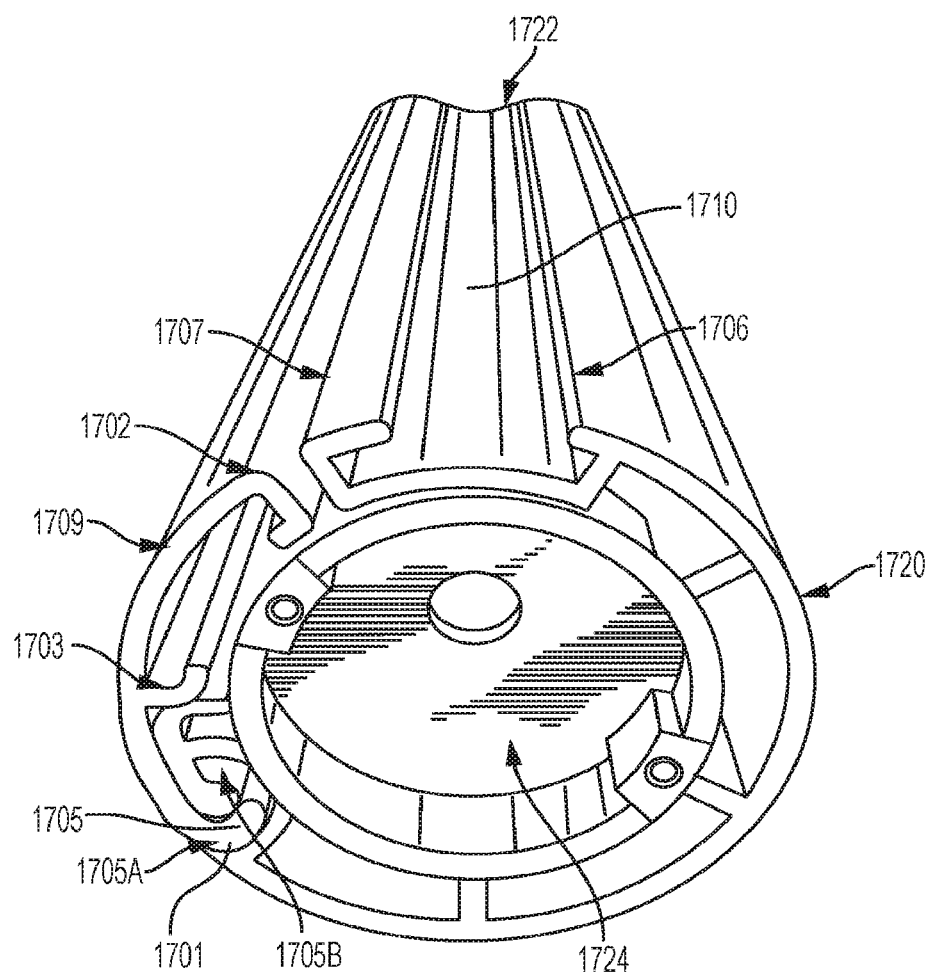
FIG. 17B is a perspective view of the roller of FIG. 17A with the door in a closed position.

In some embodiments, the roller may include an optional door. FIGS. 17A-17B illustrate an embodiment where a door 1700 may be provided on the body of roller 1720. The door may be provided and connected to roller 1720 so that it may open or close (e.g., pivot) by gravitational forces. In one embodiment, the door may have a track 1704 such that at least one insert 1780, for example, a stiffener, can be disposed in track 1704 provided in door 1700. In accordance with a preferred embodiment as illustrated in the FIGS. 17A-17B, door 1700 has a length defined by first end 1722 and second end 1724 of roller 1720, a radial curvature that substantially matches that of roller 1720, an inner end 1701, an outer end 1702, and a width that is defined between inner end 1701 and outer end 1702. The radial curvature of door 1700 may form a concave inner face 1708 and a convex outer face 1709 on door 1700. As illustrated in the exemplary embodiment in FIG. 17A, door 1700 can be coupled to roller 1720 via a latch element 1705 at inner end 1701 of the door, for example, a concavely curved inner end 1705A of door 1700 that is received into a receiving cavity 1705B of roller 1720. Outer end 1702 of door 1700 can be detached from roller 1720 along its length so that the door may freely swing open while the door 1700 remains coupled to the roller at its inner end 1701 via latch element 1705. Door 1700 can be further operable to close by rotating about latch element 1705 so that outer end 1702 of the door 1700 moves toward roller 1720.

In a further embodiment of the present disclosure, as shown in FIG. 17A, a raised ridge 1703 can be integrally provided on concave inner face 1708 of door 1700 along length of door 1700 whereby ridge 1703 and outer end 1702 of the door 1700 form a "C"-shaped track 1704 along length of the door 1700.

Figure 17C:
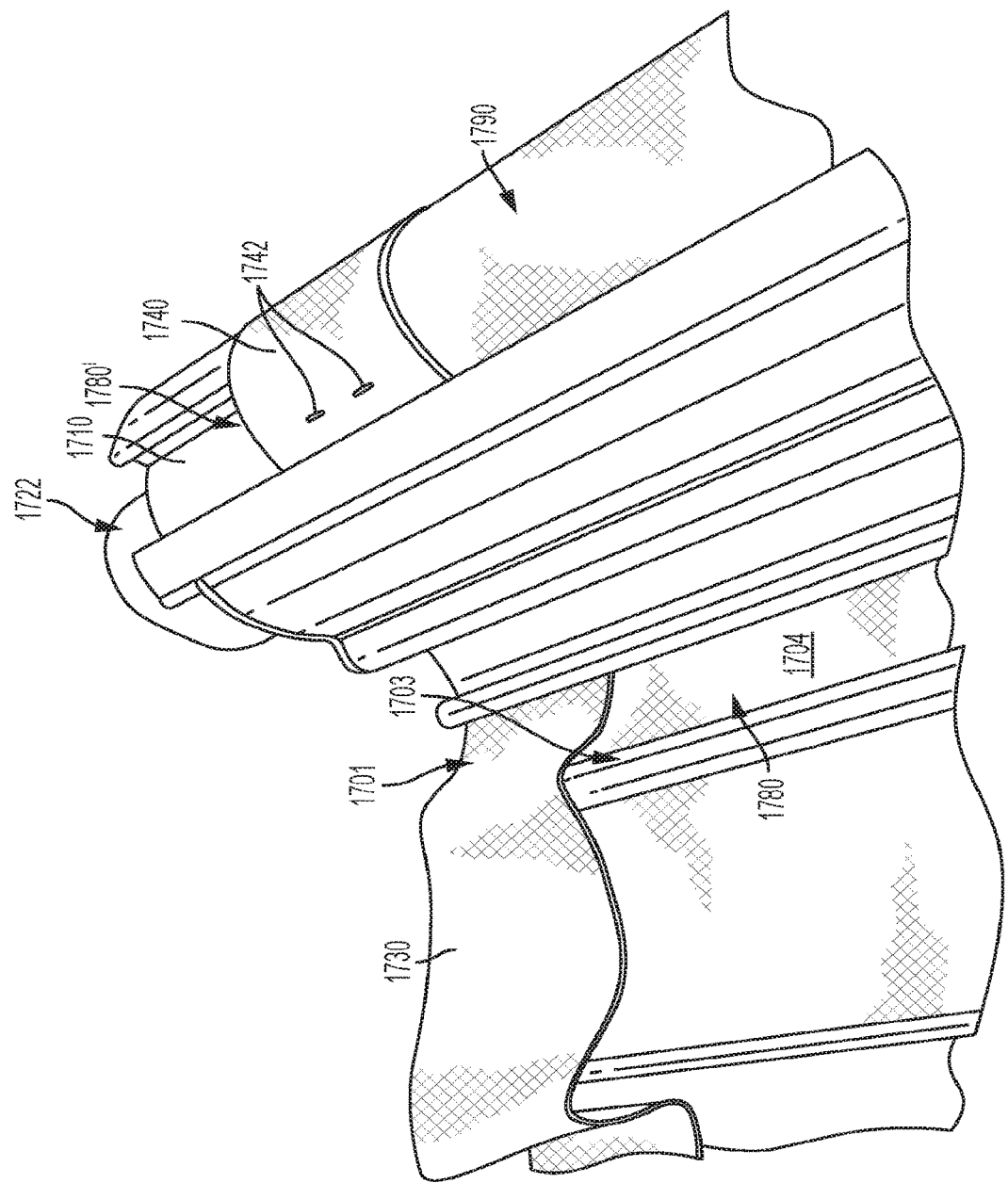
FIGS. 17C-D are perspective views of an embodiment of a subassembly connected to a roller having a door.

In accordance with another embodiment of the present disclosure, as illustrated in FIG. 17B, a "C"-shaped receiving track 1710 can be integrally provided on (e.g., formed into) the body of roller 1720 that has a length defined by first end 1722 and second end 1724 of roller 1720, a radial curvature that substantially matches the curvature of roller 1720, a first end 1706, a second end 1707, and a width defined between first end 1706 and second end 1707 of receiving track 1710. As illustrated in FIG. 17C, receiving track 1710 on roller 1720 can accommodate at least one insert 1780' (not visible) covered by a portion of a vane 1790 such that the insert covered with vane 1790 can be disposed in receiving track 1710 for a portion of or the entire length of receiving track 1710 and vane 1790 overlaying insert 1780' is coupled to an inner face of an outer elongate tape 1740 by, for example, staples 1742. Elongate tape 1740 may be coupled to insert 1780' by other means such as gluing, stitching, tacking, pinning, fusing, welding or other means now known or later developed.

Figure 17D:
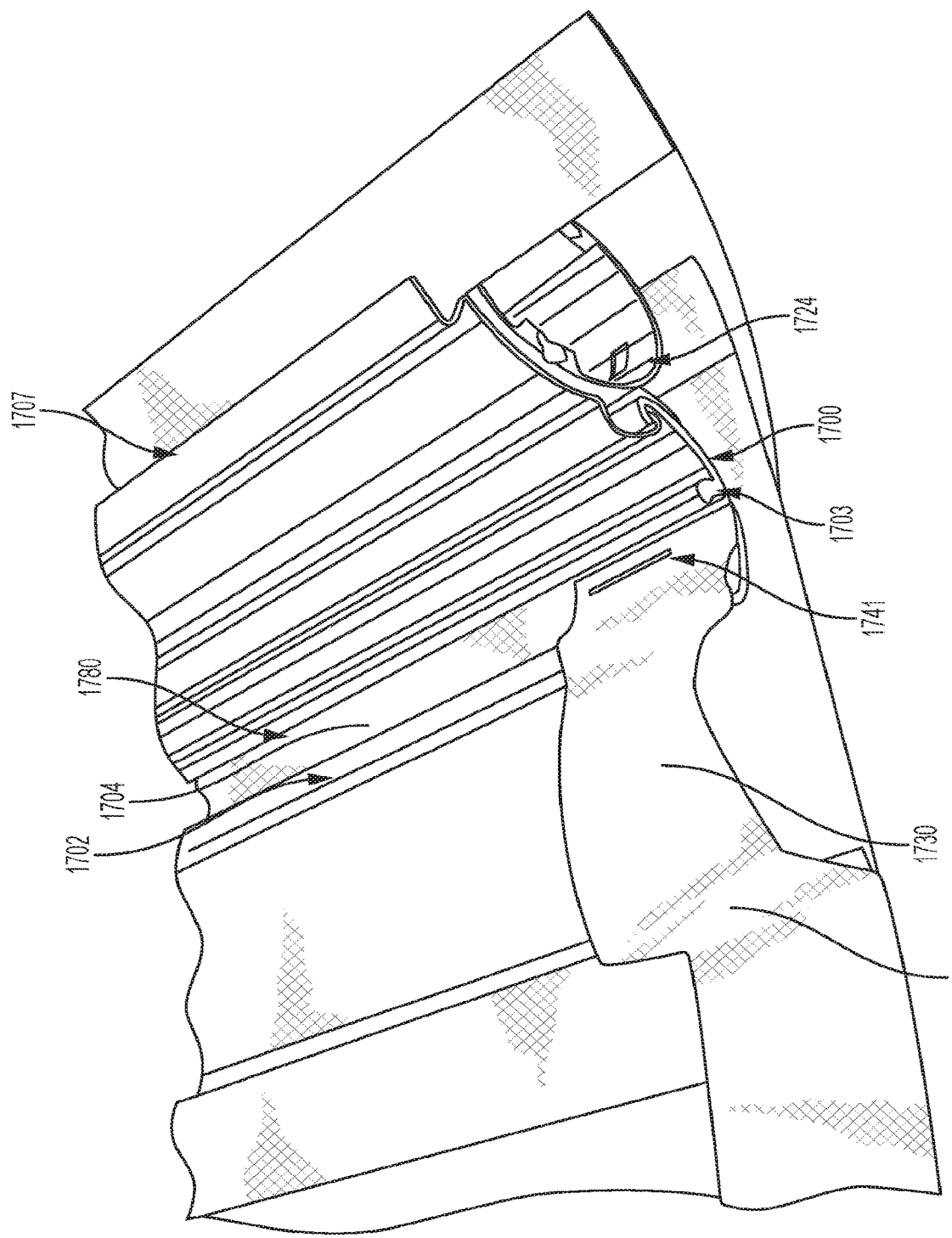
Figure 17E:
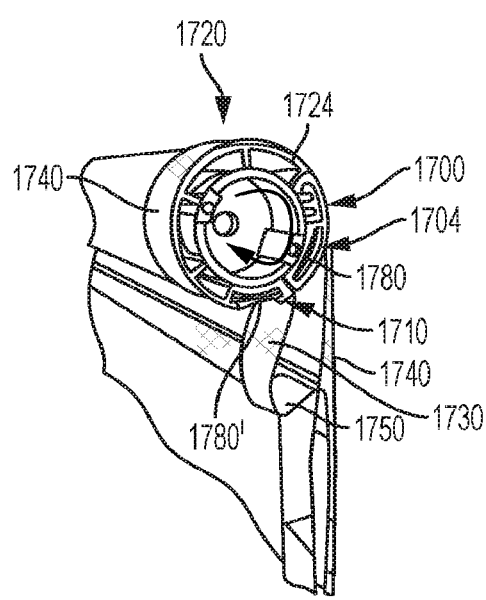
FIGS. 17E-17H are perspective views of a portion of an embodiment of an architectural covering having elongate tapes and vane material connected to a roller including a door at various points of deployment.

As illustrated in detail in FIG. 17D, at second end 1724 of roller 1720, in accordance with one embodiment, a track 1704 on door 1700 can accommodate at least one insert 1780, for example, an elongate stiffener, such that insert 1780 can be disposed in track 1704 for a portion of or the entire length of the track, and insert 1780 can be coupled to an outer face of an inner elongate tape 1730, for example, by staple 1741. Elongate tape 1730 may be coupled to insert 1780 by other means such as gluing, stitching, tacking, pinning, fusing, welding or other means now known or later developed. In one embodiment, insert 1780 may be covered by a flexible fabric overlay.

FIGS. 17E-17H depict progressive views of an embodiment of a roll-up covering that includes a door as illustrated in FIGS. 17A-17B in a process of opening from a closed position. In accordance with the illustrated embodiment, when door 1700 on roller 1720 is in a closed position against roller 1720, track 1704 on door 1700 is adjacent to track 1710 along the circumference of roller 1720. In a closed position in FIG. 17E, the roll-up covering has at least one insert 1780 disposed in track 1704 of door 1700 and at least one insert 1780' disposed in track 1710 of the roller 1720. Insert 1780 disposed in track 1704 is associated with and/or coupled, directly or indirectly, to an inner elongate tape 1730, and insert 1780' disposed in track 1710 is associated with and/or coupled, directly or indirectly, to an outer elongate tape 1740. Each insert 1780, 1780' may be covered with respective fabric overlays. Inner elongate tape 1730 may be associated with and/or coupled to door 1720 by other means and outer elongate tape 1740 may be associated with and/or coupled to the roller by other means, such as by a fastener, glue, stitching, or other methods of attachment now know or later developed.

Figure 17F:
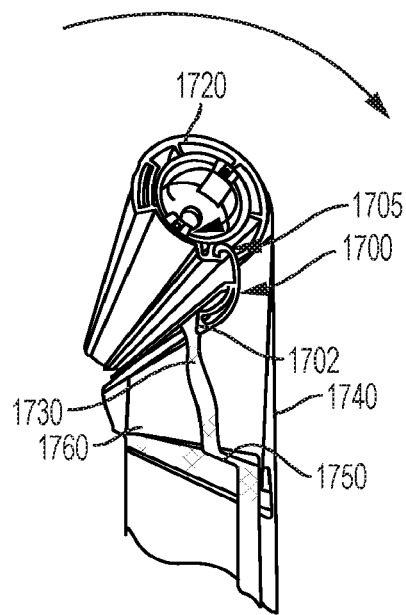

As further illustrated in FIG. 17F, when the subassembly is fully unrolled from the roller, as roller 1720 further unwinds in the direction of the arrow, door 1700 initially opens such that outer end 1702 becomes detached or separated from the body of roller 1720 and door 1700 pivots about latch element 1705 which remains coupled to or hooked in receiving cavity 1705B (shown in FIG. 17A) via concavely curved inner end 1705A (shown in FIG. 17A). As also shown in FIG. 17F, when door 1700 is in an initial open position as illustrated, slack from inner elongate tape 1730 hangs from insert 1780 and buckled portion 1750 of inner elongate tape 1730 may become transverse to and/or substantially perpendicular to outer elongate tape 1740.

Figure 17G:
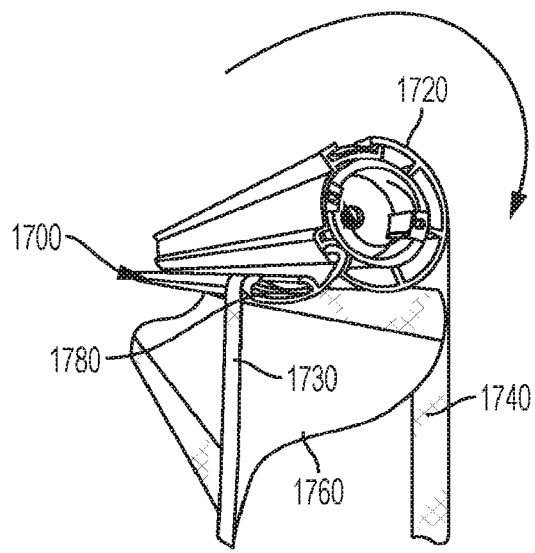

In the embodiment of FIG. 17G, as roller 1720 further rotates in the direction of the arrow and door 17" pivots to an open position where it is substantially perpendicular to roller 1720, elongate tapes 1730, 1740 separate such that the middle portion of the top most vane 1760 is no longer substantially parallel to tapes 1730, 1740, and the plurality of vanes move into an expanded position.

Figure 17H:
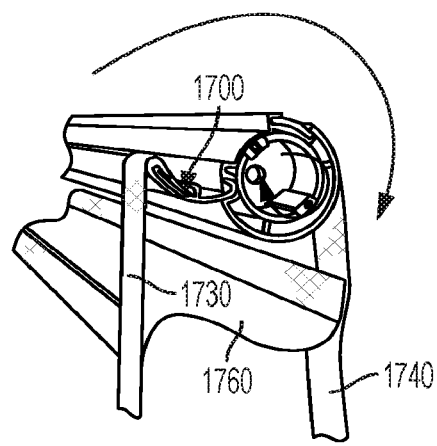

As show in FIG. 17H, when roller 1720 further rotates in the direction of the arrow, door 1700 becomes substantially horizontal and substantially parallel to upper most vane 1760 of roll-up covering, and door 1700 maintains the covering in a fully expanded position with the middle region of the vanes transverse to and preferably substantially perpendicular to elongate tapes 1730, 1740 and with the inner elongate tape 1730 fully separated from and parallel to outer elongate tape 1740. It will be appreciated that use of a door within the roller can help facilitate spacing the inner tapes from the outer tapes, due to the door increasing the effective diameter of the roller, which may permit the use of vanes between the inner and outer elongate tapes that are wider than the diameter of the roller and still maintain the light controlling benefits and desired aesthetics of the subassembly and architectural covering.

Method of Construction

A method of constructing a stiffened multi-layered vane for use within a roll-up cellular architectural covering is illustrated in FIGS. 18A-D. A first piece of vane material 1810 and a second piece of vane material 1820 are cut to size: each piece of material having a first end 1811, 1821; a second end 1812, 1822; a first longitudinal edge 1813, 1823; a second longitudinal edge 1814, 1824; a width 1815, 1825 extending between first longitudinal edge 1813, 1823 and respective second longitudinal edge 1814, 1824; a length 1816, 1826 extending between first end 1811, 1821 and respective second end 1812, 1822, a first face 1817, 1827 defined by the surface defined by length 1816, 1826 and width 1815, 1825, a second opposite face 1818, 1828 defined by the surface defined by length 1816, 1826 and width 1815, 1825, and a thickness defined by the distance between first faces 1817, 1827 and the respective opposite second faces 1818, 1828. Second piece of material 1820 preferably has a larger width 1825 than the width 1815 of first piece of material 1810. The first and second pieces of material may be relatively thin compared to either their width or length.

A first sheet of pocket material 1870 and a second sheet of pocket material 1860 optionally may also be provided and are also cut to size: each sheet having a first end 1871, 1861; a second end 1872, 1862; a first longitudinal edge 1873, 1863; a second longitudinal edge 1874, 1864; a width 1875, 1865 extending between first longitudinal edge 1873, 1863 and respective second longitudinal edge 1874, 1864; and a length 1876, 1866 extending between first end 1871, 1861 and respective second end 1862, 1872; and a thickness. A first angled stiffener 1840 and a second angled stiffener 1850 may be provided and may be constructed as described and illustrated with respect to FIGS. 10E-F and 11A-11C, such that each angled stiffener 1840, 1850 has an angle A2, A3 between a respective first face 1841, 1851 and a respective second 1842, 1852 face, that is less than 180 degrees, while each stiffener also has a respective third face 1843, 1853 and respective fourth face 1844, 1854.

Figure 18A:
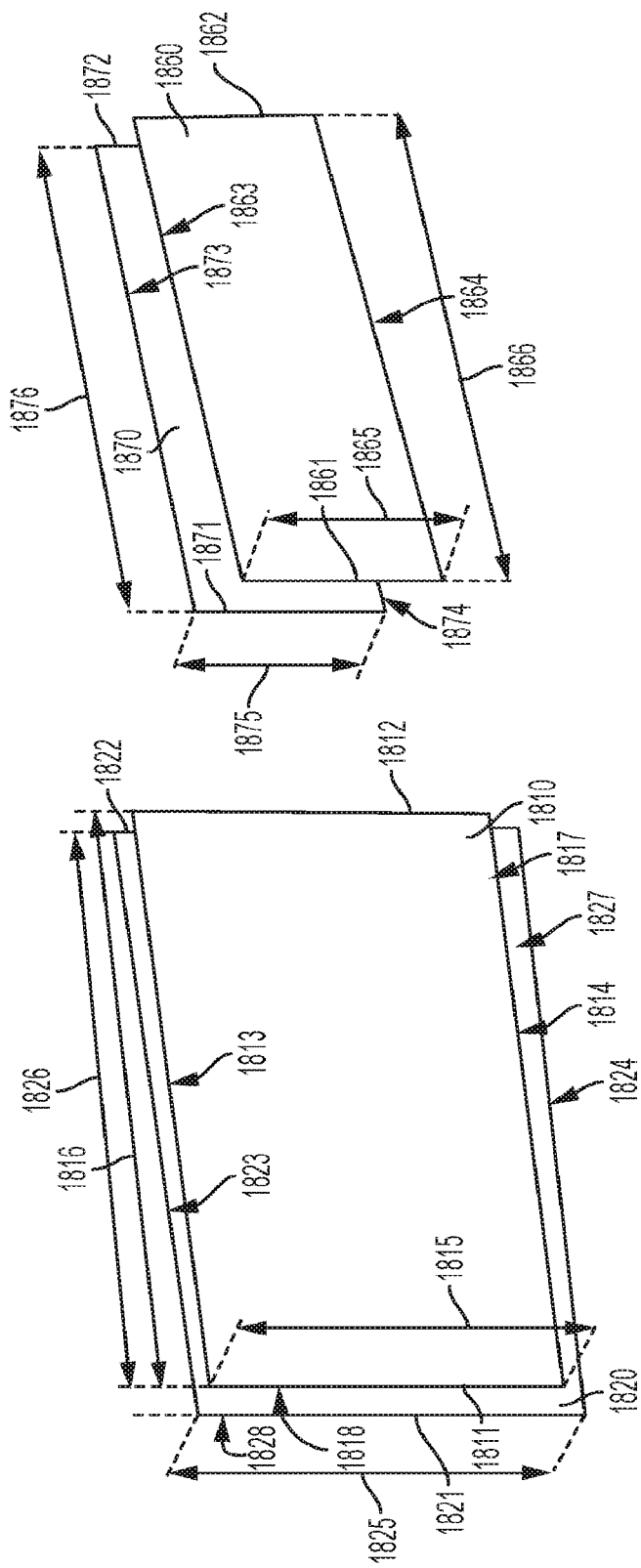
FIG. 18A is perspective view of multiple pieces of vane material and multiple pieces of pocket sheet material.
Figure 18B:
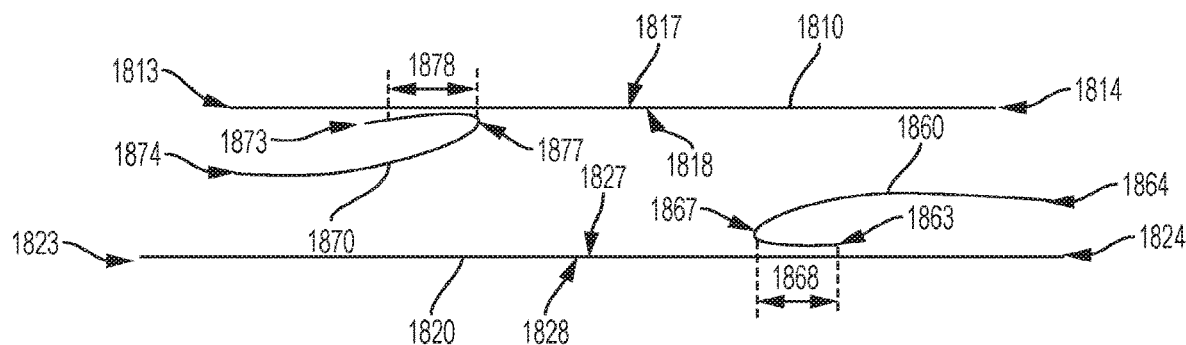
FIG. 18B is an end view of multiple pieces of vane material and multiple pieces of pocket sheet material arranged to be formed into an embodiment of a multi-layered vane.

First pocket sheet 1870 is creased, folded, and/or heat set along its length to create a fold line 1877 and an area 1878 between longitudinal edge 1873 and fold line 1877. First sheet 1870 is coupled, directly or indirectly, to second face 1818 of first piece of vane material 1810 within area 1878 as shown in FIG. 18B such that the distance between fold line 1877 and first longitudinal edge 1813 of first piece of vane material 1810 is greater than the distance between first longitudinal edge 1873 of first pocket sheet 1870 and first longitudinal edge 1813 of first piece of vane material 1810. Second pocket sheet 1860 is creased, folded, and/or heat set along its length 1866 to create a fold line 1867 and an area 1868 between first longitudinal edge 1863 and fold line 1867. Second pocket sheet 1860 is coupled, directly or indirectly, to first face 1827 of second piece of vane material 1820 within area 1868 as shown in FIG. 18B such that the distance between fold line 1867 and second longitudinal edge 1824 of second piece of vane material 1820 is greater than the distance between first longitudinal edge 1863 of second pocket sheet 1860 and second longitudinal edge 1824 of second piece of vane material 1820. In one embodiment, the areas 1868, 1878 of pocket sheets 1860, 1870 are coupled, directly or indirectly, to faces 1818, 1827 of the pieces of vane material 1810, 1820 material via ultrasonic weld or hot knife cut-seal.

Figure 18C:
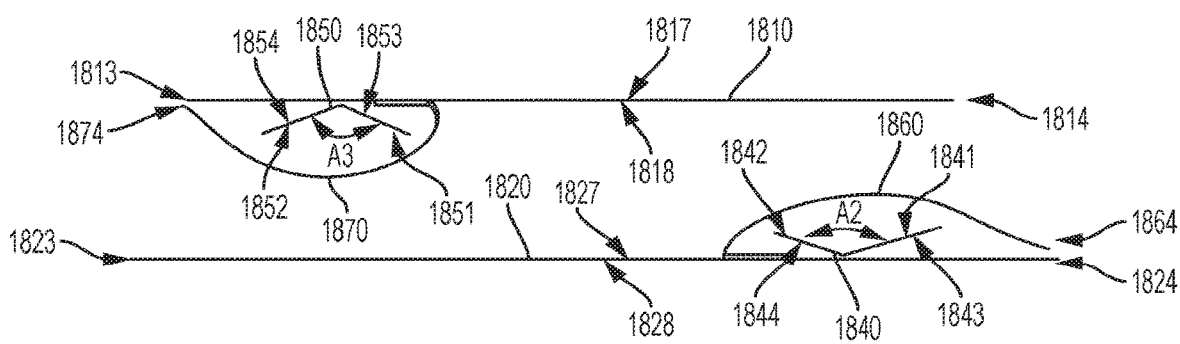
FIG. 18C is an end view of multiple pieces of vane material with multiple pieces of pocket sheet material connected thereto and multiple elongate stiffeners arranged to be configured into an embodiment of a stiffened multi-layered vane.

Then first elongate stiffener 1840 is positioned adjacent first face 1827 of second piece of vane material 1820 with angle A2 less than 180 degrees facing toward first piece of vane material 1810. Second pocket sheet 1860 is wrapped, preferably about 180 degrees, around first elongate stiffener 1840 such that second longitudinal edge 1864 of second pocket sheet 1860 is aligned with and at second longitudinal edge 1824 of second piece of vane material 1820 as shown in FIG. 18C. In this manner, the faces of first elongate stiffener 1840 are surrounded and encompassed by second piece of vane material 1820 and second pocket sheet 1860, and the angle A2, preferably less than 180 degrees, between first face 1841 and second face 1842 of first angled stiffener 1840 faces second pocket sheet 1860. Similarly, second elongate stiffener 1850 is positioned adjacent second face 1818 of first piece of vane material 1810 with angle A3, preferably less than 180 degrees, facing toward second piece of material 1820. First pocket sheet 1870 is wrapped, preferably about 180 degrees, around second elongate stiffener 1850 such that second longitudinal edge 1874 of first pocket sheet 1870 is aligned with and at first longitudinal edge 1814 of first piece of vane material 1810 as shown in FIG. 18C. In this manner, the faces of second elongate stiffener 1850 are surrounded and encompassed by first piece of vane material 1810 and first pocket sheet 1870, and the angle A3 between first face 1851 and second face 1852 of second angled stiffener 1850 faces first pocket sheet 1870.

Figure 18D:
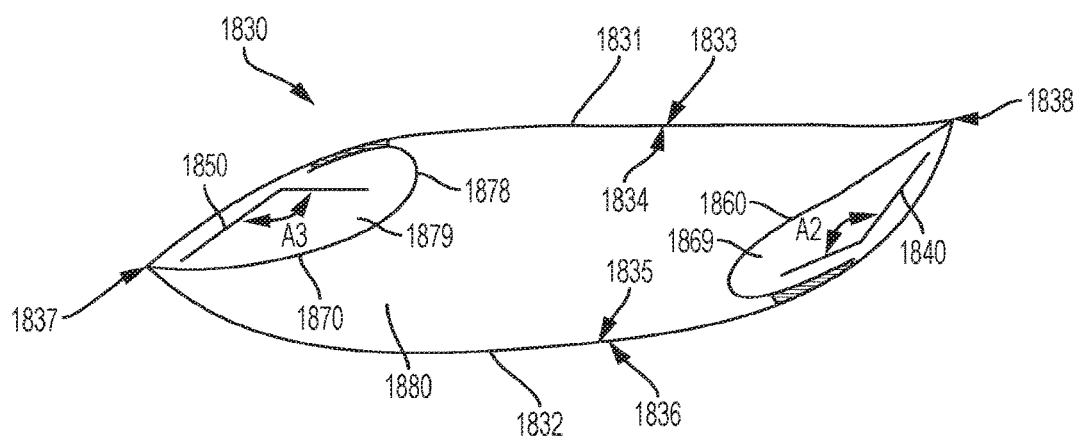
FIG. 18D is an end view of an embodiment of a stiffened multi-layered vane.

Second longitudinal edges 1814, 1824, 1864 of first piece of vane material 1810, second piece of vane material 1820, and second pocket sheet 1860 are then coupled together, for example by ultra-sonic cut-welding at a linear ultra-sonic cut weld seam along second longitudinal edges 1814, 1824, 1864 to create first stiffener pocket 1869 as shown in FIG. 18D. Similarly, first longitudinal edges 1813, 1823 of first piece of vane material 1810 and second piece of vane material 1820, and second longitudinal edge 1874 of first pocket sheet 1870 are coupled together for example by ultra-sonic cut welding at a linear ultra-sonic cut weld seam along respective longitudinal edges 1813, 1823, 1874 to create a second stiffener pocket 1879 as shown in FIG. 18D.

A stiffened multi-layered vane 1830 is formed by attaching the longitudinal edges of the pieces of material, such that the multi-layered vane has an inner vane layer 1831, an outer vane layer 1832, a first pocket sheet 1870, a second pocket sheet 1860, a first angled stiffener 1840, and a second angled stiffener 1850. First angled stiffener 1840 is located within first pocket 1869 between inner face 1835 of outer vane layer 1832 and second pocket sheet 1860, and second angled stiffener 1850 is located within second pocket 1879 between outer face 1834 of inner vane layer 1831 and first pocket sheet 1870, with the angles A2, A3 of angled stiffeners 1840, 1850, preferably less than 180 degrees, facing the respective stiffener pocket sheets 1860, 1870 and oriented in opposite directions. In this embodiment, outer vane layer 1832 has a width between longitudinal edges 1837, 1838 of cellular vane 1830 that is greater than the width of inner vane layer 1831 between longitudinal edges 1837, 1838 of cellular vane 1830. In this embodiment, multi-layered vane 1830 has a space (cell) 1880 between outer face 1834 of inner vane layer 1831, inner face 1835 of outer vane layer 1832, first pocket sheet 1860, and second pocket sheet 1870.

Constructed as described above, a multi-layered vane 1830, having multiple angled elongate stiffeners 1860, 1870 within stiffener pockets 1869, 1879, is stiffened such that when coupled, directly or indirectly, to elongate tapes (as described above in relation to FIG. 14B) as part of a subassembly, the stiffened multi-layered vane 1830 will be capable of moving and/or pivoting from a substantially collapsed position to a substantially expanded position as the configuration of the subassembly, and the positions of the vanes, change between collapsed and expanded configurations. The pockets 1869, 1879 constrain and maintain the orientation of the angled elongate stiffeners 1860, 1870 with respect to one another and with respect to the other components of the subassembly by inhibiting and/or preventing angled stiffeners 1860, 1870 from twisting and/or rotating while permitting angled stiffeners 1860, 1870 of vanes 1830 to move laterally to some extent in the length direction within the respective stiffener pockets 1869, 1879 such that angled stiffeners 1860, 1870 may expand and contract at different rates than the vanes, thereby avoiding wrinkling, bulging, and other unsightly deformations of the vane material that may be caused by different thermal rates of expansion between the stiffener and vane materials.

Both the length and the width of a roll-up architectural covering are readily customizable. The length is readily controllable by selecting the desired number of vanes, and the width is readily controllable by selecting the desired vane length (the vane is cut from a continuous roll of vane material) to match the desired roll-up covering width. The roll-up covering length is further customizable because the vane spacing need not be determined by ladders or any other pre-existing elements of the roll-up covering. Instead, the vanes may be placed at any desired points along the length of the tapes (or other support elements) to achieve the desired roll-up covering length and vane spacing. The overall spacing between adjacent vanes may be uniform or non-uniform, as desired, but, is customizable, such as based on the overall final custom length of the roll-up covering. The number of vanes preferably is selected to provide sufficient vanes along the length of the roll-up architectural covering so that the vanes will provide the desired light altering effect when the roll-up covering is in the various configurations. One manner of providing customized window covering is described in PCT/US2015/049444 entitled Roll-Up Coverings for Architectural Openings and Related Methods, Systems and Devices, the disclosure of which is hereby incorporated by reference in its entirety.

It will be appreciated by those skilled in the art that changes could be made to the embodiments described above without departing from the broad inventive concept. It is understood, therefore, that this invention is not limited to the particular embodiments disclosed, but it is intended to cover modifications within the spirit and scope of the invention. While fundamental features of the invention have been shown and described in exemplary embodiments, it will be understood that omissions, substitutions and changes in the form and details of the disclosed embodiments of the architectural covering may be made by those skilled in the art without departing from the spirit of the invention. Moreover, the scope of the invention covers conventionally known, future developed variations and modifications to the components described herein as would be understood by those skilled in the art.

Those skilled in the art will recognize that the architectural covering has many applications, may be implemented in various manners and, as such is not to be limited by the foregoing embodiments and examples. Any number of the features of the different embodiments described herein may be combined into a single embodiment. The locations of particular elements, for example the elongate tapes and/or stiffeners may be altered. Alternate embodiments are possible that have additional features than those described or may have less than all the features described. Functionality may also be, in whole or in part, distributed among multiple components, in manners now known or to become known.

To avoid any ambiguity in the scope of protection sought, terms and phrases which are not explicitly defined should be given their broadest reasonable interpretation. As used herein, the singular forms "a", "an" and "the" may be intended to include the plural forms as well, unless the context clearly indicates otherwise. It is intended that the scope of the invention not be limited by the examples described but rather be defined by the claims appended hereto and their equivalents.

The invention claimed is:

1. A covering for an architectural feature having a width and a height, the covering for adjusting the amount of light that passes there through and comprising:

a flexible panel having a width, a top end and a bottom end defining a height of the panel, the panel comprising:
 a flexible first vertical support member having a height;
 a flexible second vertical support member having a height; and
 a plurality of horizontally-extending, flexible vanes extending between the flexible first vertical support member and the flexible second vertical support member, the plurality of flexible vanes being separately formed from and spaced along the height of the flexible first vertical support member and along the height of the flexible second vertical support member, each of the plurality of flexible vanes having a length and a width, the length of the plurality of flexible vanes corresponding to and substantially the same as the width of the panel, each of the plurality of flexible vanes operably coupled to both the flexible first vertical support member and the flexible second vertical support member, the plurality of flexible vanes moveable, by operation of at least one of the flexible first vertical support member and the flexible second vertical support member, between a first position that permits light to pass through the flexible panel and a second position that inhibits light from passing through the flexible panel;
 wherein each of the plurality of the flexible vanes has a different light transmissivity than at least one of the flexible first vertical support member and the flexible second vertical support member;
 wherein at least one of the plurality of flexible vanes forms a cellular vane wherein the cellular vane is formed from a single sheet of material that has two end portions that are connected by ultrasonic welding to form two layers that are separable to form and surround a cell space when the cellular vane moves to the first position;
 wherein an outer surface of a first layer of the two layers is adhesively bonded directly to the flexible first vertical support member and an outer surface of a second layer of the two layers is adhesively bonded directly to the flexible second vertical support member; and
 wherein longitudinal edges of the two end portions of the single sheet of material forming the cellular vane are aligned and are connected by ultrasonic welding to form a first fold line.

2. The covering of claim 1, wherein the flexible first vertical support member comprises one or more first flexible tapes, each first flexible tape having a width that ranges from a low of about 5 mm to as large as about 100 mm, and wherein the flexible second vertical support member comprises one or more second flexible tapes, each second flexible tape having a width that ranges from a low of about 5 mm to as large as about 100 mm.

3. The covering of claim 1, wherein the flexible first vertical support member comprises a sheer.

4. The covering of claim 1, wherein a second fold line is formed by creasing the single sheet of material forming the cellular vane.

5. The covering of claim 4, wherein the second fold line is formed by heat-setting the crease.

6. The covering of claim 1, wherein the cellular vane has a second fold line formed in the single sheet of material.

7. The covering of claim 1, wherein the first layer is a single layer of material and the second layer is a single layer of material and the first layer is longer than the second layer.

8. The covering of claim 7, wherein the first layer forms a bottom layer of the cellular vane.

9. The covering of claim 1, wherein the cellular vane comprises a metallized film.

10. The covering of claim 1, wherein the two layers move from a substantially flat parallel orientation when the plurality of flexible vanes are in the second position to a substantially S-shaped orientation when the two layers separate.

11. The covering of claim 1, wherein a thickness of the first layer ranges from a low of about 0.0005 inches to a high of about 0.005 inches and a thickness of the second layer ranges from a low of about 0.0005 inches to a high of about 0.005 inches.

12. The covering according to claim 1, wherein the cellular vane has a second fold line and the ultrasonic welding of the two end portions is located at the first fold line.

13. The covering according to claim 1, further comprising an elongate stiffener having a length extending the length of the cellular vane and located at and configured to support at least one of an inner longitudinal edge and an outer longitudinal edge of the cellular vane.

14. The covering according to claim 13, wherein the elongate stiffener is adhesively bonded to and along the at least one of the inner longitudinal edge or the outer longitudinal edge of the cellular vane and one of the first or second vertical support members.

15. The covering according to claim 13, wherein the elongate stiffener is at least one of a configuration group consisting of: an angled configuration, a curved configuration, and a combination thereof.

16. A covering for an architectural feature having a width and a height, the covering for adjusting the amount of light that passes there through and comprising:
 a flexible panel having a width, a top end and a bottom end defining a height of the panel, the panel comprising:
 a flexible first vertical support member having a height;
 a flexible second vertical support member having a height; and
 a plurality of horizontally-extending, flexible vanes extending between the flexible first vertical support member and the flexible second vertical support member, the plurality of flexible vanes being separately formed from and spaced along the height of the flexible first vertical support member and along the height of the flexible second vertical support member, each of the plurality of flexible vanes having a length and a width, the length of the plurality of flexible vanes corresponding to and substantially the same as the width of the panel,
 wherein each of the plurality of the flexible vanes is a cellular vane configured from a single sheet of material having two ends, the single sheet of material configured to have two layers, longitudinal edges of the two end portions of the single sheet of material forming the cellular vane are aligned and are connected by ultrasonic welding to form a first fold line, and the two ends that are ultrasonically welded such that the two layers are only attached at the two ends, the two layers being separable to form and completely encircle a cell space,
 wherein each cellular vane: (a) has a different light transmissivity than at least one of the flexible first vertical support member and the flexible second vertical support member; (b) has an outer surface of a first layer of the two layers adhesively bonded directly to the flexible first vertical support member; (c) has an outer surface of a second layer of the two layers adhesively bonded directly to the flexible second vertical support member; and (d) is moveable, by operation of at least one of the flexible first vertical support member and the flexible second vertical support member, between a first position that permits light to pass through the flexible panel and a second position that inhibits light from passing through the flexible panel.

17. The covering of claim 16, wherein the flexible first vertical support member comprises one or more first flexible tapes, each first flexible tape having a width that ranges from a low of about 5 mm to as large as about 100 mm, and wherein the flexible second vertical support member comprises one or more second flexible tapes, each second flexible tape having a width that ranges from a low of about 5 mm to as large as about 100 mm.

18. The covering of claim 16, wherein the flexible first vertical support member comprises a sheer.

19. The covering of claim 16, wherein a second fold line is formed in each cellular vane by creasing the single sheet of material forming each respective cellular vane.

20. The covering of claim 19, wherein the second fold line of each cellular vane is formed by heat-setting the crease.

21. The covering of claim 16, wherein a second fold line is formed in each cellular vane and the ultrasonic welding of the two ends of the single sheet of material forms the first fold line in each cellular vane.

22. The covering of claim 16, wherein the first layer of at least one of the cellular vanes is a single layer of material and the second layer of the at least one of the cellular vanes is a single material and the first layer of the at least one of the cellular vanes is longer than the second layer of the at least one of the cellular vanes, and the first layer forms a bottom layer of the at least one of the cellular vanes.

23. The covering of claim 16, wherein each cellular vane comprises a metallized film.

24. The covering of claim 16, wherein a thickness of the first layer of each cellular vane ranges from a low of about 0.0005 inches to a high of about 0.005 inches and a thickness of the second layer of each cellular vane ranges from a low of about 0.0005 inches to a high of about 0.005 inches.

25. The covering according to claim 16, wherein at least one of the cellular vanes has a second fold line and the ultrasonic welding of the two end portions is located at the first fold line.

26. The covering according to claim 16, further comprising an elongate stiffener having a length extending the length of at least one of the cellular vanes and located at and configured to support at least one of an inner longitudinal edge and an outer longitudinal edge of the at least one of the cellular vanes.

27. The covering according to claim 26, wherein the elongate stiffener is adhesively bonded to and along the at least one of the inner longitudinal edge and the outer longitudinal edge of the at least one of the cellular vanes and one of the first or second vertical support members.

* * * * *